United States Patent
Keskin et al.

(10) Patent No.: US 9,342,202 B2
(45) Date of Patent: May 17, 2016

(54) CONDUCTIVE MULTI-TOUCH TOUCH PANEL

(75) Inventors: Mustafa Keskin, San Diego, CA (US); Cheong Kun, Irvine, CA (US); Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1013 days.

(21) Appl. No.: 12/535,647

(22) Filed: Aug. 4, 2009

(65) Prior Publication Data

US 2010/0188345 A1 Jul. 29, 2010

Related U.S. Application Data

(60) Provisional application No. 61/146,685, filed on Jan. 23, 2009.

(51) Int. Cl.
*G06F 3/041* (2006.01)
*G06F 3/045* (2006.01)

(52) U.S. Cl.
CPC ...... *G06F 3/045* (2013.01); *G06F 2203/04104* (2013.01)

(58) Field of Classification Search
CPC ....... G06F 3/041; G06F 3/0412; G06F 3/045; G06F 2203/04104
USPC ......... 345/173–175; 178/18.01, 18.03, 18.05, 178/18.06
See application file for complete search history.

(56) References Cited

U.S. PATENT DOCUMENTS

| | | | | |
|---|---|---|---|---|
| 4,814,760 A * | 3/1989 | Johnston et al. | | 345/104 |
| 5,451,724 A * | 9/1995 | Nakazawa et al. | | 178/18.05 |
| 5,606,346 A * | 2/1997 | Kai et al. | | 345/173 |
| 5,872,561 A * | 2/1999 | Figie et al. | | 345/168 |
| 7,920,129 B2 * | 4/2011 | Hotelling et al. | | 345/173 |
| 8,072,429 B2 * | 12/2011 | Grivna | G06F 3/0416 | 345/173 |
| 8,094,135 B2 * | 1/2012 | Chen | | 345/174 |
| 8,179,408 B2 * | 5/2012 | Chen et al. | | 347/174 |
| 8,345,019 B2 * | 1/2013 | D'Souza et al. | G06F 3/0416 | 345/174 |
| 8,462,135 B1 * | 6/2013 | Xiao | G06F 3/0416 | 345/156 |

(Continued)

FOREIGN PATENT DOCUMENTS

| CN | 1975517 A | 6/2007 |
|---|---|---|
| FR | 2644257 | 9/1990 |

(Continued)

OTHER PUBLICATIONS

International Search Report & Written Opinion—PCT/US2010/021858—Itnernational Search Authority—European Patent Office—May 19, 2010.

*Primary Examiner* — Jason Mandeville
(74) *Attorney, Agent, or Firm* — Brian Momeyer

(57) ABSTRACT

A conductive multi-touch touch-sensitive panel includes two intersecting but electrically isolated arrays of linear conductors which can be brought into electrical contact by touching the panel. A display element may be positioned beneath the two arrays of linear conductors to provide a touchscreen panel. A touch to a cover plate or member causes one or more linear conductors in one array to contact one or more linear conductors in the other array. The location of a touch to the panel can be detected by individually or sequentially applying an electrical signal, such as a voltage or current, to each linear conductor in one array while sensing voltage or current on each of the linear conductors in the other array.

51 Claims, 44 Drawing Sheets

(56) References Cited

U.S. PATENT DOCUMENTS

| | | | |
|---|---|---|---|
| 8,525,799 B1* | 9/2013 | Grivna et al. | 345/173 |
| 8,619,056 B2* | 12/2013 | Lin | G06F 3/0418 345/174 |
| 2003/0079920 A1 | 5/2003 | Rantet | |
| 2004/0095336 A1* | 5/2004 | Hong et al. | 345/173 |
| 2007/0198926 A1* | 8/2007 | Joguet et al. | 715/702 |
| 2007/0235231 A1* | 10/2007 | Loomis et al. | 178/18.06 |
| 2008/0018608 A1* | 1/2008 | Serban et al. | 345/173 |
| 2008/0150906 A1* | 6/2008 | Grivna | G06F 3/0416 345/173 |
| 2008/0296073 A1 | 12/2008 | McDermid | |
| 2009/0273579 A1* | 11/2009 | Zachut et al. | 345/174 |
| 2009/0284398 A1* | 11/2009 | Shen et al. | 341/33 |
| 2009/0303196 A1 | 12/2009 | Furukawa | |
| 2010/0066701 A1* | 3/2010 | Ningrat | G06F 3/044 345/174 |
| 2010/0097343 A1* | 4/2010 | Fang | 345/174 |
| 2010/0188364 A1* | 7/2010 | Lin | G06F 3/0418 345/174 |

FOREIGN PATENT DOCUMENTS

| | | | |
|---|---|---|---|
| JP | 63208923 A | | 8/1988 |
| JP | 8328729 A | | 12/1996 |
| JP | 2008305036 A | | 12/2008 |
| WO | 2008026280 A1 | | 3/2008 |
| WO | WO 2008026280 A1 * | | 3/2008 |

\* cited by examiner

CONDUCTIVE MULTI-TOUCH TOUCH PANEL

RELATED APPLICATIONS

This application claims the benefit of priority to U.S. Provisional Application No. 61/146,685 entitled "Conductive Multi-Touch Touch-Screen Panel" filed Jan. 23, 2009, the entire contents of which are hereby incorporated by reference.

FIELD OF THE INVENTION

The present invention relates to digital input/output devices, and more particularly to touch pad user interface and touchscreen display technologies.

BACKGROUND

Recent mobile computing devices have implemented touchscreen displays that are capable of recognizing more than one finger touches. Referred to as "multi-touch" displays, such touchscreens enable new user interfaces that offer more intuitive interactions with computing devices. A well known example of a computing device implementing a multi-touch display is the iPhone® by Apple Computer, Inc. The market success of the iphone® has spawned many competitors and new software applications. Thus, there is a sudden demand for multi-touch displays.

Conventional multi-touch displays employ capacitive sensors which detect the touch of a finger as a change in capacitance in an array of capacitors underlying the display glass. Descriptions of this technology are provided in U.S. Pat. No. 6,323,846 and U.S. Patent Publication No. 2006-0097991, the entire contents of which are hereby incorporated by reference.

A second multi-touch display employs two resistive panels positioned one above the other which are brought into contact by a finger press on the display glass. By measuring the voltage drop or effective resistance through the panels a processor can estimate the location of the finger press.

SUMMARY

The various embodiments provide a new type of multi-touch touch pad user input device and/or touchscreen display panel that employs two arrays of conductive lines or wires (referred to herein as "linear conductors") that are separated by a gap or insulator. Pressure by a finger or stylus on the exterior of the panel (e.g., on the cover or display cover glass) causes one or more conductive lines or wires in a first array to come into low-resistance electrical contact with one or more conductive lines or wires in a second array of conductive lines or wires. The location of a touch to the panel can be detected by sequentially applying a voltage or current to respective conductive lines or wires in one array while measuring a voltage or current output from each of the conductive lines or wires in the other array. The location of a touch is then indicated by the particular conductive line or wire that is coupled to a voltage source in the first array and the conductive line or wire with a voltage or current output resulting from the low-resistance contact between the two arrays. Voltage or current outputs in the second array may be compared to a threshold to output a digital indication of a touch, or output as a range of value.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1A:
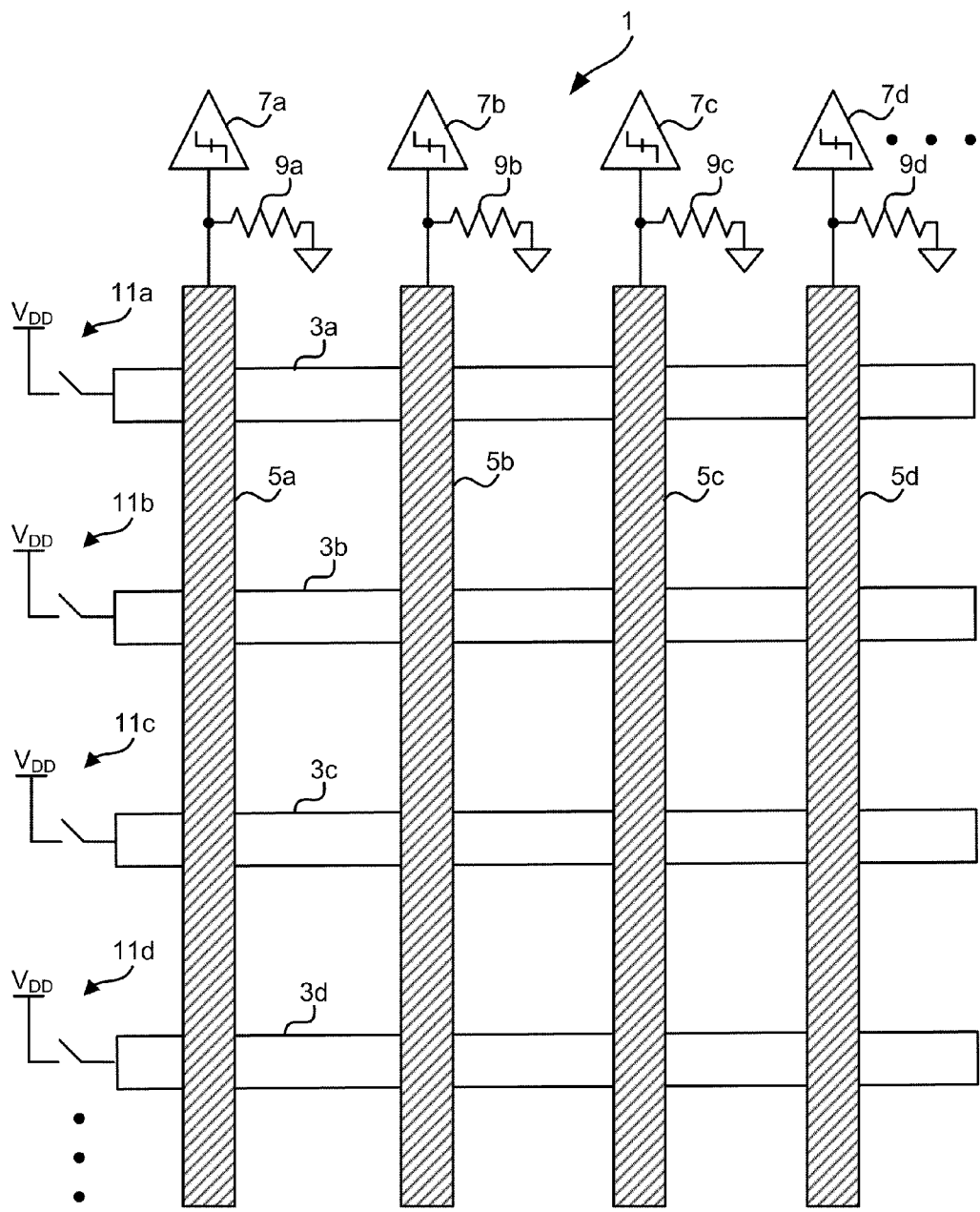
FIGS. 1A through 1D are component diagrams of a portion of a conductive multi-touch touch pad or touchscreen panel according to four alternative embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "mobile device" is intended to encompass any form of programmable computer as may exist or will be developed in the future, including, for example, personal computers, laptop computers, mobile computing devices (e.g., cellular telephones, personal data assistants (PDA), palm top computers, and multifunction mobile devices), main frame computers, servers, and integrated computing systems. "Mobile device" may further include embedded systems including a programmable computer, including for example programmed and programmable instruments, entertainment systems (e.g., music players, MP3 devices, DVD players, etc.), GPS navigation systems, mobile data collection units, vehicle computer systems (e.g., automobile computer systems, aircraft avionics systems, etc.), and similar computerized systems employing a touchscreen display or touch pad user input devices. A mobile device typically includes a software programmable processor coupled to a memory circuit, but may further include the components described below with reference to FIGS. 19 through 21.

As revealed by the popularity of the Apple iphone® and its imitators, multi-touch display panels offer a number of user interface advantages. Consequently, more applications for multi-touch panels are anticipated. However, current multi-touch panel technologies suffer from high manufacturing costs which could limit their application to high-end products. To achieve the benefits that multi-touch panels offer to users, lower cost technologies are required.

The various embodiments of a conductive multi-touch panel, such as a touch pad user input device or touchscreen display, employ two arrays of linear conductors that are positioned within the panel in an intersecting pattern and electrically separated by a gap or insulator. In a touchpad panel implementation, the two arrays need not be transparent and may be protected by a non-transparent cover. In a touchscreen panel implementation, a display element, such as a liquid crystal display, can be positioned beneath the two arrays of linear conductors, and the two arrays can be covered by a transparent plate or transparent array support member. Pressure from a finger or stylus on the exterior of the cover, transparent plate or transparent member causes one or more linear conductors in the first array to come into low-resistance contact with one or more linear conductors in the second array. The location of such a touch to the panel can be detected by sequentially applying an electrical signal to individual linear conductors in one array while measuring an output electrical signal, such as a voltage or current, that is output from the linear conductors in the other array. The location of a touch is then indicated by the particular linear conductor that is coupled to the electrical signal (i.e., voltage or current source) in the first array and the linear conductor exhibiting a voltage or current electrical output signal in the second array resulting from the low-resistance contact between the two arrays. Electrical output signals (i.e., voltage or current) in the linear conductors in the second array may be measured or detected by a sensor which provides an output as a value, or compared to a threshold to output a digital indication of a touch.

The resulting output electrical signal, i.e., voltage or current, exhibited on linear conductors in the second array can be detected or measured by affordable circuit elements, rendering the various embodiments more affordable than previously known multi-touch touch-sensitive panels. For example, a comparator circuit, such as a simple inverter, can be used to provide a digital output reflecting whether a voltage or current appears on a particular linear conductor. Such comparator or inverter circuits can be integrated into affordable integrated circuits. Linear conductors can be configured in arrays using well known lithographic fabrication methods, as well as other known affordable fabrication methods. Thus, conductive multi-touch touch pad or touchscreen panels may be less expensive than other technology multi-touch panels.

Figure 2A:
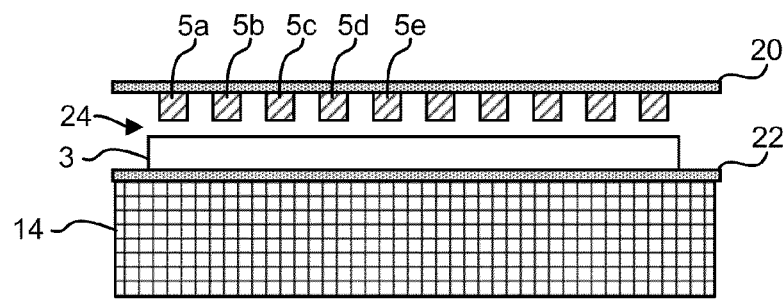
FIGS. 2A through 2C are cross-sectional diagrams of a portion of a conductive multi-touch touchscreen panel according to three embodiments.

An embodiment of a conductive multi-touch touch pad or touchscreen panel is illustrated in FIG. 1A which is a circuit/component diagram of a portion of the panel 1. The panel 1 includes two arrays of conductive lines or wires 3a-3d, 5a-5d that are arranged with respect to each other in an intersecting manner. For example, the two arrays of conductive lines or wires 3a-3d, 5a-5d may be arranged approximately perpendicular to each other, such that each linear conductor in the first array (e.g., 3a) crosses the conductive lines or wires in the second array (e.g., 5a-5d) at approximately right angles, as illustrated in FIG. 1A. As is shown more clearly in FIGS. 2A-2C, the two arrays of conductive lines or wires are electrically separated from each other until an exterior surface of the panel is touched which may cause one or more conductive lines or wires in each of the two arrays to come into electrical contact, as is shown in FIGS. 3A-3C.

The conductive lines or wires 3a-3d, 5a-5d in the two arrays may be any conductive material that can be arrayed, applied to or embedded within transparent support plates or members. Examples of conductive lines include traces of conductive oxide compounds or thin lines of metals or alloys. Conductive lines may be plated, sputtered or otherwise deposited on or in a support plate or member. An example of a preferred conductive material for use in a touchscreen display is indium tin oxide ("ITO" which is also known as tin-doped indium oxide) which is transparent and colorless in thin layers. Another example is aluminum-doped zinc oxide. A thin film of ITO or aluminum-doped zinc oxide can be deposited on a transparent plate or member by electron beam evaporation, physical vapor deposition or a variety of sputter deposition techniques. Examples of conductive wires include thin wires of metals or alloys, such as gold, silver, copper, aluminum, etc., or other conductive materials such as carbon nanotubes. Wires may be applied to a cover (e.g., a deformable plastic sheet) or transparent plate or member, or formed on a cover, transparent plate or member by electron beam evaporation, physical vapor deposition or a variety of sputter deposition techniques. In order to simplify the descriptions of the embodiments and claim language, the term "linear conductors" is used herein to refer generally to conductive lines or wires. Thus, the reference to a "linear conductor" encompasses conductive lines (e.g., a linear film of ITO) and wires. Further, references to "linear conductor" are not intended to require or imply that the conductive lines or wires are necessarily configured in straight lines. Preferably linear conductors are transparent or sufficiently thin so not to block or dim an underlying display element in a touchscreen panel implementation.

While FIG. 1A illustrates the two arrays of linear conductors oriented at right angles to each other, the two arrays may be arranged in any intersecting (i.e., nonparallel) orientation. Also, while FIG. 1A shows the two arrays of linear conductors oriented horizontally and vertically within the plane of the figure, the directions of the two arrays and the orientation of the panel 1 itself are arbitrary. To simplify the descriptions of the various embodiments reference is made herein to "horizontal" and "vertical" linear conductors, as well as to "rows" and "columns." As one of skill in the art will appreciate, the circuits coupled to the vertical (or column) linear conductors in the following descriptions may be coupled instead to the horizontal (or row) linear conductors and vice versa without changing the nature and operation of the various embodiments. Therefore, references herein to "horizontal," "row," "vertical" and "column" are for illustrative purposes only and should not be construed as implying or requiring that the so referenced linear conductors are limited to horizontal or vertical orientations within particular embodiments.

While the figures illustrate embodiments which have near equal linear conductor pitch densities (i.e., the number of linear conductors per unit length along a line perpendicular to the linear conductors), this is for illustration purposes only. Other embodiments may employ first and second arrays of linear conductors which have different pitch densities. For example, the second array of linear conductors 5a-5d could include more linear conductors per unit length than the first array of linear conductors 3a-3d. Such an embodiment would provide a panel with greater horizontal sensitivity. Also, the linear conductor pitch densities of the first and second arrays may vary across the area of the panel. For example, the pitch density of the first and second arrays may be greater near the center of each array than at the edges. Such an embodiment would provide a panel with greater sensitivity in the center of the display than along the edges.

In the embodiment illustrated in FIG. 1A, the applied electrical signal may be in the form of a voltage source ($V_{DD}$) that is individually connected to each of the linear conductors 3a-3d in one (e.g., horizontal) array, such as by switches 11a-111d. A comparator circuit 7a-7d and a resistor 9a-9d coupled to ground is connected to each of the linear conductors 5a-5d in the other (e.g., vertical) array. So arranged, when one of the linear conductors in one array (e.g., 5b) is brought into electrical contact with a linear conductor in the other array (e.g., 3b), an electrical circuit is formed between the voltage source and a comparator circuit (e.g., 7b) when a switch (e.g., 11b) connected to the one contacted linear conductor (e.g., 3b) is closed. As a result of this contact the contacted vertical line is pulled up to $V_{DD}$, while the non-contacted vertical lines are pulled down to ground via the weak resistors 9a-9d. The weak resistors 9a-9d coupled to ground insure that the comparator circuit 7a-7d senses low or no voltage when there is no electrical connection between the two arrays. When one of the linear conductors in one array (e.g., 5b) is brought into electrical contact with a linear conductor in the other array (e.g., 3b), the comparator circuit (e.g., 7b) senses the applied voltage, and can output a signal (e.g., a "1" or "0") if the applied voltage exceeds a threshold. In this manner, the contact between linear conductors in the two arrays can be detected. Since the particular switch (e.g., 11b) that was closed and the comparator circuit (e.g., 7b) detecting voltage are known, the point of intersection can be determined as the point of intersection between the associated linear conductors (e.g., 3b and 7b).

Figure 1B:
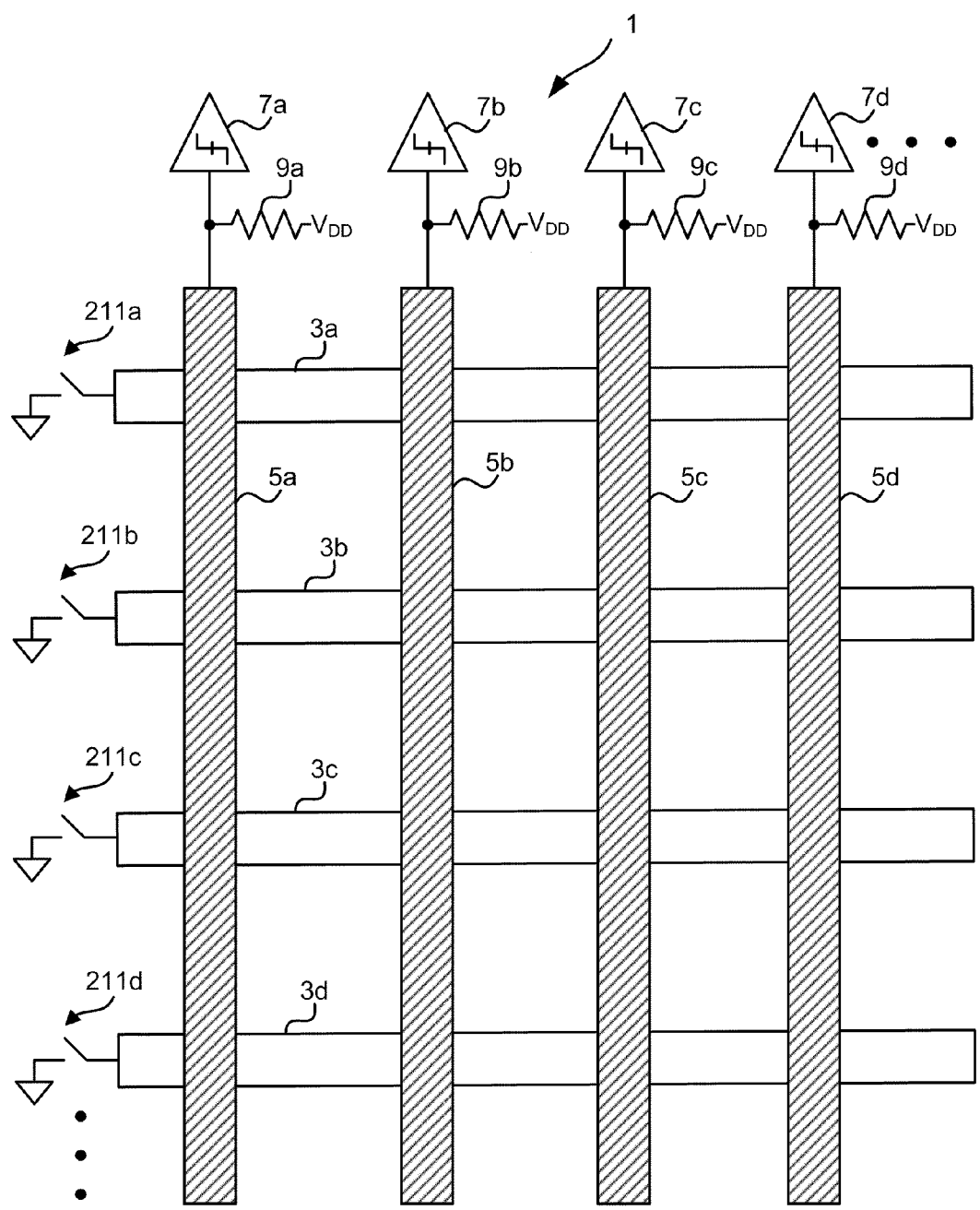

While FIG. 1A (and other figures) show an embodiment in which linear conductors are connected to a voltage source $V_{DD}$ (i.e., the applied electrical signal is $V_{DD}$) one of skill in the art would appreciate that an equivalent circuit may be utilized in which the applied electrical signal comprises connecting the linear conductors to ground (GND) (which may also be considered a zero voltage source). An example of this embodiment is illustrated in FIG. 1B. In the embodiment illustrated in FIG. 1B, the columns 5a-5d may be pulled up to $V_{DD}$ through resistors 9a-9d, while and the row conductors 3a-3d may be selectively connected to ground (the applied electrical signal) so that when the panel is touched the contacted column(s) is shorted to ground through the contacted row. As a result of this contact the contacted vertical line is pulled down to ground, while the non-contacted vertical lines are pulled up to $V_{DD}$ via the weak resistors 9a-9d. The structure of this alternative embodiment illustrated in FIG. 1B is very similar to that illustrated in FIG. 1A with the exception of the connections to voltage and ground which are switched. Thus, references herein and in the claims to connecting a conductor to a voltage source may include connecting the conductor to a ground (i.e., 0 voltage source).

While FIGS. 1A and 1B illustrate embodiments coupling a voltage source to one array or the other, other embodiments may use current sources as the applied electrical signal. Examples of two alternative embodiments are illustrated in FIGS. 1C and 1D.

Figure 1C:
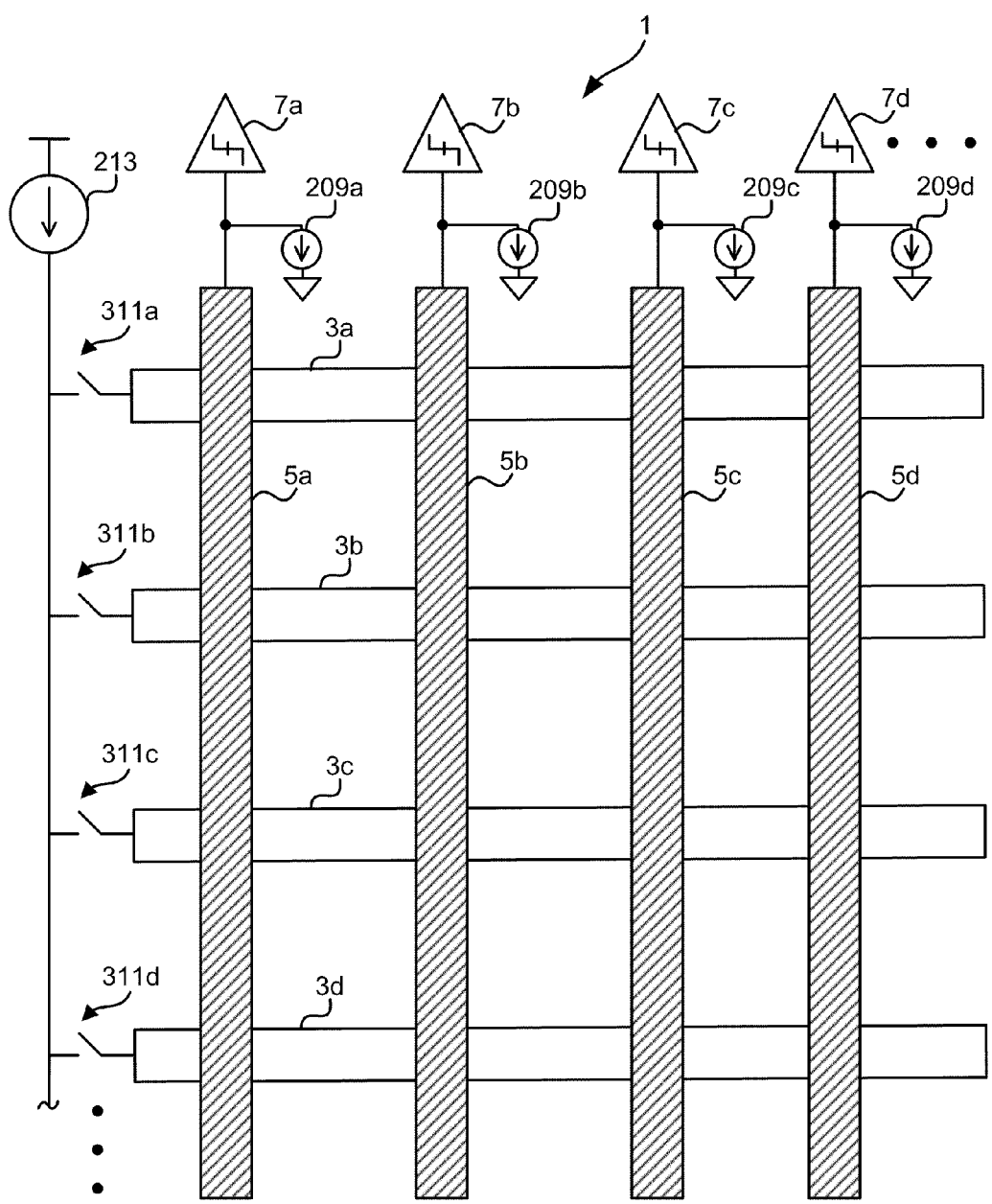

In the embodiment illustrated in FIG. 1C, a strong current source 213 (the applied electrical signal) is selectively coupled to horizontal (for example) conductive lines 3a-3d via switches 311a-311d, while the vertical (for example) conductive lines 5a-5d are coupled to weak current sinks 209a-209d. In this embodiment, the vertical lines are pulled-down by the weak current sinks 209a-209d except where a panel touch results in an electrical contact with a horizontal conductive line 3a-3d that is coupled to the strong current source 213. The comparator circuits 7a-7d can detect the voltage or current resulting from a connection to the strong current source 213, and provide an output indicative of the location of the touch.

Figure 1D:
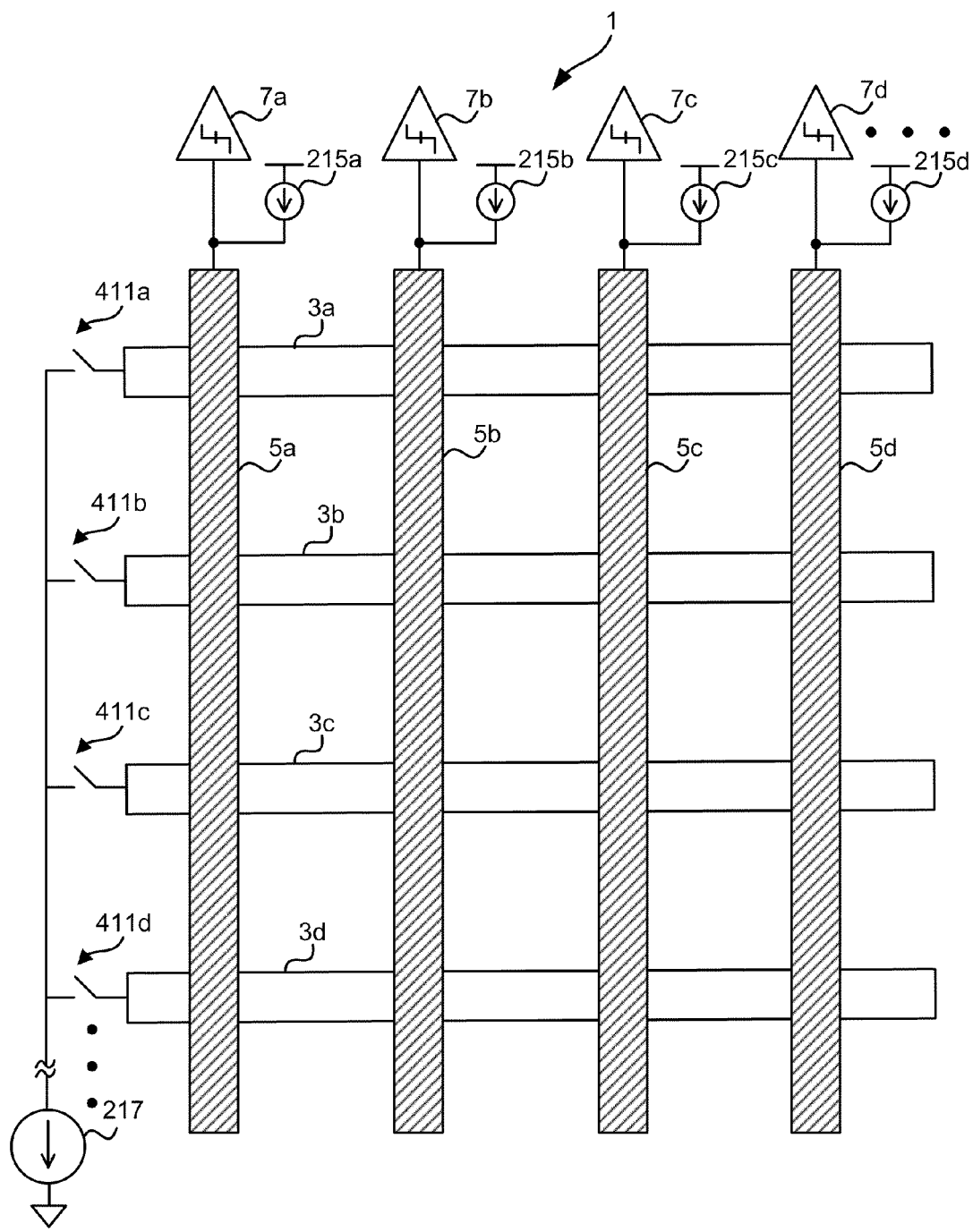

In the embodiment illustrated in FIG. 1D, weak current sources 215a-215d are coupled to the vertical (for example) conductive lines 5a-5d, while the horizontal (for example) conductive lines 3a-3d are selectively coupled via switches 411a-411d to a strong current sink 217 (the applied electrical signal). In this embodiment, the vertical lines 5a-5d are pulled-up by the weak current sources 215a-215d except where a panel touch results in an electrical contact with a horizontal conductive line 3a-3d coupled to the strong current sink 217. The comparator circuits 7a-7d can detect the voltage or current resulting from a connection to the strong current sink 217, and provide an output indicative of the location of the touch.

While not illustrated, further embodiments may employ a combination of the features illustrated in FIGS. 1A-1D. For example, an embodiment may drive horizontal (for example) lines 3a-3d by selectively shorting them to ground (the applied electrical signal) while the vertical (for example) lines 5a-5d are pulled up by weak current sources 215a-215d.

In the various embodiments illustrated in FIGS. 1A-1D the comparator circuit 7a-7d may be any circuit which can detect when an applied voltage or current exceeds a threshold and output a signal when the threshold is exceeded. A simple example of such a circuit is an inverter which will output a digital signal that is the opposite of that apply to the input (e.g., outputting a "1" or positive voltage when the input signal is a "0" or low/no voltage). The comparator circuit 7a-7d threshold for outputting a signal can be set at a value that is sufficiently above zero or ground voltage to prevent false positive readings but sufficiently below the voltage source $V_{DD}$ to ensure a touch is detected. In particular for the embodiment illustrated in FIG. 1A, the voltage threshold should be less than or equal to the voltage expected when the source voltage ($V_{DD}$) is reduced by the resistance of the pull-down resistor and the electrical path from the voltage source. For example, the voltage threshold may be set using equation 1:

$$V_{th} \leq V_{DD} \cdot (R_{pd}/(R_{pd}+R_{panel}+R_{pin})) \quad \text{EQ. 1}$$

where:
- $V_{th}$ is the threshold voltage;
- $V_{DD}$ is the source voltage;
- $R_{pd}$ is the resistance of the pull-down resistor;
- $R_{panel}$ is the resistance through the linear conductors of the panel; and
- $R_{pin}$ is the resistance through the connector pin.

While the voltage threshold setting equation 1 above is applicable to the embodiment illustrated in FIG. 1A, the other embodiments may utilize similar criteria as well.

The linear conductors in the two arrays are normally electrically isolated one from the other until the panel is touched. This is illustrated in FIG. 2A which shows a touchscreen display embodiment in which one array of linear conductors 5a-5e are coupled to a first transparent plate 20 (e.g., a cover glass) and the other array of linear conductors 3 are coupled to a second transparent plate, with the two transparent plates 20, 22 arranged in the panel 1 so that there is a gap 24 electrically isolating the two arrays of linear conductors from each other. The transparent plates 20, 22 may be glass, plastic, or other semi rigid transparent material. To form a touch pad user input device or a touchscreen display, the two transparent plates 20, 22 are positioned above an image generating element, such as a liquid crystal display (LCD) element 14. The linear conductors 3, 5a-5e are transparent or sufficiently thin so as to not hide or dim the image generated on the display element 14. The linear conductors 3, 5a-5e may be attached to the transparent plates 20, 22 by a variety of methods, including for example, lithographic processes, adhesives, sputtering and plating.

Figure 2B:
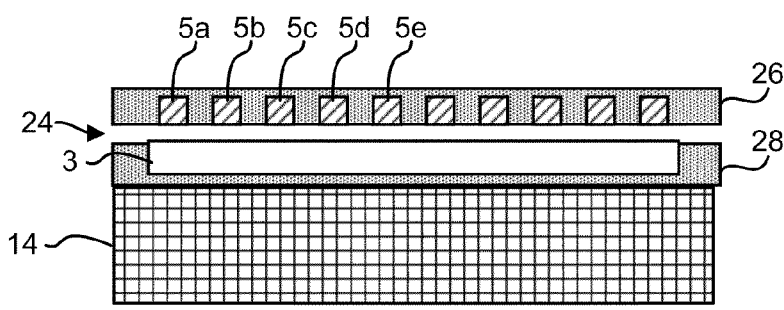
Figure 3A:
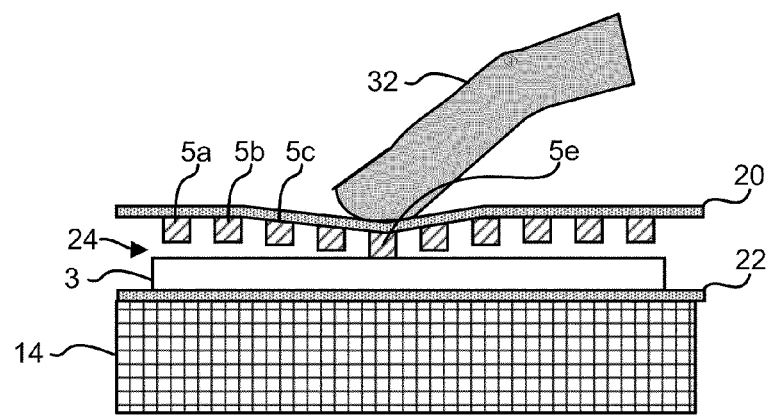
FIGS. 3A through 3C are cross-sectional diagrams of the portion of a conductive multi-touch touchscreen panel illustrated in FIGS. 2A through 2C illustrating activation by a finger touch.
Figure 3B:
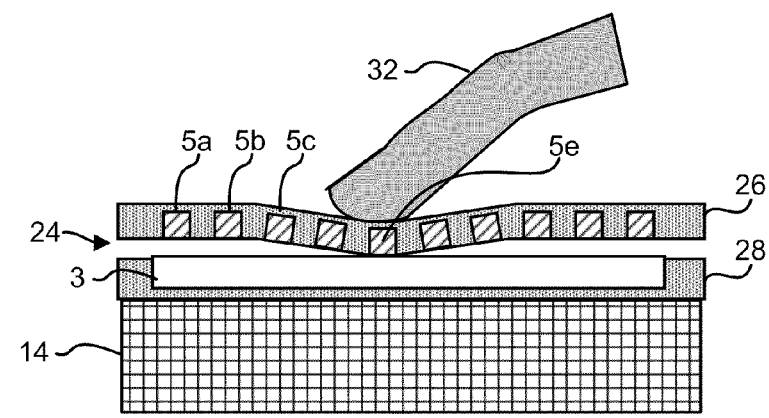
Figure 3C:
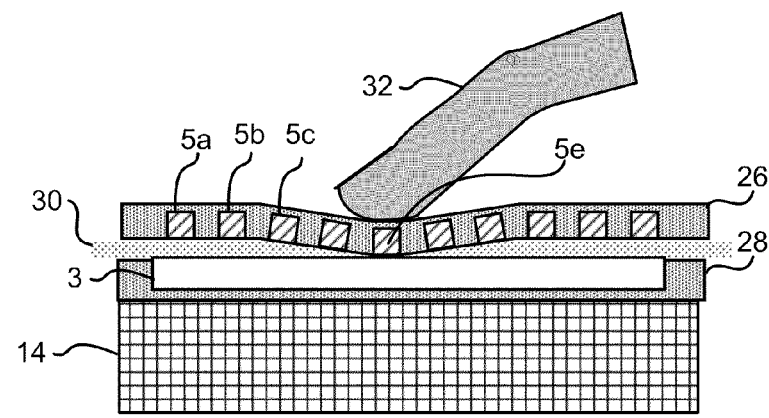

FIG. 2B shows an alternative touchscreen display embodiment in which each array is embedded within a transparent support member 26, 28. The transparent support member 26, 28 may be glass, plastic, polyurethane, or other semi rigid transparent material. In this embodiment, each transparent support member 26, 28 can provide lateral support to linear conductors 3, 5a-5e to help keep them in place. As with the embodiment illustrated in FIG. 2A, the transparent support members 26, 28 are arranged in the panel 1 so that there is a gap 24 between them which electrically isolates the two arrays of linear conductors from each other. Also, the transparent support members 26, 28 are positioned above an image generating element, such as an LCD display 14, thereby forming a touchscreen display panel.

Figure 2C:
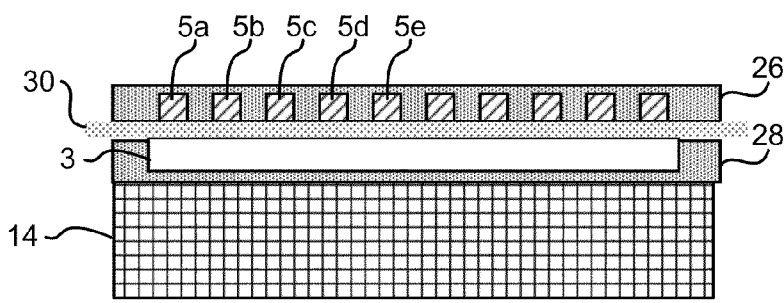

FIG. 2C shows another alternative touchscreen display embodiment which includes a nonconductive separator material 30 positioned between the two transparent support members 26, 28. The nonconductive separator material 30 may be a transparent nonconductive liquid, such as silicone, or a compressive, transparent, nonconductive solid, such as a porous plastic. The nonconductive separator material 30 can help to electrically isolate the linear conductors 3, 5a-5e when the panel is not being touched. This embodiment may simplify the structure of the panel by reducing the amount of lateral support that is required for the transparent support members 26, 28 or transparent plates 20, 22. While FIG. 2C shows the nonconductive separator material 30 spanning the entire area between the two transparent support members 26, 28, the nonconductive separator material 30 may alternatively be provided in limited areas or spots, such as small columns or bumps in between intersections of the two arrays of linear conductors 3, 5a-5e.

FIG. 3A illustrates how the embodiment shown in FIG. 2A responds to a touch by a finger 32. Pressure applied by a finger 32, stylus or other object causes the transparent plate 20 to deform. This brings one or more linear conductors 5e in the second array into electrical contact with a linear conductor 3 in the first array. As a result, current can flow between the contacting linear conductors 3, 5e and their voltage level eventually becomes equal. However, other linear conductors 5a-5d remain electrically isolated from the opposing array of linear conductors (not visible in FIG. 3A). When finger pressure is removed, the transparent plate 20 rebounds into the configuration illustrated in FIG. 2A, thereby breaking the electrical connection between the two linear conductors 3, 5e.

Similarly, FIG. 3B illustrates how the embodiment shown in FIG. 2B responds to a finger 32 press. Pressure applied by a finger 32, stylus or other object causes the transparent plate 20 to deform. This brings one or more linear conductors 5e into electrical contact with a linear conductor 3 in the opposing array. As a result, current can flow between the contacting linear conductors 3, 5e, and their voltage level eventually becomes equal. When finger pressure is removed, the transparent support member 26 rebounds into the configuration illustrated in FIG. 2B, thereby breaking the electrical connection between the two linear conductors 3, 5e.

FIG. 3C illustrates how the embodiment shown in FIG. 2C responds to a finger 32 press. Pressure applied by a finger 32, stylus or other object causes the transparent plate 20 to deform. This deformation compresses or displaces the nonconductive separator material 30 allowing one or more linear conductors 5e to come into electrical contact with a linear conductor 3 in the opposing array. As a result, current can flow between the contacting linear conductors 3, 5e and their voltage level eventually becomes equal. In an embodiment, compression of the nonconductive separator material 30 reduces its electrical resistance, thereby allowing electrical current to flow between opposing linear conductors 3, 5e even if the two linear conductors do not make physical contact. When finger pressure is removed, elastic or hydrodynamic pressure from the nonconductive separator material 30 forces help to push apart the transparent support members 26, 28, returning the plate to the configuration illustrated in FIG. 2C and breaking the electrical connection between the two linear conductors 3, 5e.

Embodiments of a multi-touch touch pad user input device are structurally very similar to the structures described above and illustrated in FIGS. 2A through 3C with the exceptions that the cover member 20 or 26 and support plate member 22, 28 need not be transparent and there is no need for a display element 14. With these exceptions, the descriptions above with reference to FIGS. 2A through 3C also apply to touch pad user input device embodiments.

As mentioned above, narrow linear conductors 3, 5 can be applied to the surface of transparent plates 20, 22 using a number of well-known manufacturing techniques, such as photo lithographic and masked sputtering deposition methods employed in integrated circuit manufacturing. By way of example, a photo-sensitive etch-resistant ("photoresist") layer can be applied to a transparent plate 20 such as by using spin forming methods. Once the photoresist layer has been cured, it can be exposed to ultraviolet light shone through a mask which limits exposure of the photoresist to thin lines of light. The exposed lines of the photoresist layer can then be removed with a solvent, thereby exposing the surface of the transparent plate 20. Conductive material, such as metal (e.g., gold, copper or silver), metal alloys (e.g., tin-aluminum), metal oxides (e.g., indium-tin oxide (ITO)) or other conductive materials such as carbon nanotubes, may then be deposited on the exposed portions of the transparent plate 20 using chemical vapor deposition (CVD), electron beam evaporation, physical vapor deposition (PVD), ion beam deposition, sputter deposition or other known methods. Finally, the remaining photoresist layer can be removed using chemical solvents, resulting in a transparent plate 20 having thin linear conductors 3, 5 adhered to the surface is illustrated in FIG. 2A.

As another example fabrication method, narrow linear conductors 3, 5 can be applied to the surface of transparent plates 20, 22 using sputter deposition through a screen or mask that limits deposition of the conductive material (e.g., ITO) into narrow lines or films.

In a similar manner, the linear conductors 3, 5 may be deposited or embedded within a transparent support member 26, 28 as illustrated in FIG. 2B using photo lithographic methods. For example, a photoresist layer may be applied to a transparent support member 26 and cured before being exposed to ultraviolet light shone through a mask. As described above, the mask limits exposure of the photoresist to thin parallel lines. The exposed portions of the photoresist layer can be removed with a solvent to expose the underlying surface of the transparent support member 26. The transparent support member 26 can then be exposed to an etching solvent which removes a portion of the exposed transparent support member 26. The portions of the transparent support member 26 covered by the remaining photoresist are protected from etching. As a result, a trench is formed in the transparent support member 26 along each of the lines exposed to ultraviolet light through the mask. These trenches can be filled with conductive material, such as metal, a metal alloy or metal oxides using CVD, PVD, electron beam evaporation, ion beam deposition, sputter deposition or other methods as described above. Finally, the remaining photoresist layer can be removed using chemical solvents to reveal a transparent support member 26 having thin linear conductors 3, 5 embedded within the surface as illustrated in FIG. 2B.

The transparent plates 20, 22 and transparent support members 26, 28 can be positioned in close proximity to each other using a variety of structural methods known in the computer display arts. For example, the edges of the transparent plates 20, 22 or transparent support members 26, 28 can be retained in a rigid frame configured to hold the plates or members in position. As another example, spacers may be included between the plates or members at various points across the area of the panel to retain the desired gap 24. As a further example, both edge retention and spacers may be used to maintain the desired gap 24 between transparent plates 20, 22 or transparent support members 26, 28.

While FIGS. 1A-1D and the other figures show a portion of a conductive multi-touch touch pad or touchscreen panel including four horizontal and four vertical linear conductors 3a-3b, 5a-5b, a production panel may include a very large number of conductive lines. Further, as described more fully below with reference to FIG. 9, multiple conductive multi-touch touch pad or touchscreen panels can be positioned side by side to create a larger panel.

FIGS. 4A-4D illustrate an embodiment process for reading out touch locations on an embodiment of a conductive multi-touch touch pad or touchscreen panel in which a voltage is connected to horizontal lines 3a-3d and a comparator reads out columns similar to the embodiment illustrated in FIG. 1A. The embodiment illustrated in FIGS. 4A-4D is provided as but one example of alternative read out processes. Similar sequential scanning techniques may be implemented to read out touch locations on multi-touch touch pads or touchscreen panels configured like the embodiments illustrated in FIGS. 1B-1D. In the embodiment illustrated in FIGS. 4A-4D, a single comparator circuit 7 is used to detect voltage that would result when an electrical path to the voltage source is formed by the contact between a horizontal and vertical linear conductor 3, 5. This readout can be accomplished in a series of steps as illustrated in FIGS. 4A-4D. In a first step illustrated in FIG. 4A, a voltage source $V_{DD}$ is applied to a first horizontal linear conductor 3a (such as by closing a switch 11a illustrated in FIG. 1) while a comparator circuit 7 and pull-down resistor/ground circuit 9 is connected to a first vertical linear conductor 5a. In the step illustrated in FIG. 4A the other horizontal linear conductors 3b-3c are not connected to any voltage source and instead are left in a high impedance ("Hi-Z") state. The comparator circuit 7 may be a circuit within the panel 1, within a separate circuit element, or within a circuit element included within a panel controller integrated circuit (IC) that is coupled to each of the vertical linear conductors 5a-5d. For example, the comparator circuit 7 may be a level-detector within a panel controller IC. The resistor 9 connected between the comparator circuit 7 and ground ensures that the connected vertical linear conductor 5a is pull-down to near zero voltage except when there is an electrical connection to the voltage source $V_{DD}$ by a contact with an energized horizontal linear conductor 3a.

The comparator circuit 7 (or level-detector inside the controller IC) is connected to each vertical linear conductor 5a-5d in sequence to determine whether the linear conductor is at $V_{DD}$ or ground ("gnd") voltage level. For example, if the comparator circuit 7 determines that the vertical linear conductor 5a is at a high voltage state (i.e., at or near $V_{DD}$) this indicates that there is an electrical contact between the first horizontal linear conductor 3a and the first vertical linear conductor 5a. Thus, a high voltage sensed by the comparator circuit in FIG. 4A would indicate that the panel 1 is being touch at or near the intersection of linear conductors 3a and 5a. Similarly, a low voltage sensed by the comparator circuit in FIG. 4A would indicate that the panel 1 is not being touched at or near the intersection of linear conductors 3a and 5a. The read out of high or low voltage may be indicated or processed as either a "1" or "0" value.

Figure 4A:
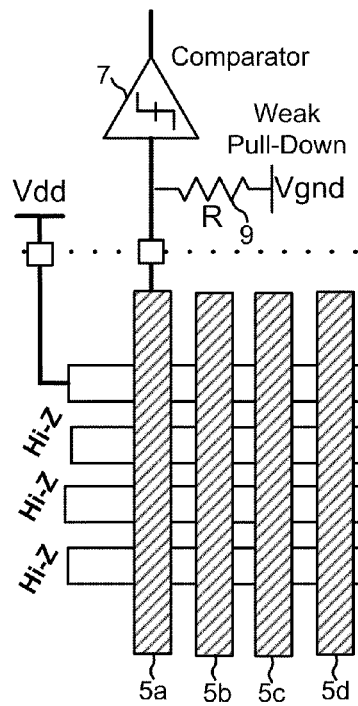
FIGS. 4A through 4D are component diagrams of a portion of a conductive multi-touch touch pad or touchscreen panel according to an embodiment illustrating a touch position read sequence.
Figure 4B:
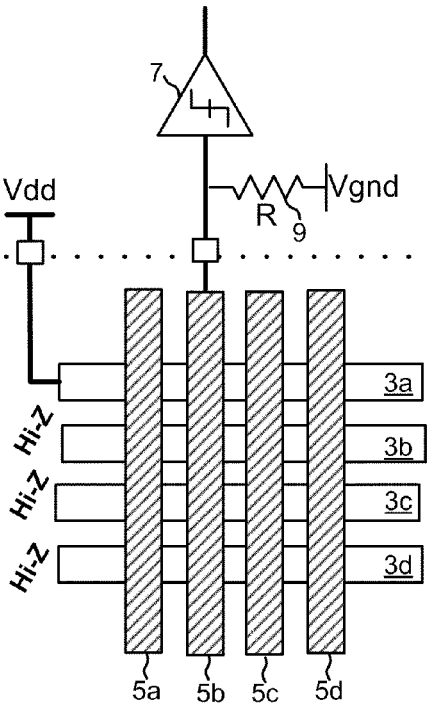
Figure 4C:
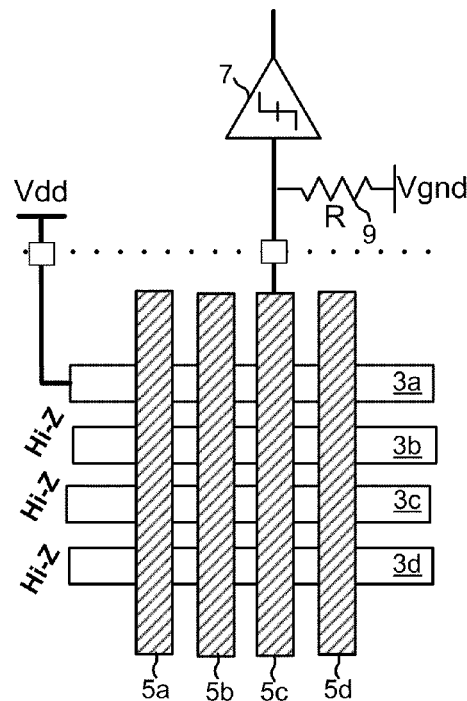
Figure 4D:
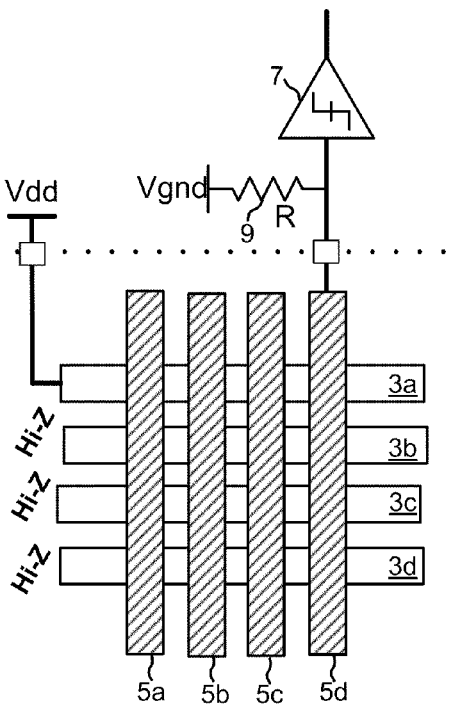

In the next step illustrated in FIG. 4B, the comparator circuit 7 is connected to the next vertical linear conductor 5b to determine whether that linear conductor is at high ($V_{DD}$) or low ("gnd") voltage. Again, detection of high voltage by the comparator circuit 7 would indicate an electrical contact (and thus a panel touch) at the intersection of linear conductors 3a and 5b, while detection of low/no voltage would indicate no electrical connection (and thus no touch) at the intersection. In a similar manner, the steps of connecting the comparator circuit 7 to a vertical linear conductor and determining its voltage level are repeated for each of the other linear conductors in the panel 1 as illustrated in FIGS. 4C and 4D.

Once all of the vertical linear conductors 5a-5d within a panel have been measured by the comparator circuit 7, the voltage source is connected to the next horizontal linear conductor 3b and disconnected from the first linear conductor 3a. The steps of individually determining the level of voltage on each of the vertical linear conductors 5a-5d are repeated to determine if any of the vertical linear conductors are in electrical connection with horizontal linear conductor 3b.

Figure 9:
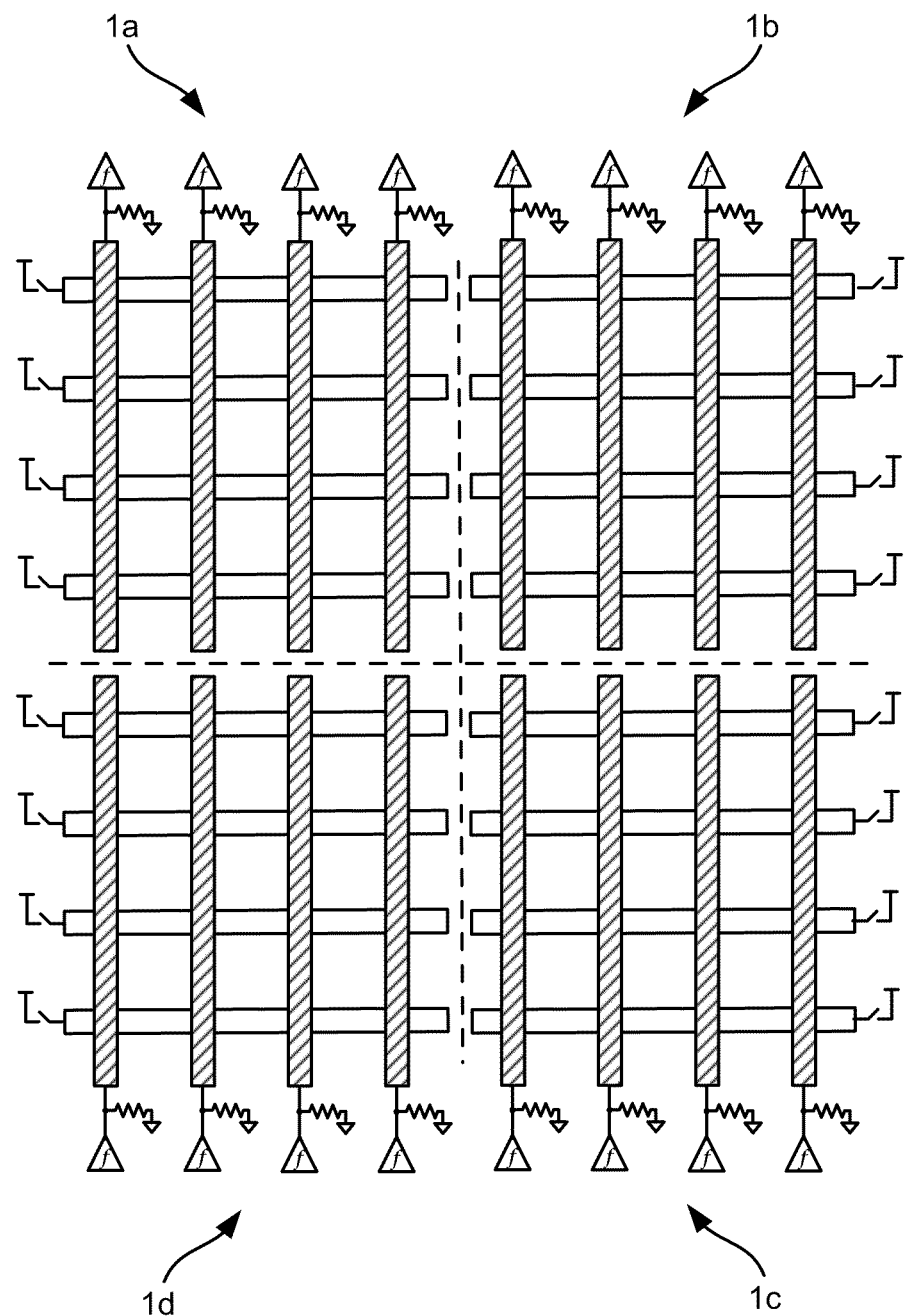
FIG. 9 is a component diagram of a multi-component multi-touch touch pad or touchscreen panel according to an embodiment.

This process continues until all of the horizontal linear conductors 3a-3d have been energized and all of the vertical linear conductors 5a-5d have been sensed by the comparator circuit 7. When multiple conductive multi-touch touch pad or touchscreen panels are combined into a larger composite panel as illustrated in FIG. 9, the sequential reading of the linear conductors 3, 5 may be conducted in parallel across all of the included panels.

Any known type of comparator circuit may be used for detecting the presence of voltage on a vertical conducting linear conductor 5a-5d. In an embodiment, a simple inverter circuit may be used as the comparator circuit 7.

Figure 5A:
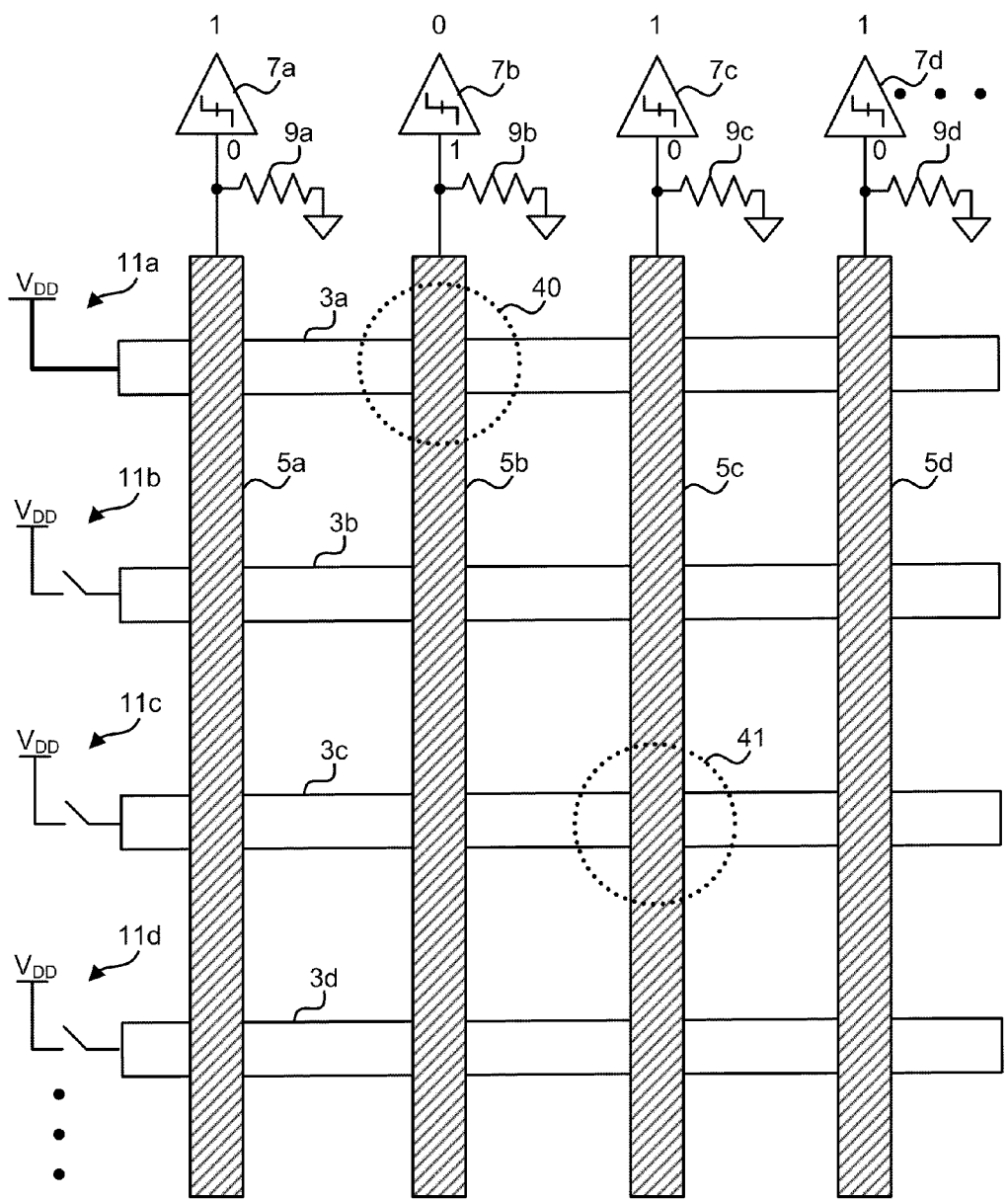
FIGS. 5A through 5C are component diagrams of a portion of a conductive multi-touch touch pad or touchscreen panel according to another embodiment illustrating a multi-touch position read sequence.

In alternative embodiment, each vertical linear conductor 5a-5d may be coupled to a dedicated comparator circuit 7a-7b and pull-down resister resistors circuit 9a-9d, such as in the manner illustrated in FIGS. 1A and 5A. Inverters are relatively inexpensive and simple circuits which can be implemented within integrated circuits. Thus, a conductive multi-touch touch pad or touchscreen panel can be configured with an inverter connected to each vertical connective linear conductor 5a-5d as illustrated in FIG. 1 instead of using a single more complex comparator circuit 7 that is sequentially connected to each vertical linear conductor as illustrated in FIGS. 4A-4D. In this embodiment, each comparator circuit 7a-7d can provide a near continuous output indicating whether any vertical linear conductor is connected to a horizontal linear conductor coupled to a voltage source.

Figure 5B:
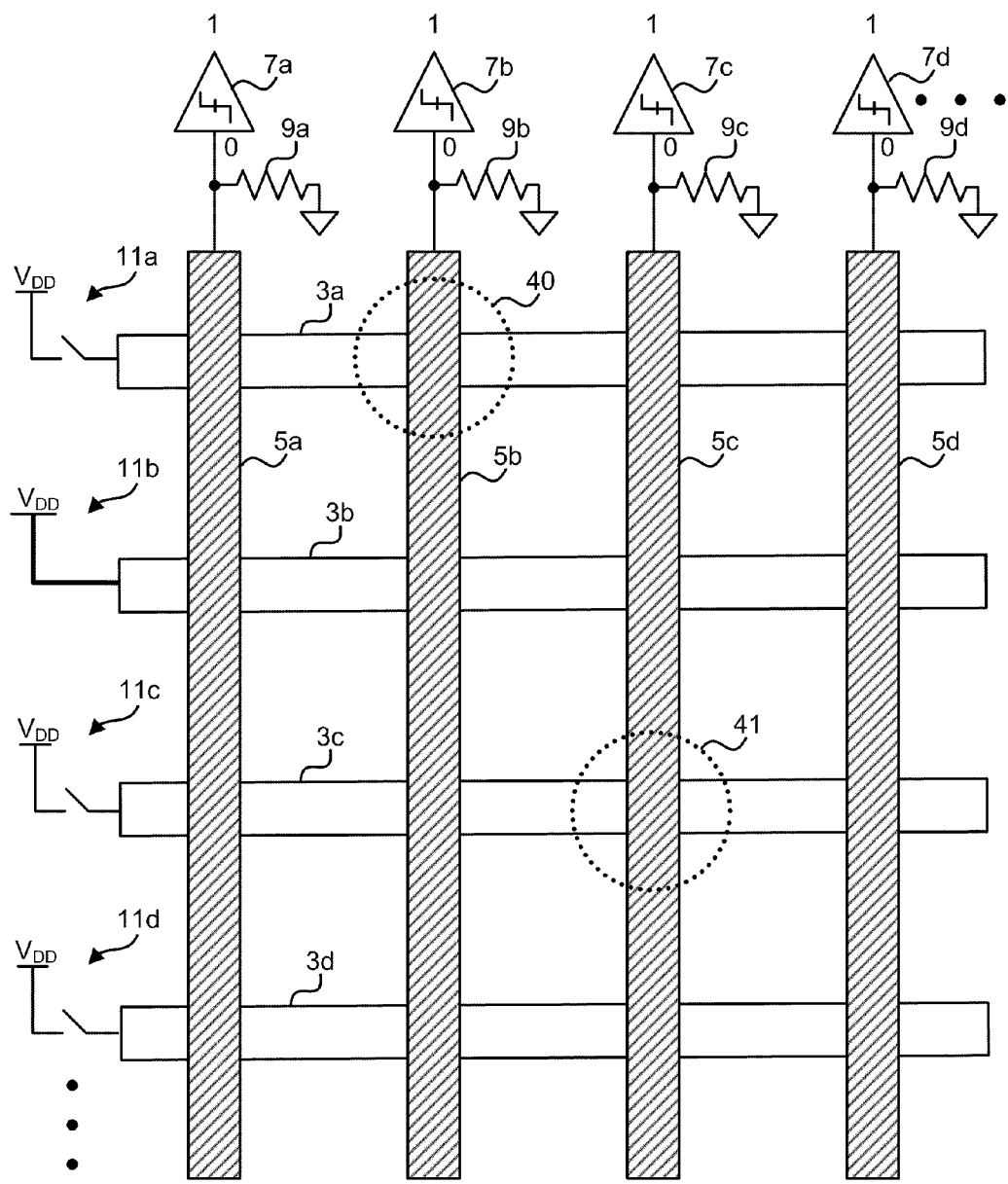
Figure 5C:
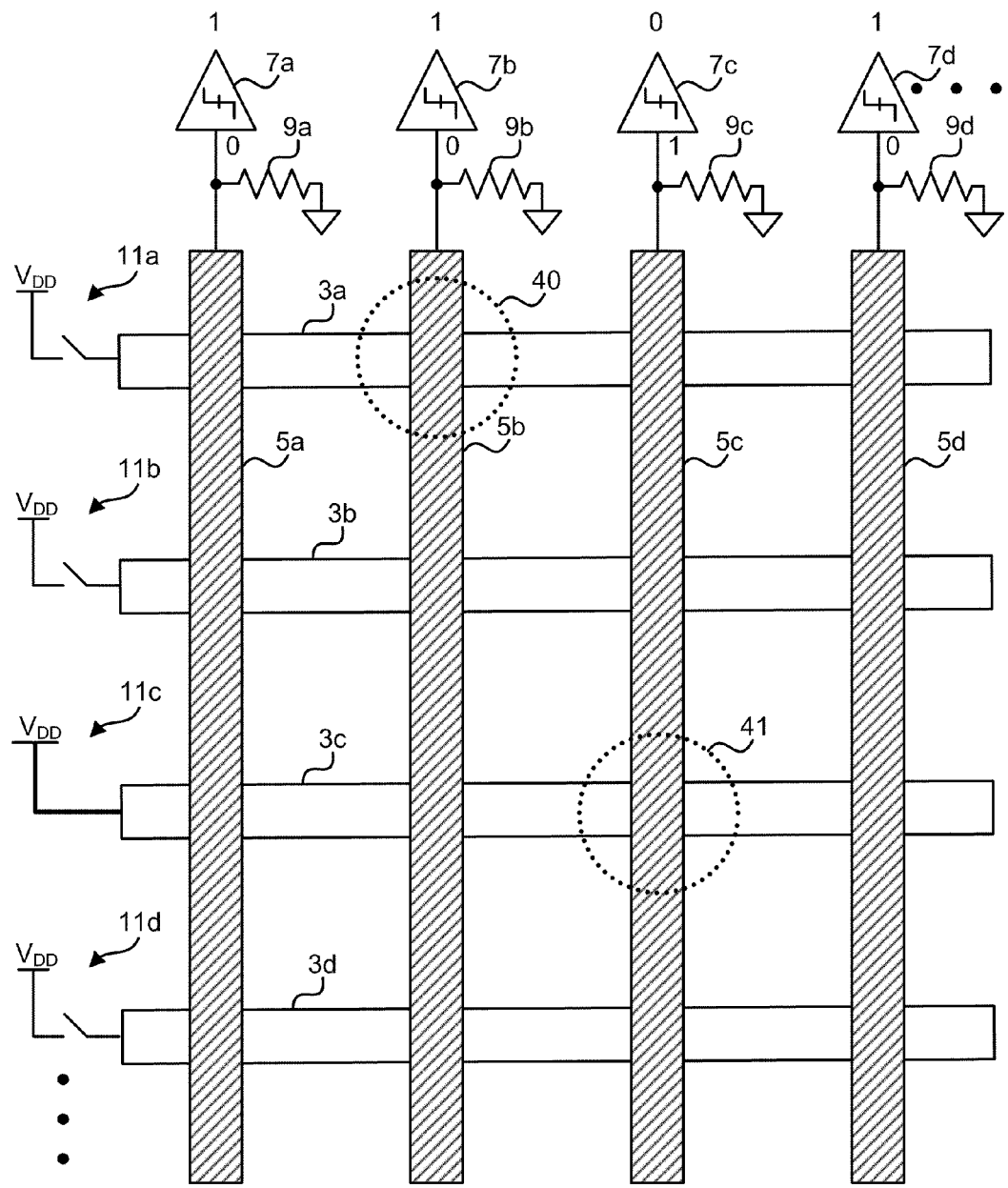

An example process for reading out touch positions of the panel embodiment illustrated in FIG. 1A is illustrated in FIGS. 5A-5C. The processes for reading out touch positions of the panel embodiments illustrated in FIG. 1B-1D are conceptually very similar. In FIGS. 5A-5C, two example finger touches indicated by the dashed circles 40, 41. In a first step, the voltage source $V_{DD}$ is connected to a first horizontal linear conductor 3a, such as by closing a switch 11a. Any vertical linear conductor 5a-5d in electrical contact with the energized horizontal linear conductor will exhibit a voltage approaching that of the source $V_{DD}$ which can be detected by the attached comparator circuit 7a-7d. In FIG. 5A the voltage source $V_{DD}$ has been connected to the first horizontal linear conductor 3a by the closure of the connected switch 11a. The finger touch 40 at the intersection of horizontal linear conductor 3a with vertical linear conductor 5b causes the two linear conductors to make electrical contact which allows electricity to flow from the voltage source $V_{DD}$ to the inverter 7b where it may be sensed as a positive voltage or a "1" signal. In response, the inverter 7b outputs the opposite digital value, i.e., a "0" signal or zero voltage. Since the other vertical linear conductors 5a, 5c, 5d are not touched, and therefore are not in electrical contact with the energized horizontal linear conductor 3a, they exhibit near ground voltage (i.e., approximately 0 voltage) due to the connected pull-down resistors 9a, 9c, 9d which are each coupled to ground. As a result, the comparators 7a, 7c, 7d connected to the other vertical linear conductors 5a, 5c, 5d sense zero voltage or a "0" signal. In response, the inverters 7a, 7c, 7d output the opposite digital value, i.e., a "1" signal or near $V_{DD}$ voltage. Thus, as illustrated in FIG. 5A, a touch at position 40 will result in the inverters 7a-7d of the conductive multi-touch touch pad or touchscreen panel outputting the digital value "1011 . . . " when the voltage source $V_{DD}$ is connected to the first horizontal linear conductor 3a. The position of the finger touch 40 is then easily determined by a processor or state machine based upon knowing which one of the horizontal linear conductors 3a-3d is connected to the voltage source and the digital output from the inverters 7a-7d coupled to the vertical linear conductors 5a-5d.

The read process then proceeds by disconnecting the voltage source from the first horizontal conducting linear conductor 3a, such as by opening switch 11a, and connecting the voltage source to the next horizontal linear conductor 3b, such as by closing the switch 11b. In the example illustrated in FIG. 5B, there are no finger touches at the intersections between the second horizontal linear conductor 3b and any of the vertical linear conductors 5a-5d. Therefore, all of the vertical linear conductors 5a-5d are at or near ground voltage due to the connected pull-down resistors 9a-9d which is sensed by the respective inverters 7a-7d as a "0" signal. The inverters 7a-7d output the opposite digital value of "1" resulting in a panel digital output value of "1111 . . . " as shown in FIG. 5B.

The read process proceeds further by disconnecting the voltage source from the second horizontal conducting linear conductor 3b, such as by opening switch 11b, and connecting the voltage source to the next horizontal linear conductor 3c, such as by closing the switch 11c. In the example illustrated in FIG. 5C, there is a finger touch 41 at the intersection between the third horizontal linear conductor 3b and the third vertical linear conductor 5c. Therefore, the circuit established by the induced electrical contact between the third horizontal linear conductor 3b and the third vertical linear conductor 5c will raise the third vertical linear conductor 5c to near $V_{DD}$, which is sensed by the connected inverter 7c as a "1" signal. Meanwhile, the other vertical linear conductors 5a, 5b, 5d remain at or near ground voltage which is sensed by the respective inverters 7a, 7b, 7d as a "0" signal. The inverters 7a-7d output a digital value that is opposite that of the input resulting in a panel digital output value of "1101 . . . " as shown in FIG. 5C. Thus, the location of the finger touch 41 can be determined based upon the digital output value of the inverters 7a-7d connected to the vertical linear conductors 5a-5d in combination with information concerning the particular horizontal linear conductor 3b that is energized when those outputs are received.

To determine the positions of finger touches on the conductive multi-touch touch pad or touchscreen panel each of the horizontal linear conductors 3a-3d can be sequentially connected to the voltage source $V_{DD}$ while the digital outputs of the inverters 7a-7d coupled to the vertical linear conductors 5a-5d are received. In this manner, by quickly cycling through a sequence of connecting each of the horizontal linear conductors to the voltage source, the conductive multi-touch touch pad or touchscreen panel can be read out several times per second to detect movement of finger touches across the panel.

Figure 6A:
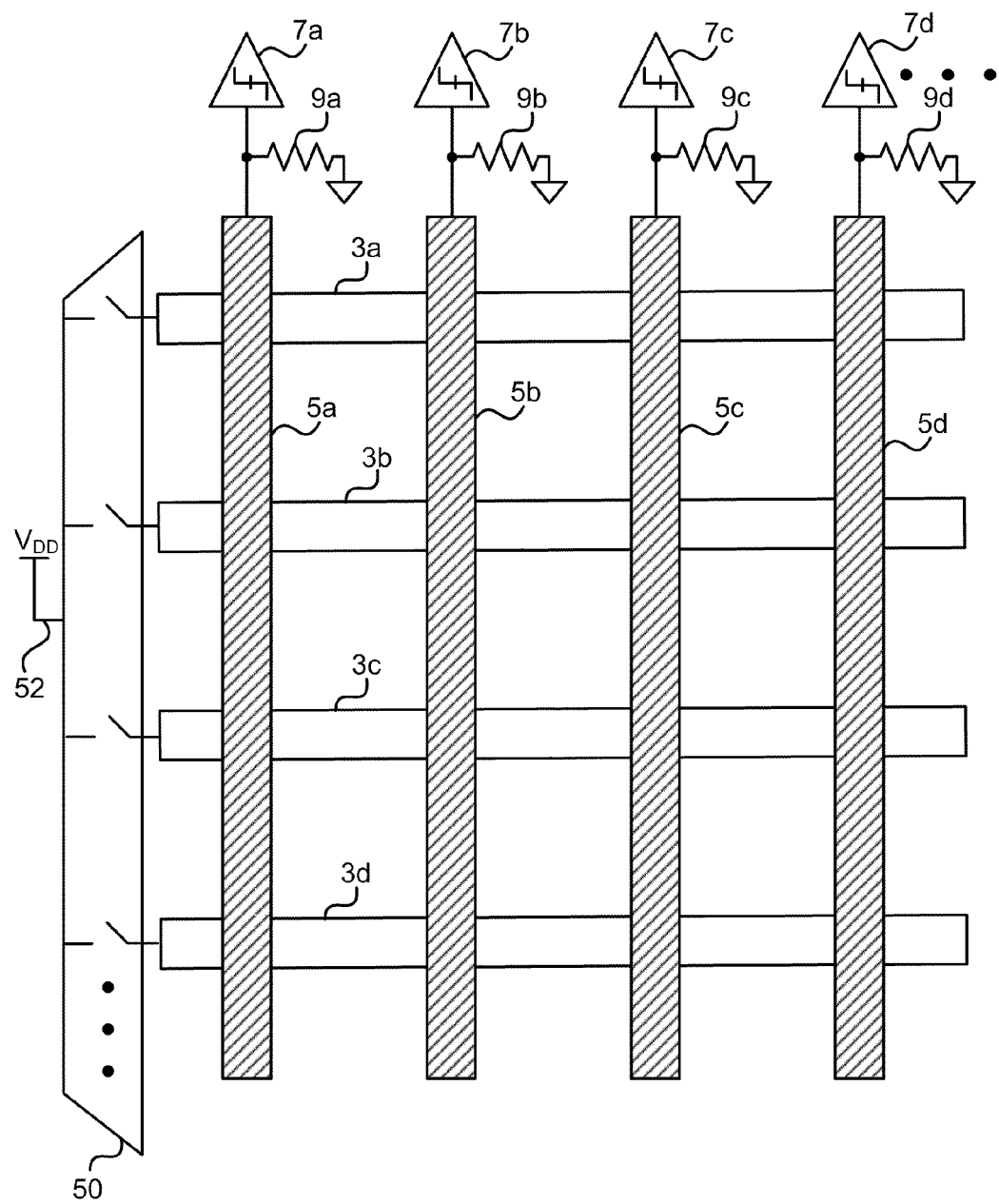
FIGS. 6A through 6H are component diagrams of a portion of a conductive multi-touch touch pad or touchscreen panel according to additional embodiments.
Figure 6B:
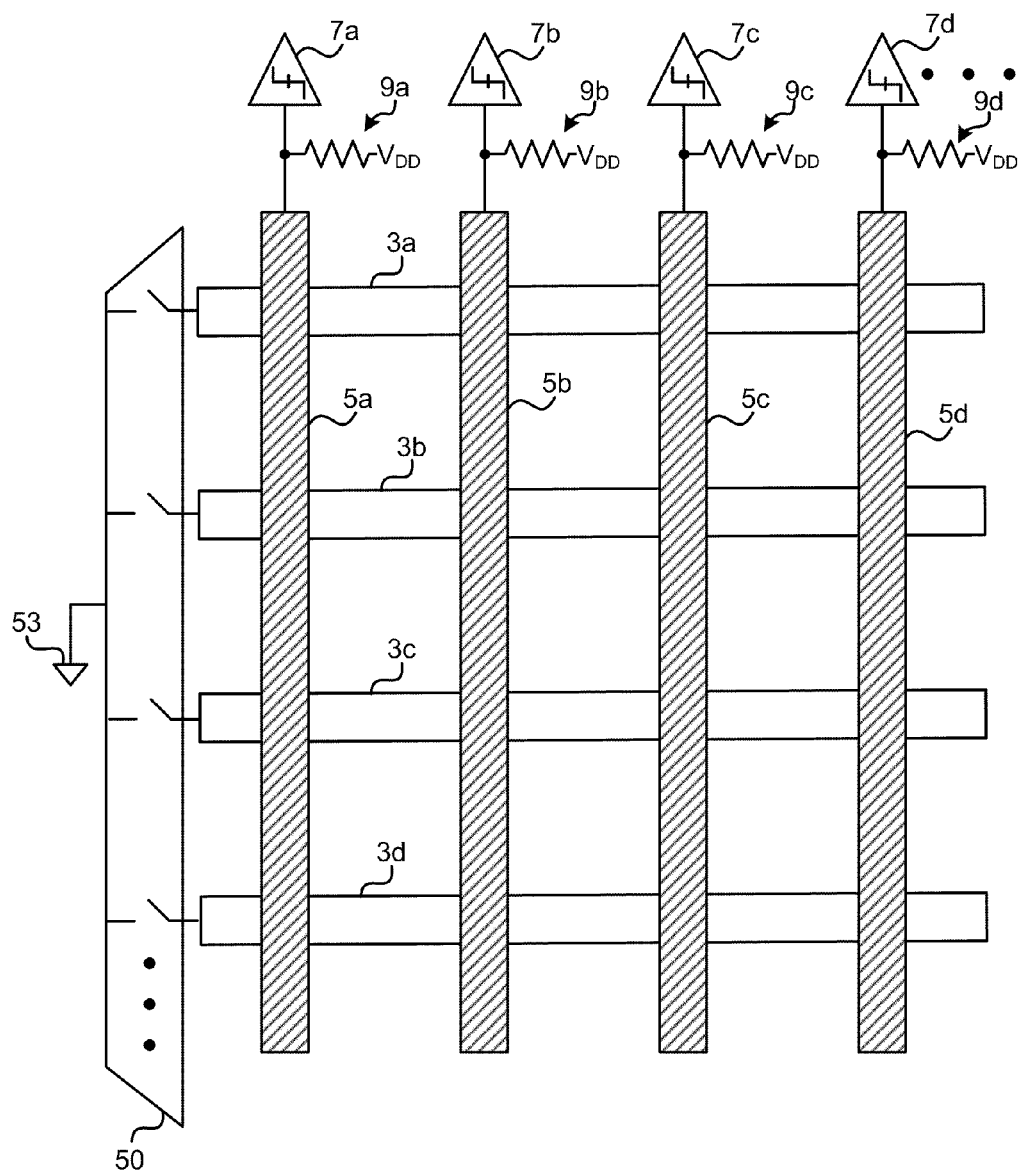

In an implementation of this embodiment illustrated in FIG. 6A, the individual switches 11a-11d can be replaced with a multiplexor circuit 50 which is coupled between the voltage source 52 and the horizontal linear conductors 3a-3d. As is well known in the electronic arts, a multiplexor circuit 50 can be configured to sequentially connect each of its outputs (which are connected to the horizontal linear conductors 3a-3d) to its input (which is connected to $V_{DD}$). In a similar manner, a multiplexor circuit 50 may be coupled between ground 53 and the horizontal linear conductors 3a-3d, with a voltage source $V_{DD}$ applied via weak resistors 9a-9d as illustrated in FIG. 6B. In these embodiments, the location of a finger touch to the panel can be determined based upon the inverter 7a-7d digital outputs in combination with the time of each read out, with the read out time being correlated to the multiplexor switching sequence and frequency.

Figure 6C:
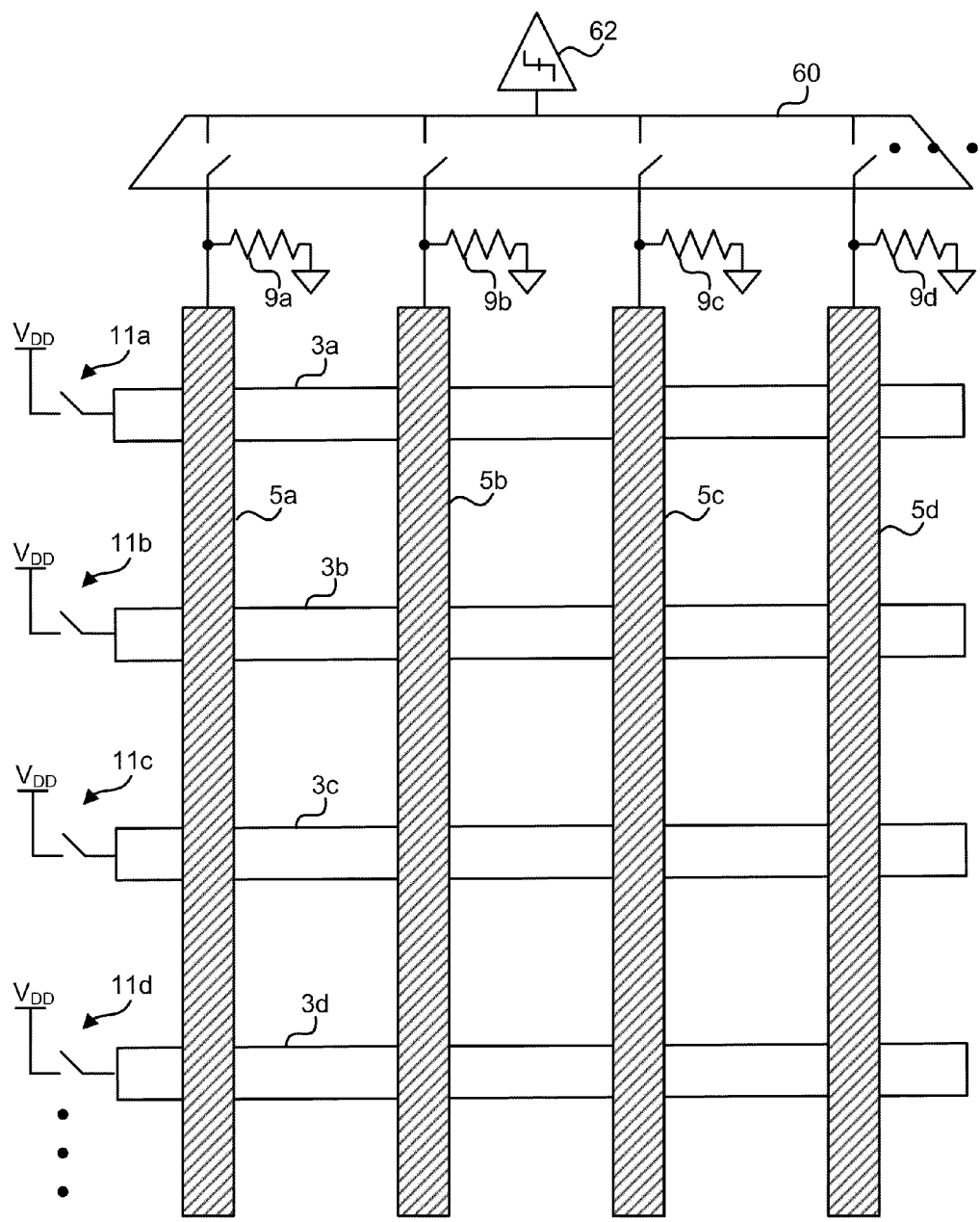
Figure 6D:
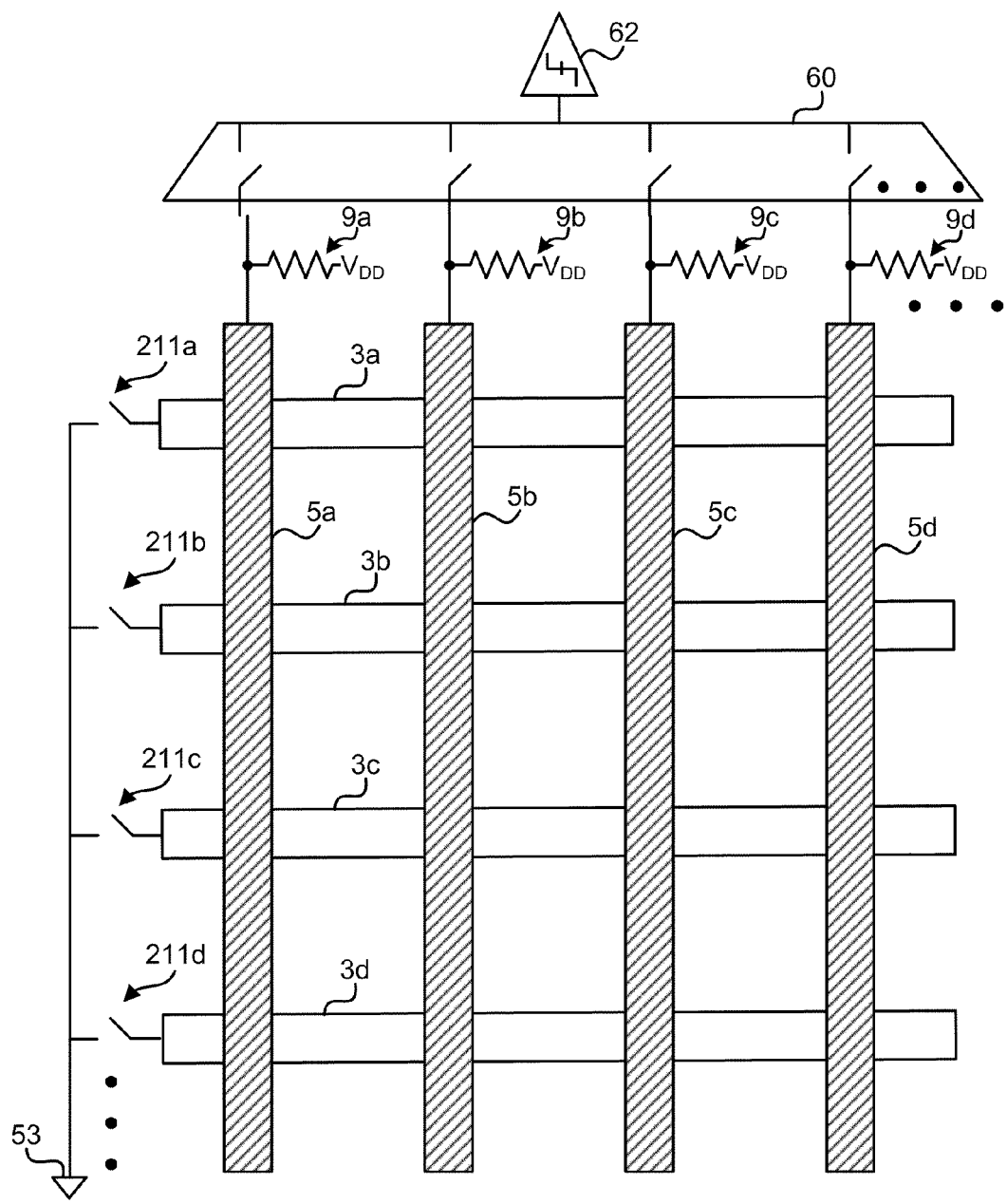

In a further implementation of this embodiment illustrated in FIGS. 6C and 6D, a multiplexor circuit 60 can be used to sequentially connect a single comparator circuit 62 to each vertical linear conductors 5a-5d. In these embodiments, the digital output from the panel is provided by the single comparator circuit 62 as a sequence of digital values (i.e., in the form of a serial output). Other than the serial nature of the output provided by a single comparator circuit 62, the position of a finger touch to the panel is determined in a manner very similar to that described above with reference to FIGS. 5A-C.

Figure 6E:
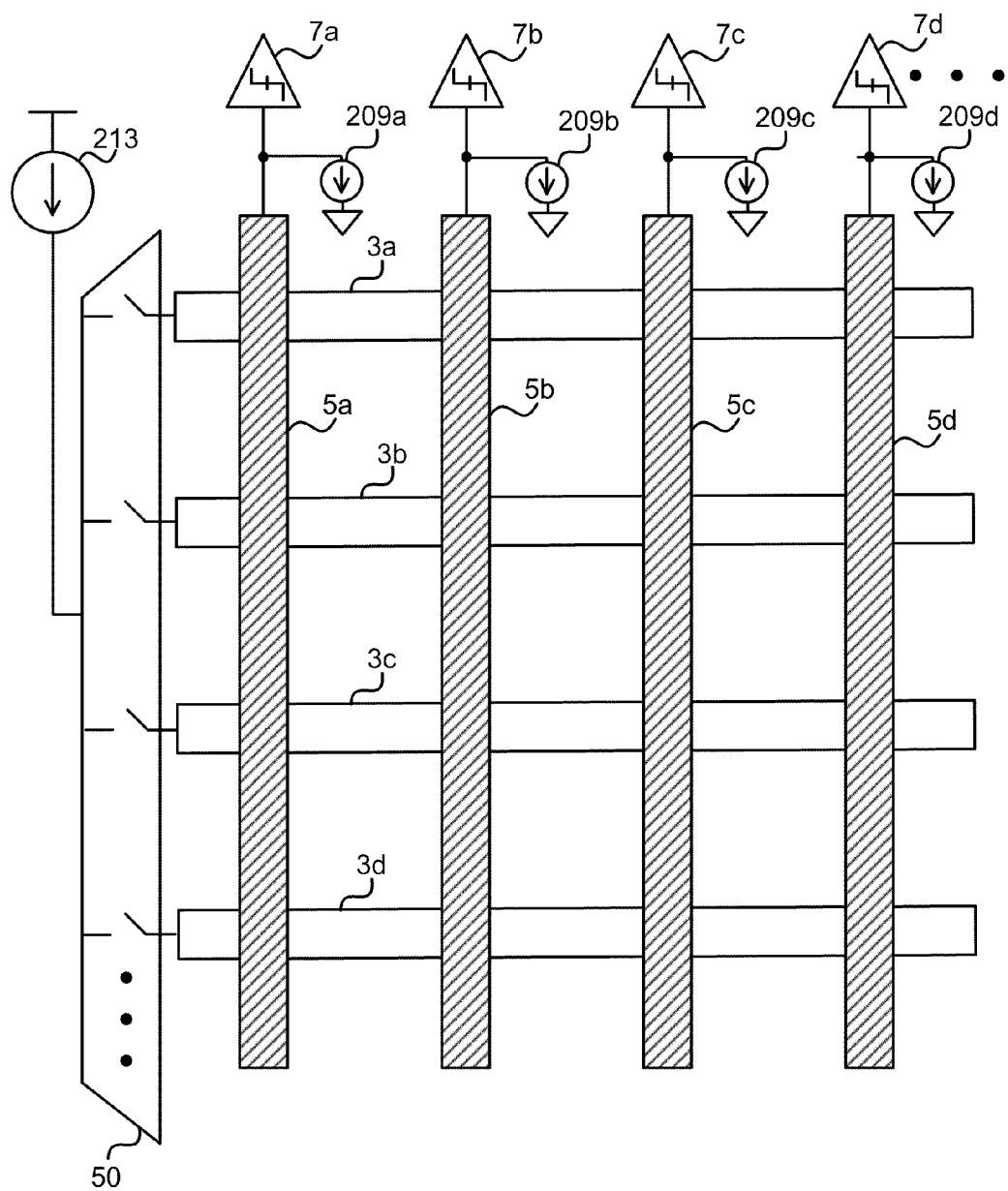
Figure 6F:
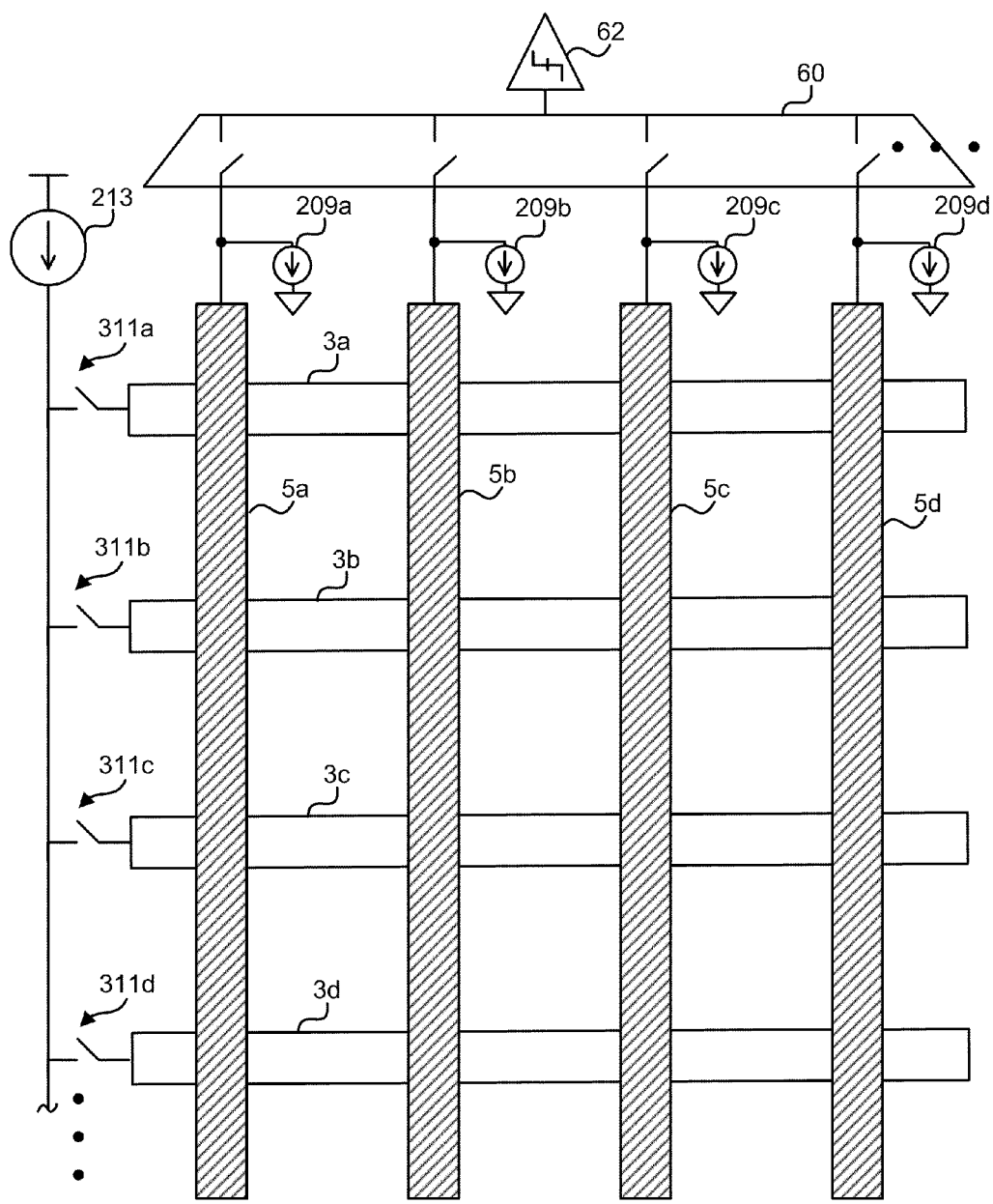
Figure 6G:
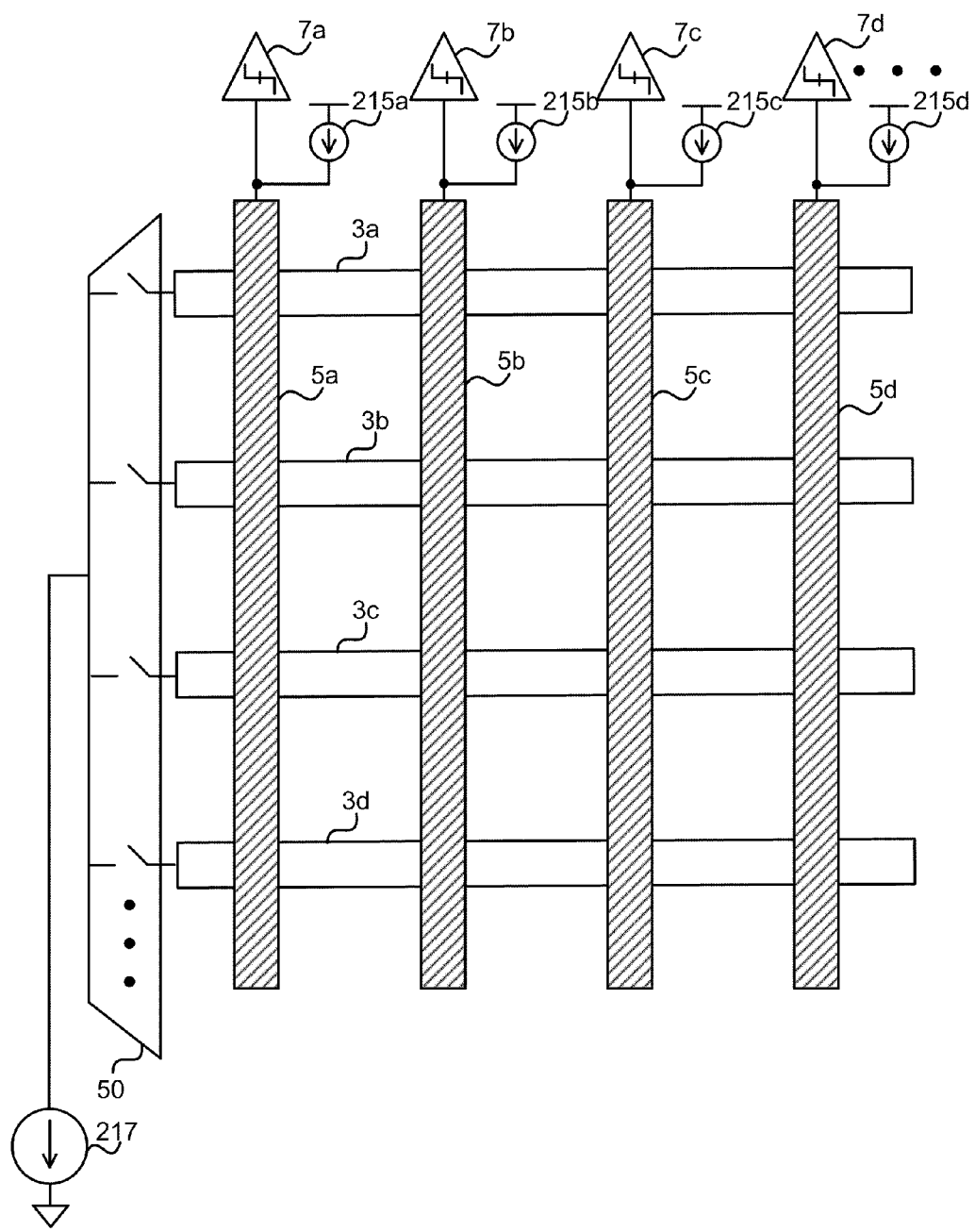
Figure 6H:
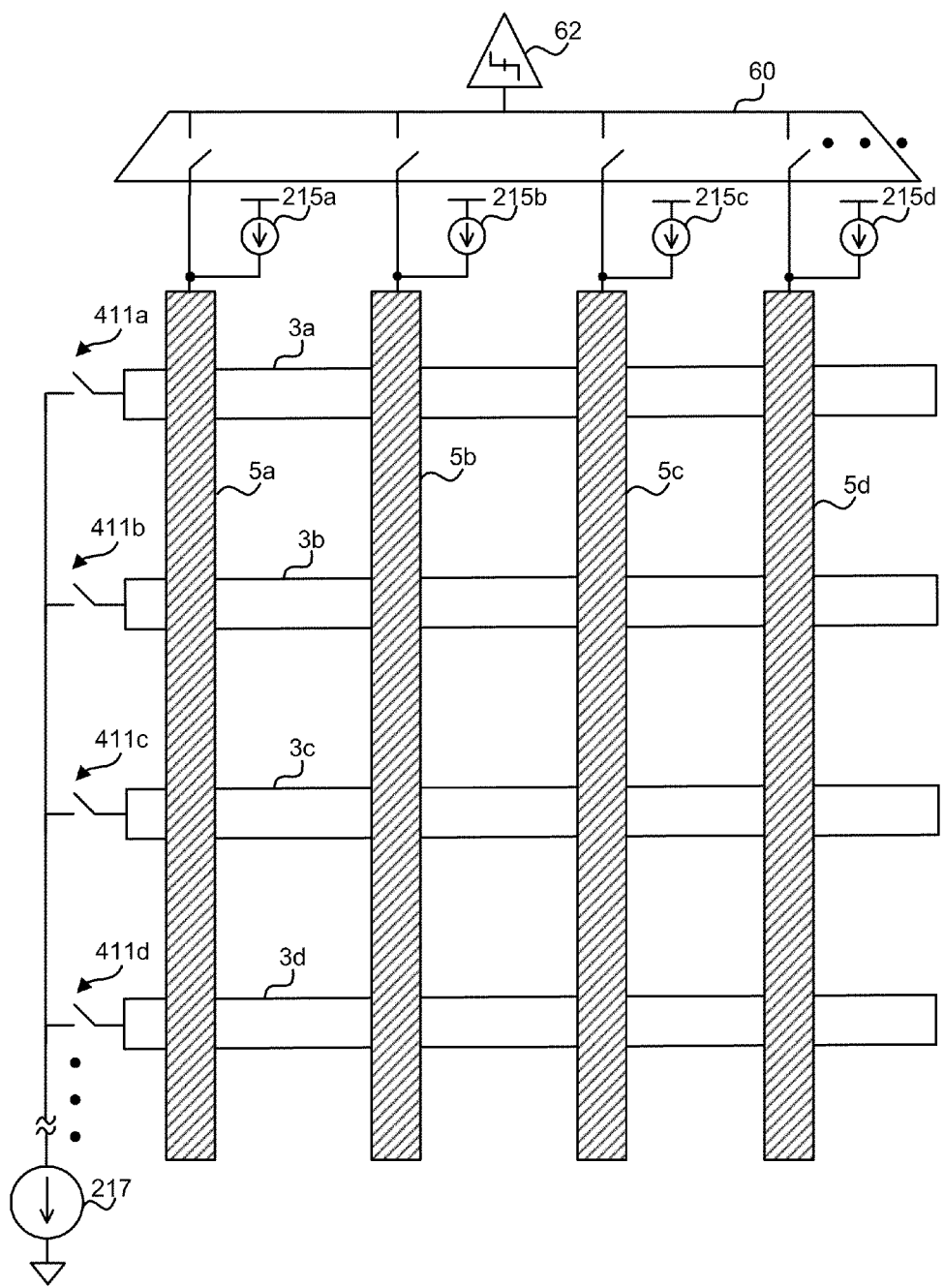

Similar to the panel embodiments which apply a voltage source illustrated in FIGS. 6A-6D, multiplexor circuits may also be implemented with panel embodiments which apply current sources as illustrated in FIGS. 6E-6H. In FIG. 6E a multiplexor circuit 50 is coupled between a strong current source 213 and the horizontal conductive lines 3a-3d while each of the vertical conductive lines 5a-5d are coupled to weak current sinks 209a-209d and comparator circuits 7a-7d. In FIG. 6F a multiplexor circuit 60 is coupled between a single comparator circuit 62 and the vertical conductive lines 5a-5d which are each coupled to weak current sinks 209a-209d, while the horizontal conductive lines 3a-3d are selectively coupled to a strong current source 213 via switches 311a-311d. In FIG. 6G a multiplexor circuit 50 is coupled between a strong current sink 215 and the horizontal conductive lines 3a-3d while each of the vertical conductive lines 5a-5d are coupled to weak current sources 215a-215d and comparator circuits 7a-7d. In FIG. 6H a multiplexor circuit 60 is coupled between a single comparator circuit 62 and the vertical conductive lines 5a-5d which are each coupled to weak current sources 215a-215d, while the horizontal conductive lines 3a-3d are selectively coupled to a strong current sink 217 via switches 411a-411d.

Figure 7A:
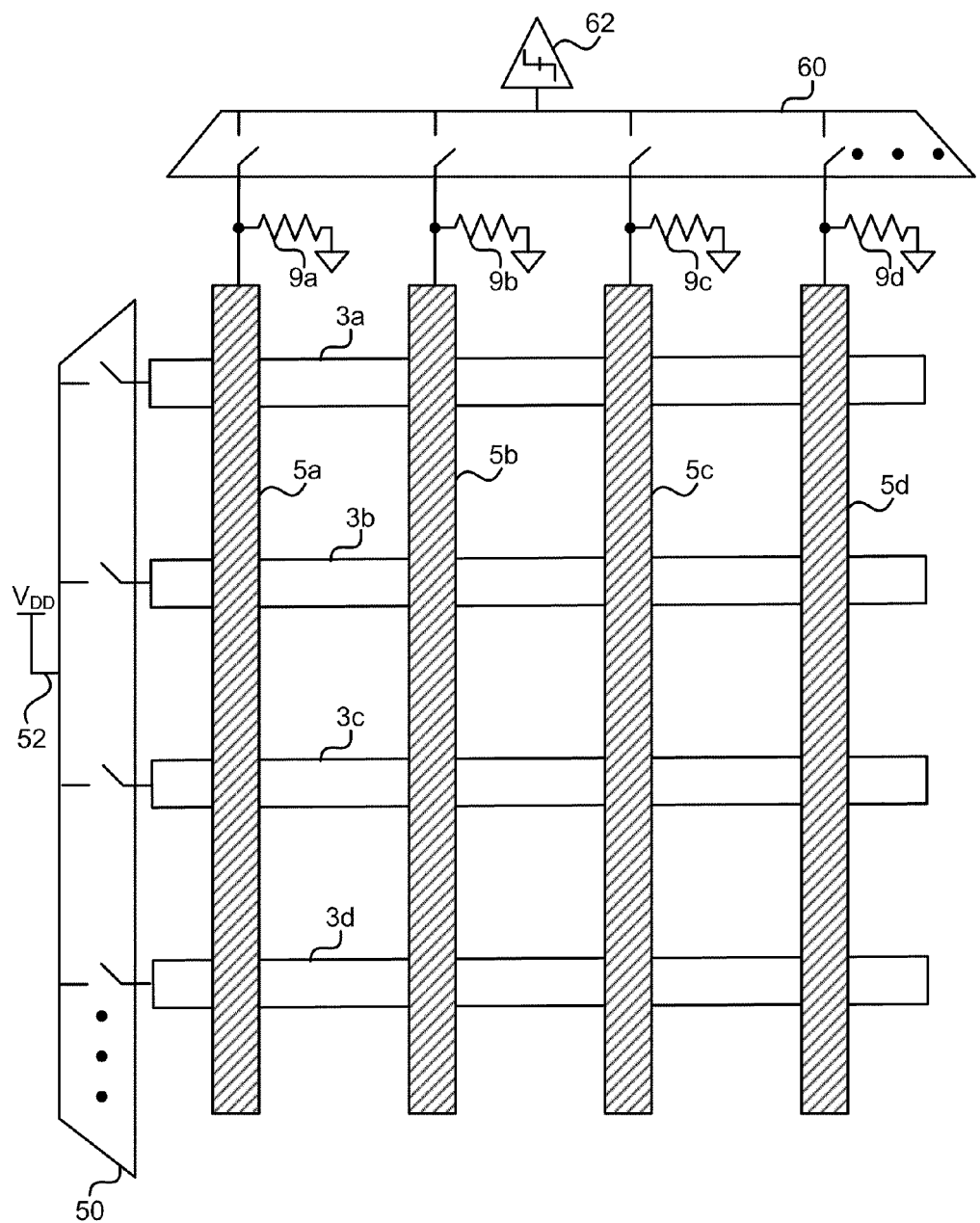
FIGS. 7A through 7D are component diagrams of a portion of a conductive multi-touch touch pad or touchscreen panel according to additional embodiment.

In yet a further implementation of this embodiment illustrated in FIG. 7A, a first multiplexor circuit 50 is coupled between the voltage source 52 and the horizontal linear conductors 3a-3d, and a second multiplexor circuit 60 is coupled between a single comparator circuit 62 and each of the vertical linear conductors 5a-5d which are each coupled to ground via weak resistors 9a-9d. In this embodiment, the switching frequency of the first multiplexor circuit 50 is configured to be slower than that of the second multiplexor circuit 60 such that each of the vertical linear conductors 5a-5d can be sensed by the comparator circuit 62 before the next horizontal linear conductor 3a-3d is connected to the voltage source by the first multiplexor circuit 50. A digital output from the panel illustrated in FIG. 7A is provided by the single comparator circuit 62 as a sequence of digital values (i.e., as a serial output). In this embodiment, the location of a finger touch to the panel can be determined based upon the panel's serial digital output in combination with the read time which can be correlated to the first multiplexor's switching sequence and frequency.

Figure 7B:
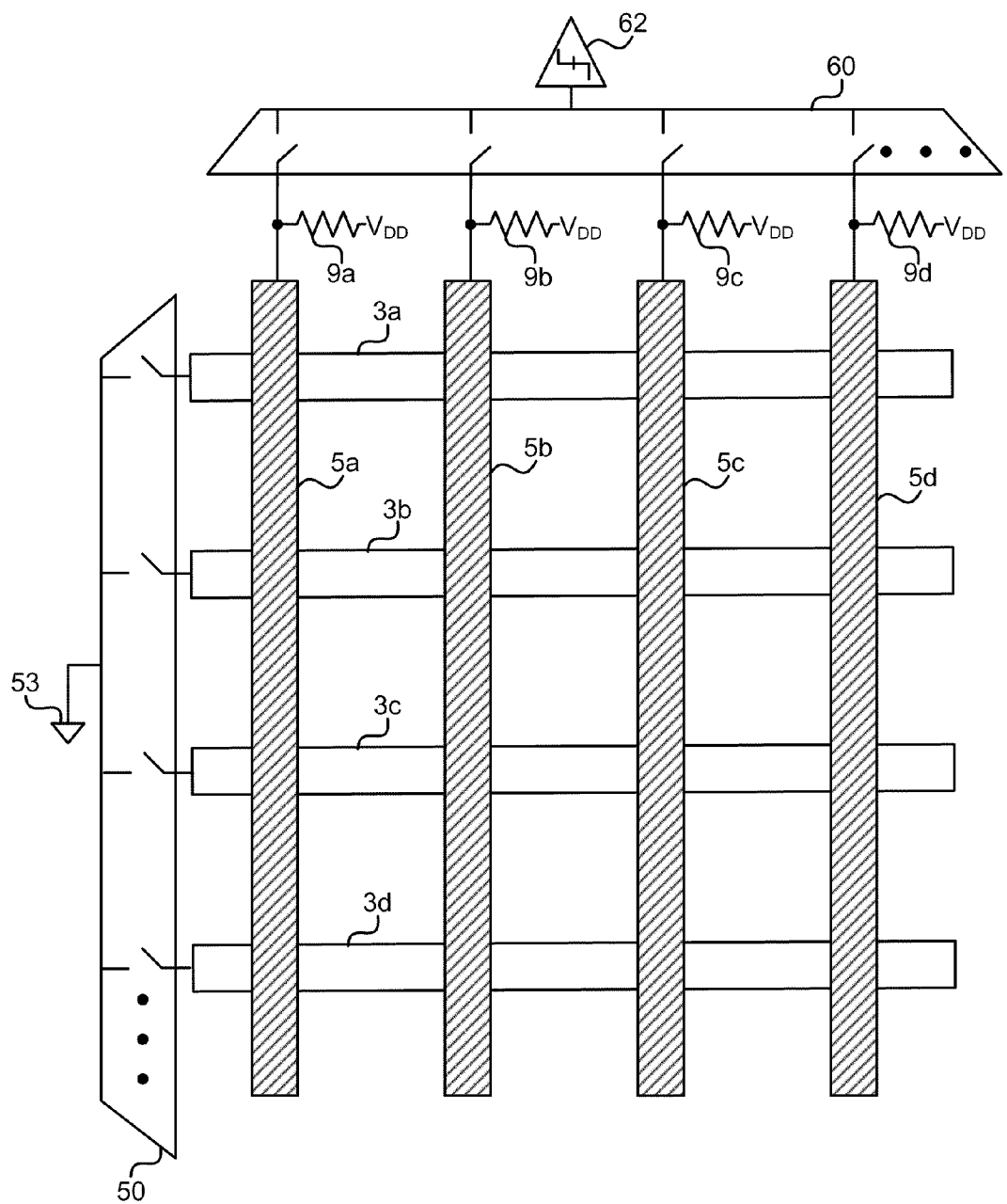
Figure 7C:
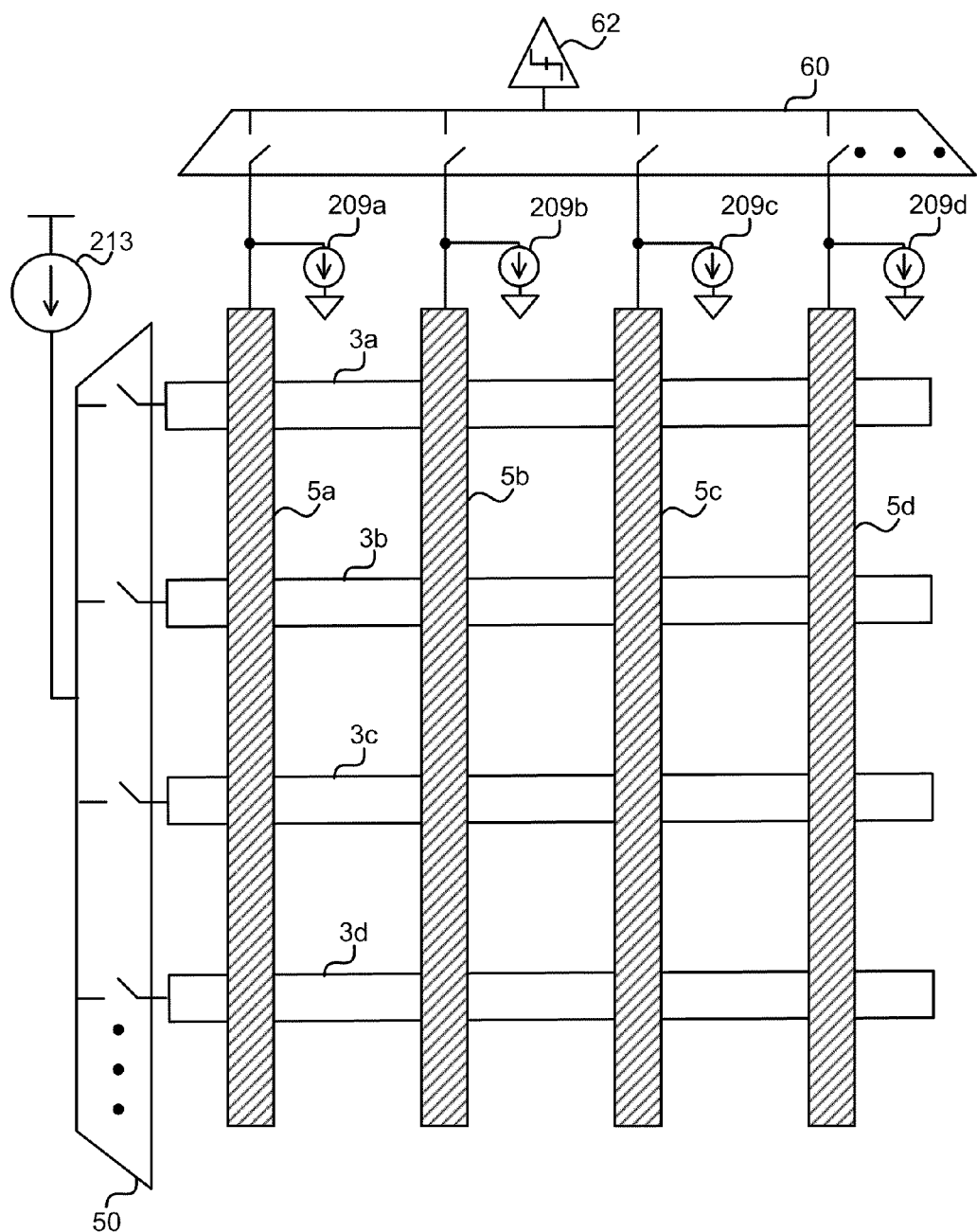
Figure 7D:
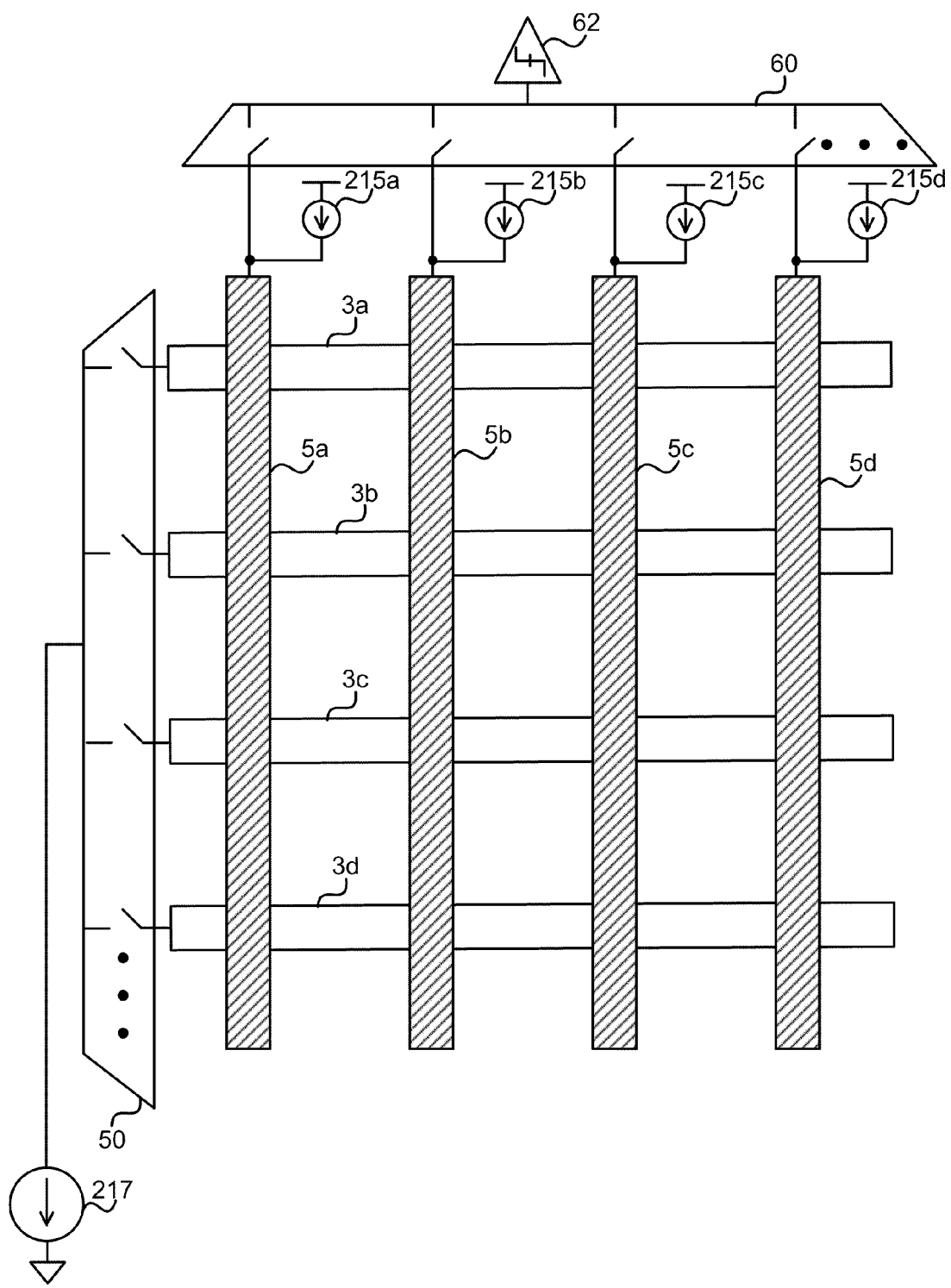

In a similar manner, multiplexor circuits 50, 60 can be implemented with the alternative embodiments illustrated in FIGS. 1B-1D. For example, FIG. 7B illustrates an embodiment in which a first multiplexor circuit 50 is coupled between ground 53 and the horizontal linear conductors 3a-3d, and a second multiplexor circuit 60 is coupled between a single comparator circuit 62 and the vertical linear conductors 5a-5d which are each coupled to the voltage source $V_{DD}$ via weak resistors 9a-9d. As a further example, FIG. 7C illustrates an embodiment in which a first multiplexor circuit 50 is coupled between a strong current source 213 and the horizontal linear conductors 3a-3d, and a second multiplexor circuit 60 is coupled between a single comparator circuit 62 and the vertical linear conductors 5a-5d which are each coupled to weak current sinks 209a-209d. As a further example, FIG. 7D illustrates an embodiment in which a first multiplexor circuit 50 is coupled between a strong current sink 217 and the horizontal linear conductors 3a-3d, and a second multiplexor circuit 60 is coupled between a single comparator circuit 62 and the vertical linear conductors 5a-5d which are each coupled to weak current sources 215a-215d.

Figure 8:
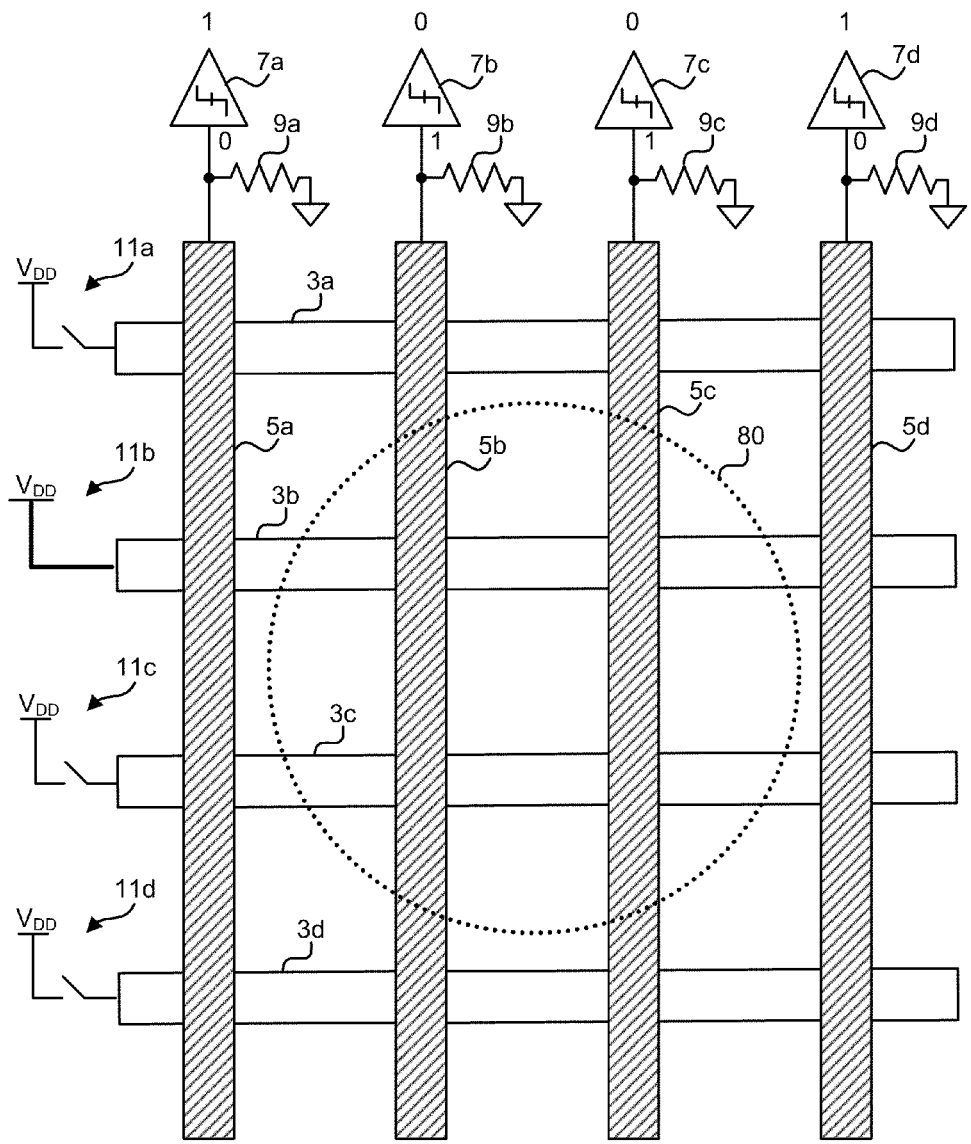
FIG. 8 is a component diagram of a portion of a conductive multi-touch touch pad or touchscreen panel according to an embodiment illustrating a large area position read.

While FIGS. 5A-5C show each finger touch 40, 41 encompassing a single intersection of linear conductors, the pitch density of the two arrays of linear conductors can be made finer such that a finger touch may encompass a number of intersections. For example, FIG. 8 illustrates a conductive multi-touch touch pad or touchscreen panel having a linear conductor pitch density such that a single finger touch 80 activates four (or more) intersections. As FIG. 8 illustrates, the touch 80 brings both vertical linear conductors 5b and 5c into electrical contact with horizontal linear conductors 3b and 3c. Thus, when the voltage source is connected to the second horizontal linear conductor 3b (as shown in FIG. 8) or 3c, the voltage is sensed by the inverters 7b, 7c connected to the two vertical linear conductors 5b, 5c. As a result, the output from the panel will be "1001 . . . " when the second and third linear conductors 3b, 3c are energized. These outputs can be processed by an attached processor or panel controller to identify the center point of contacted linear conductor intersections. The sensitivity and accuracy of a conductive multi-touch touch pad or touchscreen panel may be increased by using a fine pitch density of linear conductors in one or both of the arrays because a fine pitch can eliminate the possibility that a touch could fit within the area between intersections. Also, using a fine pitch density of linear conductors may enable a conductive multi-touch touch pad or touchscreen panel to measure an amount of force applied by a touch, because more applied force will cause greater deformation in the panel and thus cause more intersection points to come into electrical contact. The ability to determine applied force along with the touch position may enable the development of more intuitive touch pad or touchscreen user interfaces.

As mentioned above, a conductive multi-touch touch pad or touchscreen panel may include a large number of horizontal and vertical linear conductors in order to span a larger area. This implementation may be accomplished simply by replicating the structures illustrated in the figures across a large panel. Also, multiple conductive multi-touch touch pad or touchscreen panels may be laid side-by-side or otherwise grouped together to form a larger composite panel such as illustrated in FIG. 9. Four conductive multi-touch touch pad or touchscreen panels 1a-1d are positioned side by side in the example shown in FIG. 9, however, any number of panels can be combined to create a touch pad or touchscreen panel of practically any size. In such a multi-panel embodiment, the position of a finger touch is determined based upon the touch location on the particular sub-panel being touched in combination with the location of that sub-panel within the composite panel.

Example methods for reading out the touch position information from a conductive multi-touch touch pad or touchscreen panel are illustrated in the process flow diagrams shown in FIGS. 10A-10D. The readout process may proceed as a continuous loop which may be accomplished by a dedicated controller or processor or by a device processor. As a first step in the embodiment illustrated in FIG. 1A, the voltage source ($V_{DD}$) may be coupled to a first horizontal linear conductor (referred to in FIG. 10 as "Row 1"), step 100, followed by reading out the outputs from comparator circuits coupled to the vertical linear conductors, step 102. Repeating this process across the panel, the voltage source is sequentially coupled to the next horizontal linear conductor, step 104, followed by reading out the column values, step 106, until the last horizontal linear conductor has been coupled to the voltage source, step 108, and the column values have been read out, step 110. At this point the process may promptly repeat by returning to step 100 to energize the first horizontal linear conductor. Optionally, the process may delay for a short time to wait for the scanning result to be read out or processed by the main processor before returning to step 100 to energize the first horizontal linear conductor. This process continues as long as the panel is energized and configured to receive user input. Due to the repetitive nature of this process, it may be implemented in circuitry, in a combination of circuitry and software (e.g., a programmed gate array), or in software, such as in the software configuration of an interface.

Figure 10A:
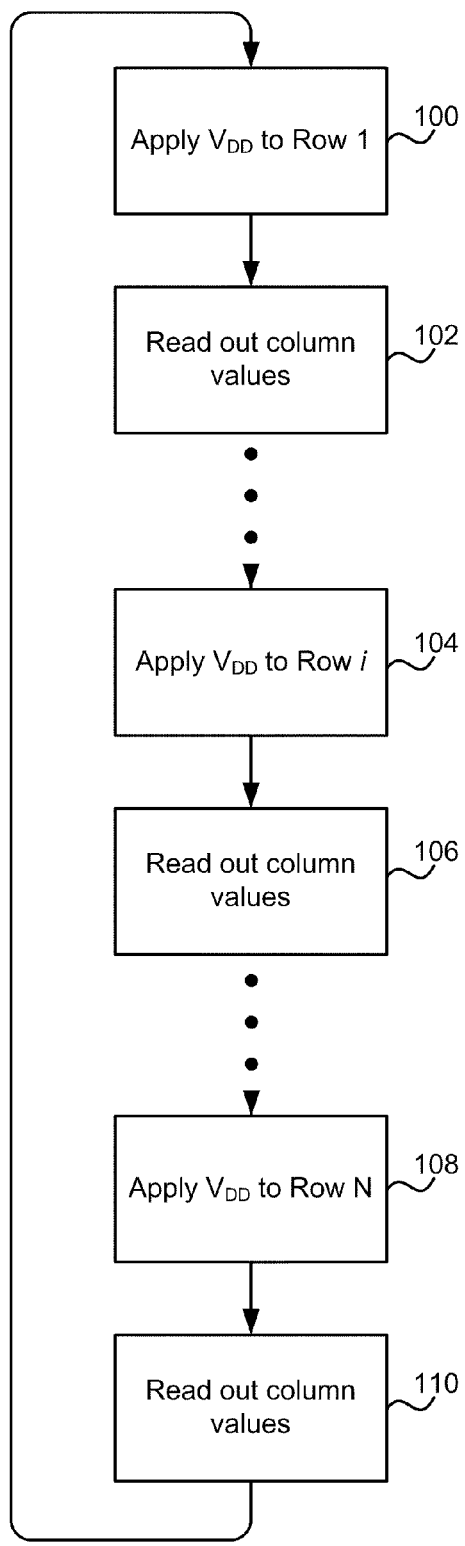
FIGS. 10A through 10D are process flow diagrams of multi-touch position read sequences according to alternative embodiments.
Figure 10B:
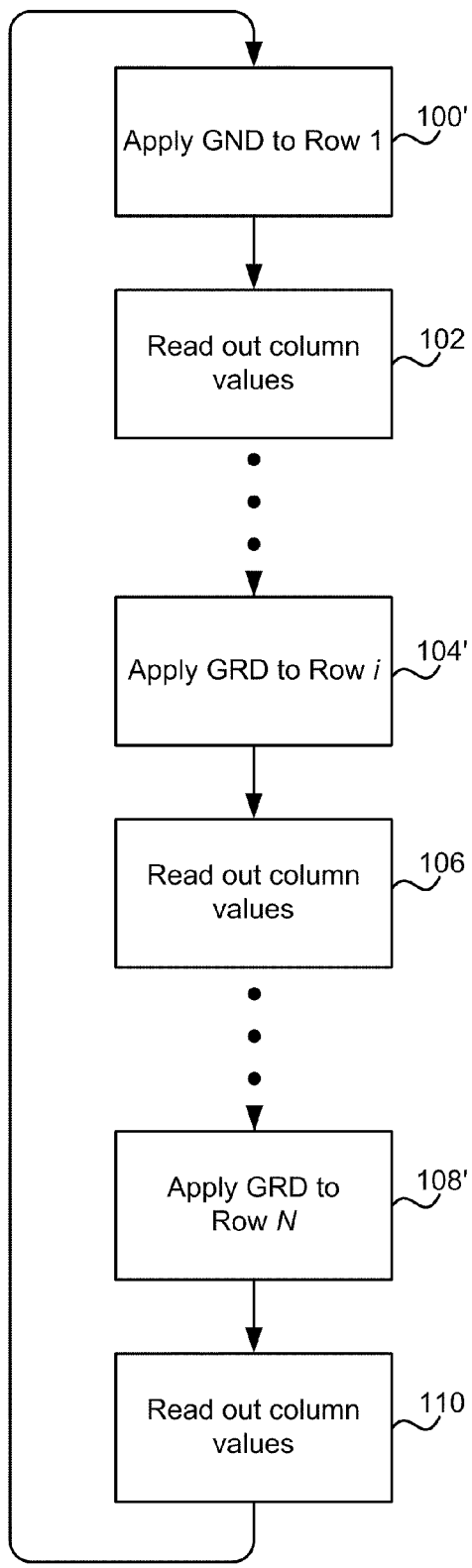
Figure 10C:
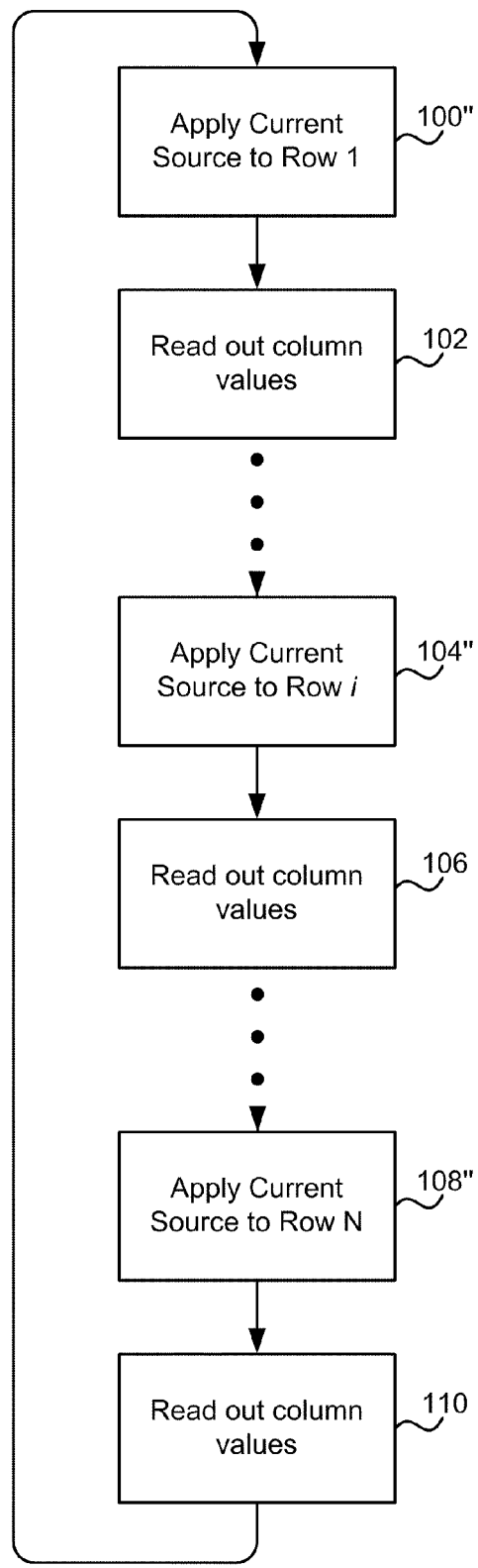
Figure 10D:
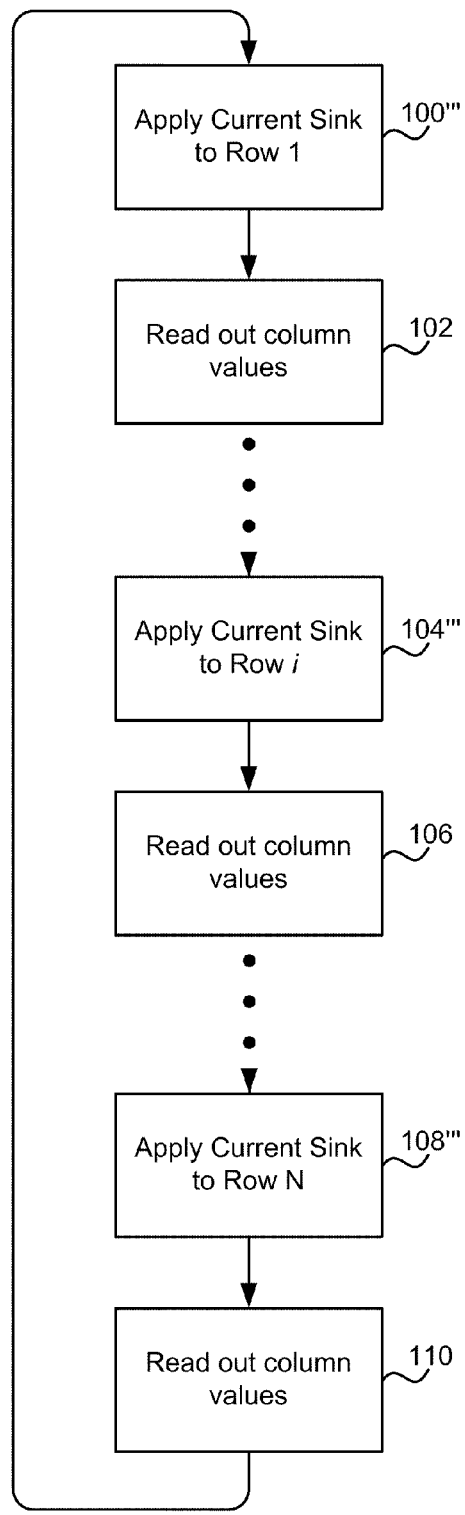

The process for reading out the touch positions on the embodiments illustrated in FIGS. 1B-1D may be performed in a similar manner. For example, for the embodiment illustrated in FIG. 1B, the process may proceed as illustrated in FIG. 10B. This process is similar to that described above with reference to FIG. 10A with the exception that ground is sequentially applied to each row, steps 100', 104' and 108'. As a further example, for the embodiment illustrated in FIG. 1C, the process may proceed as illustrated in FIG. 10C. This process is similar to that described above with reference to FIG. 10A with the exception that the strong current source is sequentially applied to each row, steps 100", 104" and 108". As a further example, for the embodiment illustrated in FIG. 1C, the process may proceed as illustrated in FIG. 10C. This process is similar to that described above with reference to FIG. 10A with the exception that the strong current sink is sequentially applied to each row, steps 100''', 104''' and 108'''.

Figure 11:
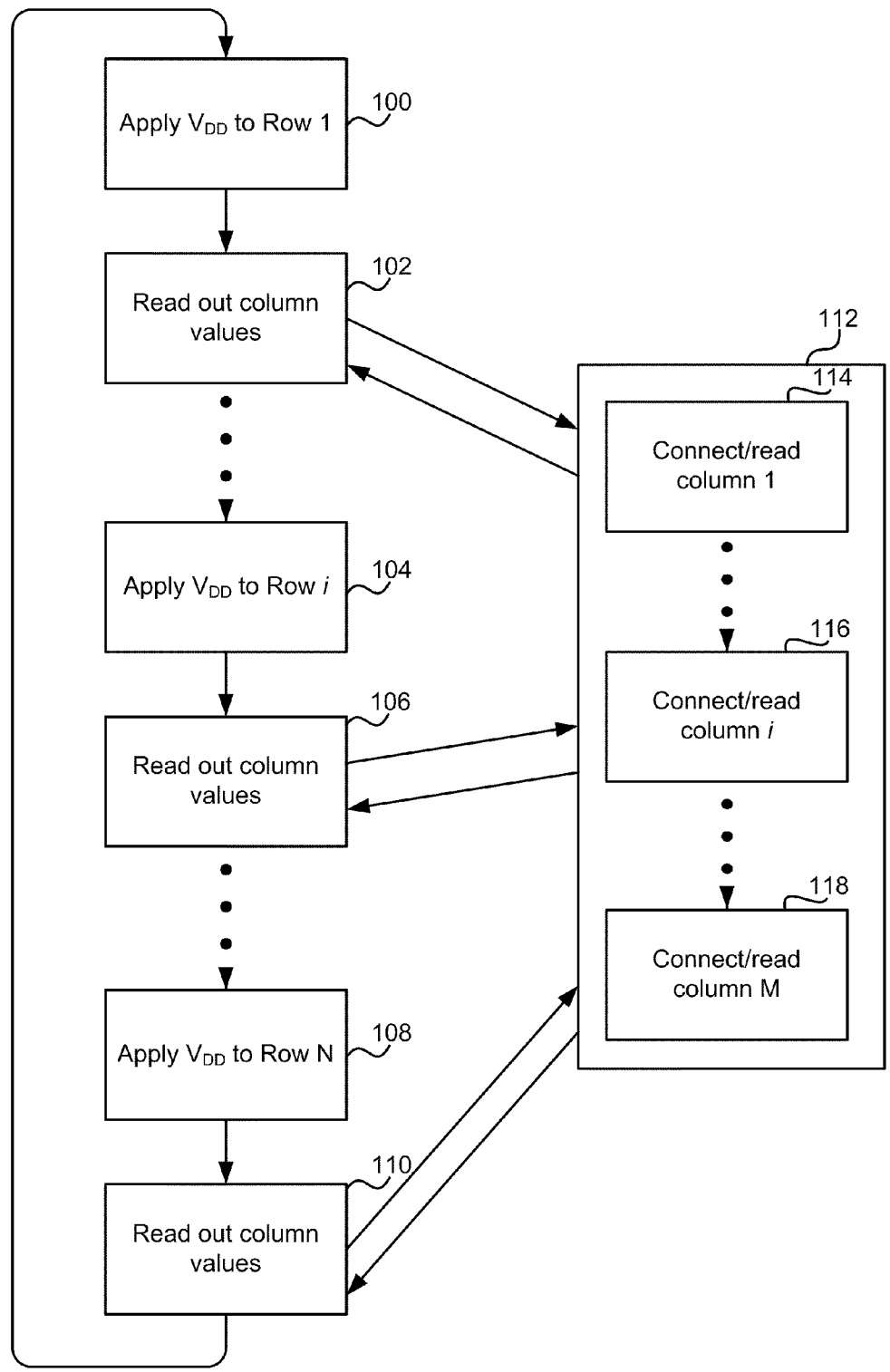
FIG. 11 is a process flow diagram of a multi-touch position read sequence according to another embodiment.

FIG. 11 illustrates an example process for reading out touch position information from a conductive multi-touch touch pad or touchscreen panel embodiment which reads the vertical linear conductors 5a-5d in a serial manner, such as described above with reference to FIGS. 4A-4D, 6C, 6D, 6F, 6H and 7A-7D. When the voltage source ($V_{DD}$) (in the case of the embodiments illustrated in FIGS. 6C or 7A) is coupled to a first horizontal linear conductor, step 100, the voltage of the vertical linear conductors are read out, step 102, by implementing a subroutine process 112 that connects a comparator circuit to the first column and receives the output digital value, step 114. The column reading subroutine 112 continues by sequentially connecting the comparator circuit to each vertical linear conductor and receiving the digital output, step 116, until the last vertical linear conductor is connected and read, step 118. When the subroutine process 112 is completed processing returns to the main routine where voltage is applied to the next horizontal linear conductor, step 104, before the subroutine 112 is called again, step 106. This process continues until the last horizontal linear conductor has been coupled to the voltage source, step 108, and the column values are read out, step 110, by executing the read out subroutine 112. At this point the process may promptly repeat by returning to step 100 to energize the first horizontal linear conductor. Optionally, the process may delay for a short time to wait for the scanning result to be read out or processed by the main processor before returning to step 100 to energize the first horizontal linear conductor. This subroutine process 112 may be implemented in a similar manner with the embodiments illustrated in FIGS. 1B-1D, interacting with the methods illustrated in FIGS. 10B-10D in a similar manner as described above with reference to FIG. 10A. As with the embodiment described above with reference to FIGS. 10A-10D, the read out process and/or the subroutine 112 may be implemented in circuitry, in a combination of circuitry and software (e.g., a programmed gate array), or in software, such as in the software configuration of an interface.

Figure 12:
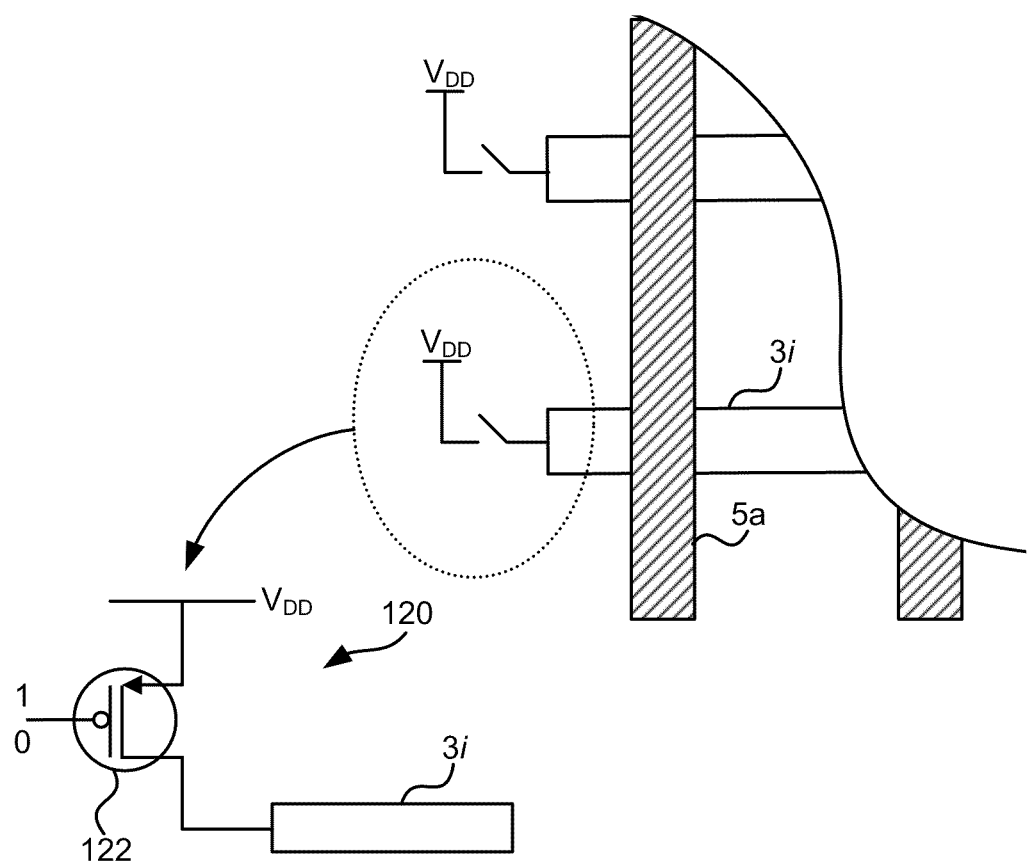
FIG. 12 is a detail of a circuit element of an of a conductive multi-touch touch pad or touchscreen panel.

In an embodiment, the switches 11a-11d coupled between the horizontal linear conductors 3a-3d and the voltage source $V_{DD}$ or ground, current source 213 or strong current sink 217 may be in the form of logic switches as illustrated in FIG. 12. For example, the switches 11a-11d may be normally open transistors 122 with their input coupled to the voltage source $V_{DD}$ or ground, current source 213 or strong current sink 217, their output coupled to a horizontal linear conductor 3i and their gate coupled to a digital input. In the illustrated example embodiment which shows a P-channel MOSFET as the switch, voltage is applied to the horizontal linear conductor 3i by applying a "0" to the gate since the logic is inverted in the illustrated circuit. As would be appreciated by one of skill in the art, alternatively the logic switches may be N-channel MOSFET so switches are closed by applying a positive voltage or "1" without departing from the spirit of the present invention. This embodiment may simplify fabrication and control of the array as each row can be associated with a unique address value. For example, the read address "1101 . . . " applied to an array of transistors 112 such as illustrated in FIG. 12 would close the gate transistor 112 coupled to the third horizontal linear conductor 3c, thereby enabling readout of vertical linear conductors in contact with that particular horizontal linear conductor. This embodiment may simplify the processing required to determine a location of a touch because the touch position can be determined by the combination of the applied horizontal read address and the associated vertical readout value. For example, if a touch 41 is received at the intersection of the third horizontal linear conductor 3c and the third vertical linear conductor 5c (as illustrated in FIGS. 5A-5C), the touch position could be defined by the "1101 . . . " input address and the "1101 . . . " output value, such as in the form of a couplet or vector.

Figure 13:
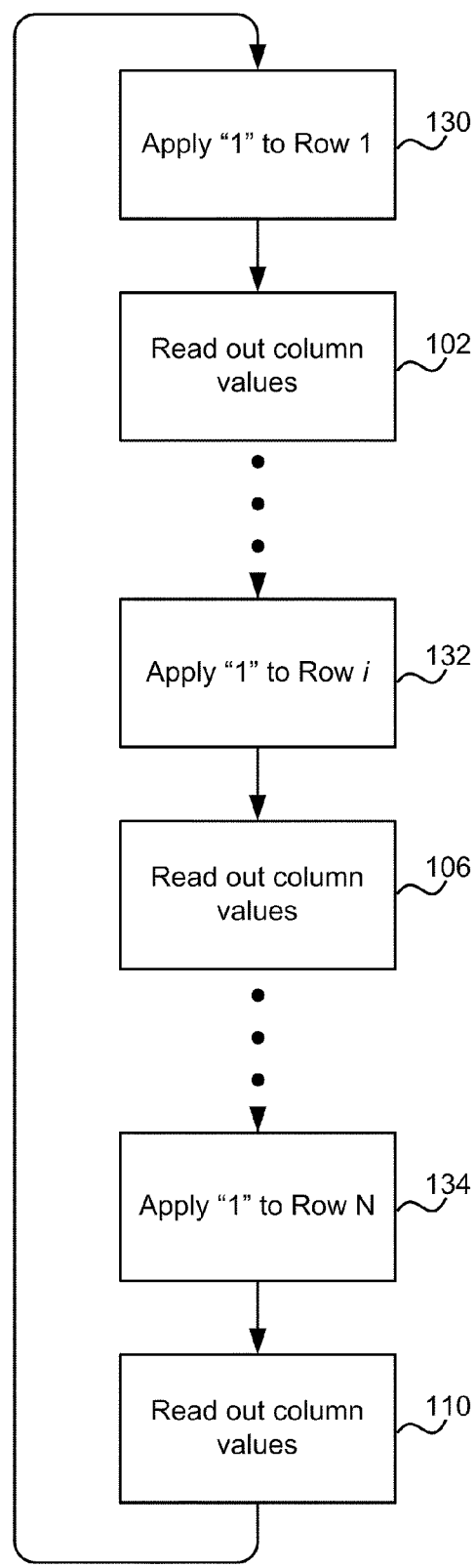
FIG. 13 is a process flow diagram of a multi-touch position read sequence appropriate for use with the embodiment illustrated in FIG. 12.

FIG. 13 illustrates an example process for reading out the touch position information from a conductive multi-touch touch pad or touchscreen panel implementing the embodiment illustrated in FIG. 12. As with the processes described above, the readout process may proceed as a continuous loop which may be accomplished by a dedicated controller or processor, a device processor, or a portion of an integrated circuit associated with the panel. As a first step, a read address is applied to the gates of the normally open transistors coupled between the voltage source ($V_{DD}$) and the horizontal linear conductors which includes a "0" value (or "1" with a different type of switch transistor) in the first digit position, step 130. With the address value applied to the transistor gates, the outputs from comparator circuits coupled to the vertical linear conductors are read out, step 102. As described above with reference to FIG. 10 and 11, the vertical linear conductor read outs may be accomplished in parallel (as described above with reference to FIG. 10) or in series (as described above with reference to FIG. 11). Subsequent horizontal linear conductors can be energized by applying an address that includes a "0" (or "1" with a different type of switch transistor) in the position associated with the horizontal linear conductor to be interrogated, step 132, after which the vertical linear conductors are read out, step 106. This addressing and reading process continues until the last horizontal linear conductor is addressed with a "0" (or "1" with a different type of switch transistor), step 134, and the column values are read out, step 110. At this point the process can promptly repeat by returning to step 130 to apply the read address that will energize the first horizontal linear conductor. This process continues as long as the panel is energized and configured to receive user input.

While FIG. 12 and the associated description shows the use of normally open P-channel MOSFET transistors 122, other digital logic circuits may be used, including normally open N-channel MOSFET transistors (which can be activated with a "1" input value), flip-flop circuits (which can be switched from open to closed or closed to open by applying a "1"

value), and similar logic circuits. Additionally, as mentioned above, the panel circuits may be configured such that horizontal conductors are connected to ground instead of VDD (see the discussion above with reference to FIG. 1B). Also, the horizontal conductors may be switch connected to current sources instead of voltage sources or ground.

The embodiment described above with reference to FIGS. 12 and 13 enables a conductive multi-touch touch pad or touchscreen panel to be read in a variety of ways. The read processes described above with reference to FIG. 13 involves sequentially applying voltage to each of the horizontal linear conductors. However, the horizontal linear conductors may also be energized in any sequence, including a random sequence, by applying the appropriate read addresses to the panel. For example, when a touch is detected, horizontal linear conductors in the vicinity of the touch (e.g., one or two linear conductors on either side of the touch) could be preferentially read by applying appropriate read addresses in order to better track any movement of the touch. For example, when a touch is detected on a particular horizontal linear conductor, the horizontal linear conductors above and below that conductor may be rapidly addressed a number of times before a scan of all horizontal linear conductors is completed. In this manner a rapid movement of a finger across the panel can be accurately tracked since the horizontal linear conductors in the vicinity of the touch are addressed more frequently than linear conductors distant from the touch.

Figure 14:
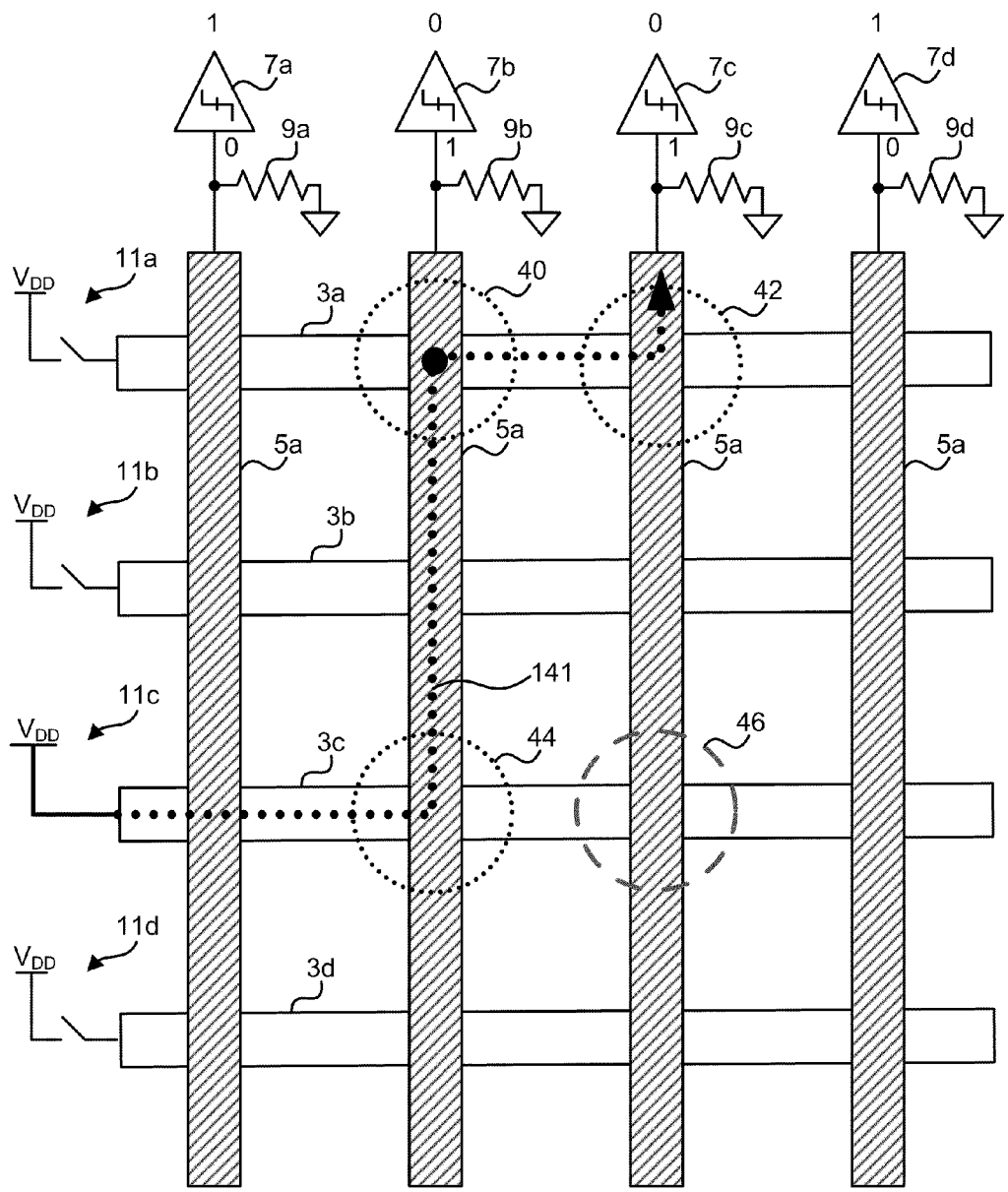
FIG. 14 is a component diagram of a portion of a conductive multi-touch touch pad or touchscreen panel illustrating a potential problem with multi-touch touch pad or touchscreen panels.

Multi-touch touch pad or touchscreen panels may be vulnerable to erroneous readings resulting from secondary electrical paths when three touches are applied to a panel in certain configurations. FIG. 14 illustrates a secondary electrical path problem that might be experienced in a conductive multi-touch touch pad or touchscreen panel. In a situation where three fingers touch the panel at locations 40, 42 and 44 as shown in FIG. 14, the electrical connections between the horizontal and vertical conductive lines and wires established by the touches enable electrical current and voltage to flow in a manner that result in a fourth "ghost" touch 46 indication. Specifically, voltage may be conducted along the secondary path 140 indicated in a dashed line from horizontal linear conductor 3c up vertical linear conductor 5b to horizontal linear conductor 3a to vertical linear conductor 5c where the voltage is detected by the associated comparator circuit 7c. As a result, a touch readout of "0" is output from comparator circuit 7c when voltage is connected to horizontal linear conductor 3c even though there is no connection between (i.e., no touch at) that horizontal linear conductor 3c and vertical linear conductor 5c. A similar ghost touch indication may be generated any time a single panel is touched in three places in the pattern of a right triangle (if the horizontal and vertical conductors are configured perpendicular to each other), with the fourth "ghost" touch forming a rectangle with the three real touches.

Figure 15A:
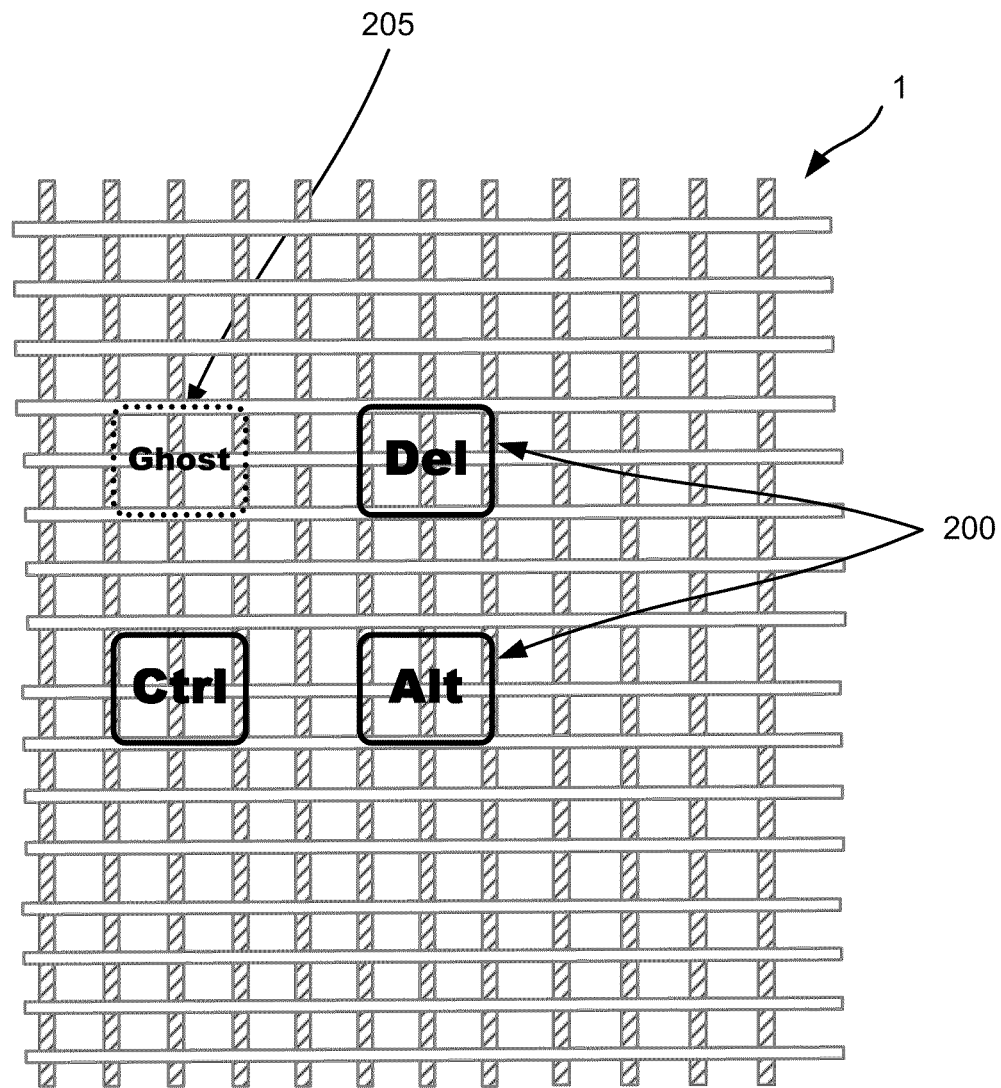
FIGS. 15A and 15B are a component diagram of a portion of a conductive multi-touch touch pad or touchscreen panel showing positioning of letters according to an embodiment.
Figure 15B:
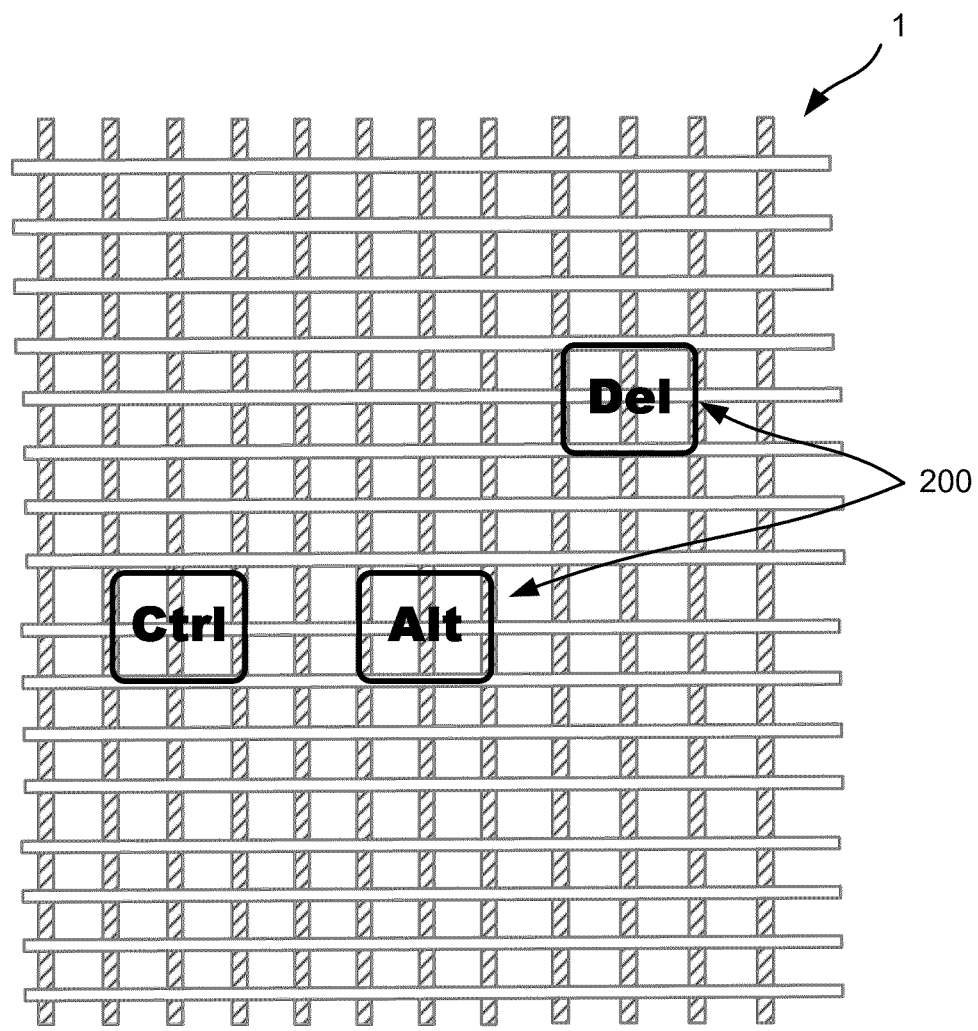

The problem of ghost indications caused by secondary electrical paths when the panel is touched in three places can be minimized by a variety of approaches. In a first approach illustrated in FIGS. 15A and 15B, icons 200 on the screen that might be touched simultaneously may be strategically placed so as to avoid situations where if a single panel is touched in three places, the touches do not form a right triangle. For example, if the keys 200 "Alt," "Ctrl" and "Del" are positioned over array of linear conductors as illustrated in FIG. 15A, when these three keys are pressed simultaneously, which is common in many PC-based operating systems and applications, a ghost 205 will also be detected. This ghost 205 will make it difficult for a processor to recognize this common key press event. By moving at least one of the keys 200 to a position off axis from the others as illustrated in FIG. 15B, the simultaneous press of "Alt," "Ctrl" and "Del" will not result in connected linear conductors forming a right triangle, so no ghost is formed by this key press event. In an alternative approach, in an implementation that includes multiple conductive multi-touch touch pad or touchscreen panels as illustrated in FIG. 9, icons in a touchscreen display that may be touched or manipulated simultaneously could be positioned so that they fall within separate subpanels 1a-1d.

Figure 16:
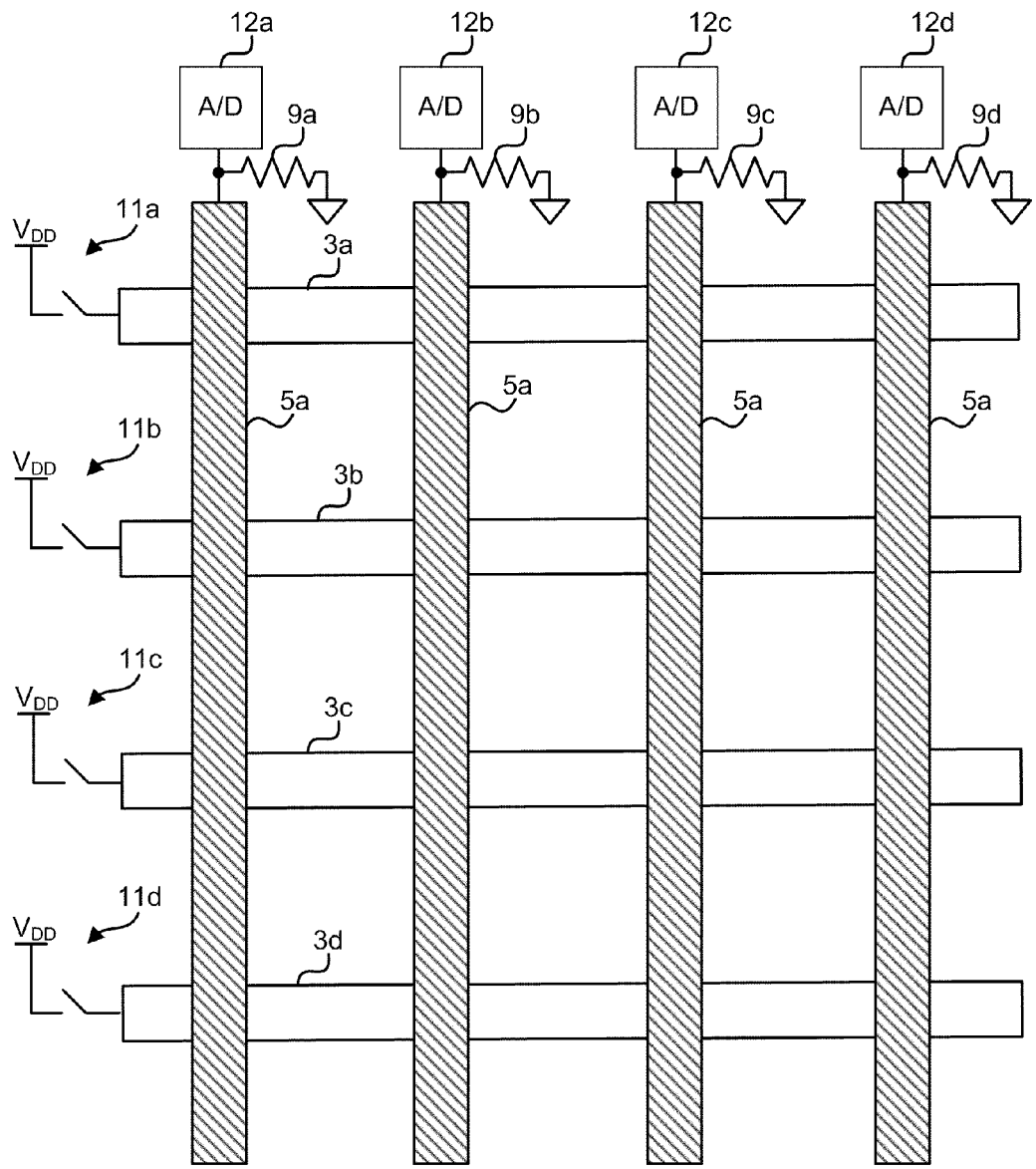
FIG. 16 is a component diagram of a portion of a conductive multi-touch touch pad or touchscreen panel according to an embodiment.

A second potential solution to the problem of ghost indications cause by secondary electrical paths is provided by another embodiment conductive multi-touch touch pad or touchscreen panel illustrated in FIG. 16. This embodiment employs voltage or current sensors 12a-12d that can measure the level of voltage or current existing on a vertical linear conductor 5a-5d. Unlike comparator circuit(s) 7 which can provide only a simple digital output, such voltage or current sensors 12a-12d provide an output that varies with the measured level of voltage or current. In one embodiment, an analog-to-digital converter circuit 12a-12d is coupled to each vertical linear conductors 5a-5d. The analog-to-digital converter circuits 12a-12d are configured to output a value corresponding to a measured voltage or current value.

The embodiment illustrated in FIG. 16 can resolve the problem of ghost indications caused by secondary electrical paths by distinguishing ghost readings based upon the value output from the AD converter 12a-12d. Since the horizontal and vertical linear conductors 3, 5 inherently have a degree of electrical resistance, the amount of resistance to current flowing through direct and secondary electrical paths depends upon the length and number of current paths. In situations where there are three touches on the panel forming a right triangle, two current paths are established between a sensor coupled to one vertical conductive line and the voltage or current source coupled to horizontal conductive paths, thereby providing less resistance than when there is a single path which occurs in the ghost situation. Therefore, a ghost indication will have a lower voltage or current output than an actual indication (i.e., for a four point touch), a difference that can be used to distinguish actual from ghost touch indications. This difference is explained below with reference to FIGS. 17A-17E which illustrates the direct and secondary electrical paths through a panel being touched in three or four locations.

Figure 17A:
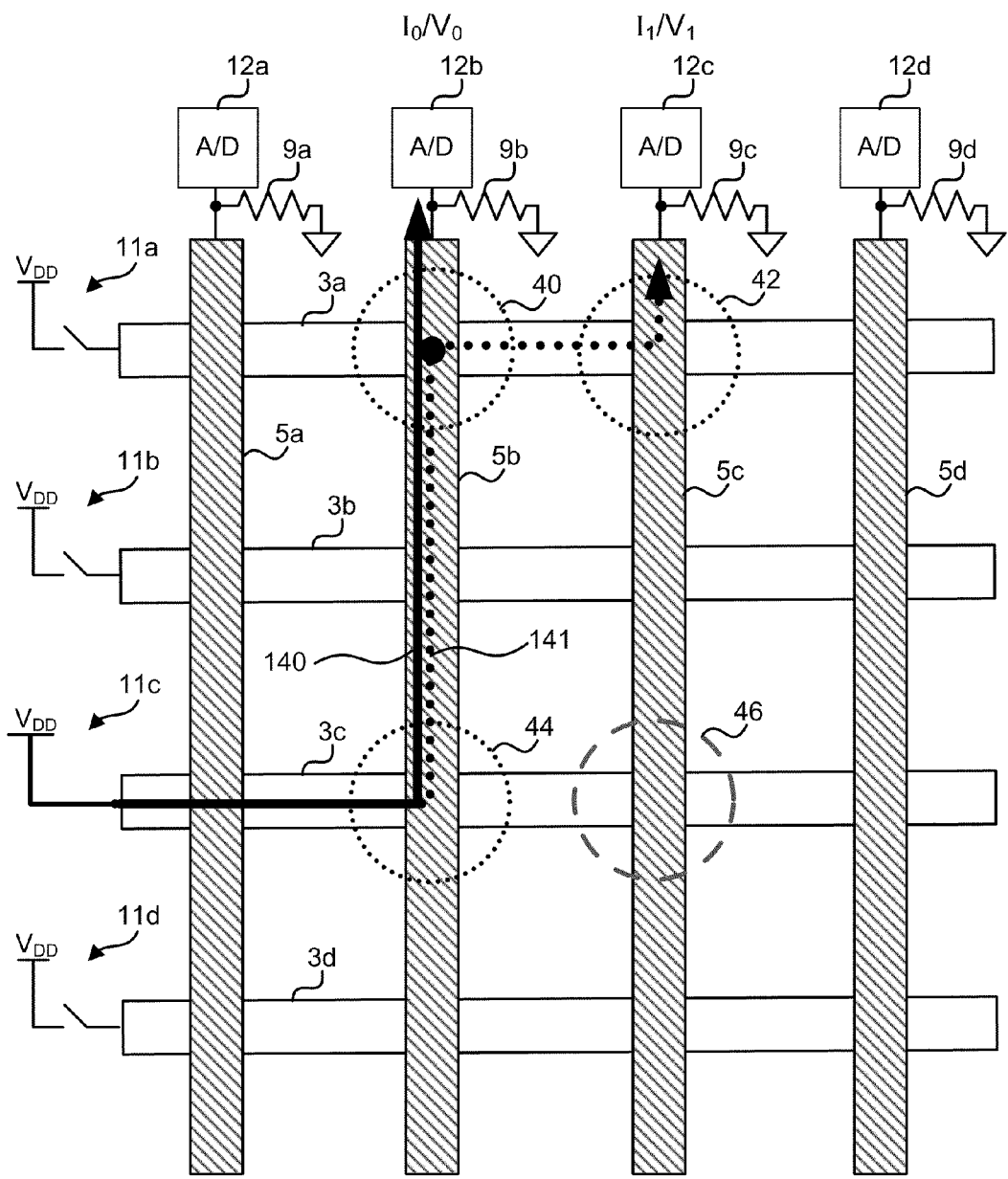
FIGS. 17A through 17E are component diagrams of a portion of a conductive multi-touch touch pad or touchscreen panel illustrating how the embodiment shown in FIG. 16 functions.
Figure 17B:
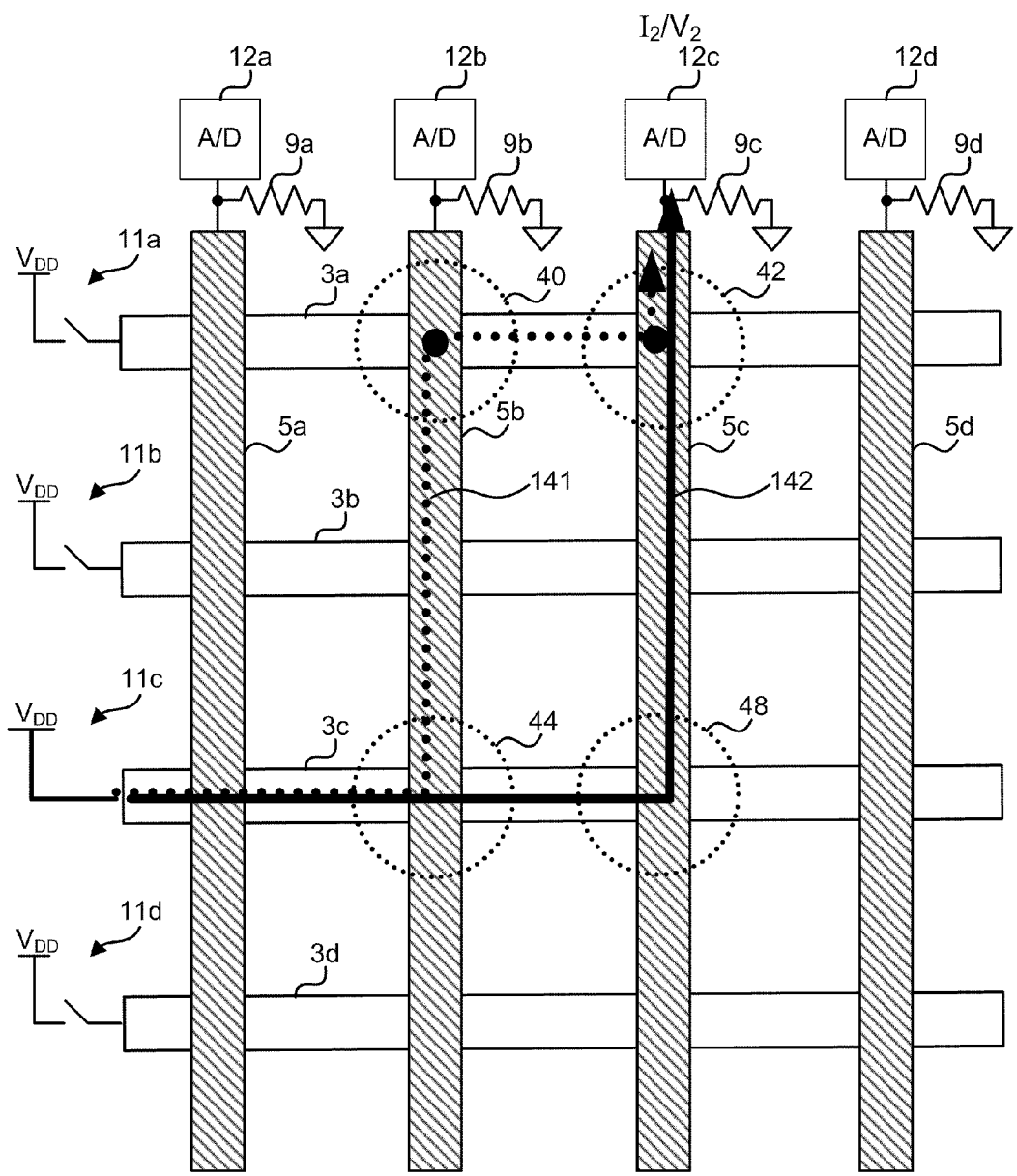

Referring to FIG. 17A, if a panel is touched in three locations 40, 42, 44, when voltage is applied to the third horizontal linear conductor 3c, current will flow directly to the A/D converter 12b coupled to the second vertical linear conductor 5b as shown by the solid arrow 140. As a result, the A/D converter 12b will output a value for voltage or current ($I_0/V_0$). Also, a secondary electrical path 141 will flow through the connection at touch 40 to the first horizontal linear conductor 3a to the third vertical linear conductor 5c via the connection at touch 42, and through that to the connected A/D converter 12c. As a result of the secondary electrical path 141, the A/D converter 12c will output a value for voltage or current ($I_1/V_1$) that reflects the resistance over that electrical path 141. This output from the A/D converter 12c could be interpreted as a touch at location 46 which in the example shown in FIG. 17A would be a ghost indication. Such a ghost indication can be distinguished from a true touch indication by measuring the output value of the A/D converter 12c as illustrated in the example shown FIG. 17B. In a four-touch situation, current would flow to the A/D converter 12c both paths 141 and 142. Specifically, current would flow via the direct path 142 from horizontal linear conductor 3c to vertical linear conductor 5c and via the indirect path 141 from horizontal linear conductor 3c to vertical linear conductor 5b to horizontal linear conductor 3a to vertical linear conductor 5c. As a result of these parallel current paths, the effective electrical resistance between the voltage source and the A/D converter 12c would be less than that of the secondary path 141 shown in FIG. 17A that would exist in a three-touch situation. Consequently, the output value for voltage or current ($I_2/V_2$) from the A/D converter 12c for an actual touch 48 would be approximately twice the output associated with a ghost indication 46. This difference in the level of output provided by the A/D converter 12c can be used to distinguish a real (i.e., four-point touch) from a ghost (i.e., three-point touch) indication.

Figure 17C:
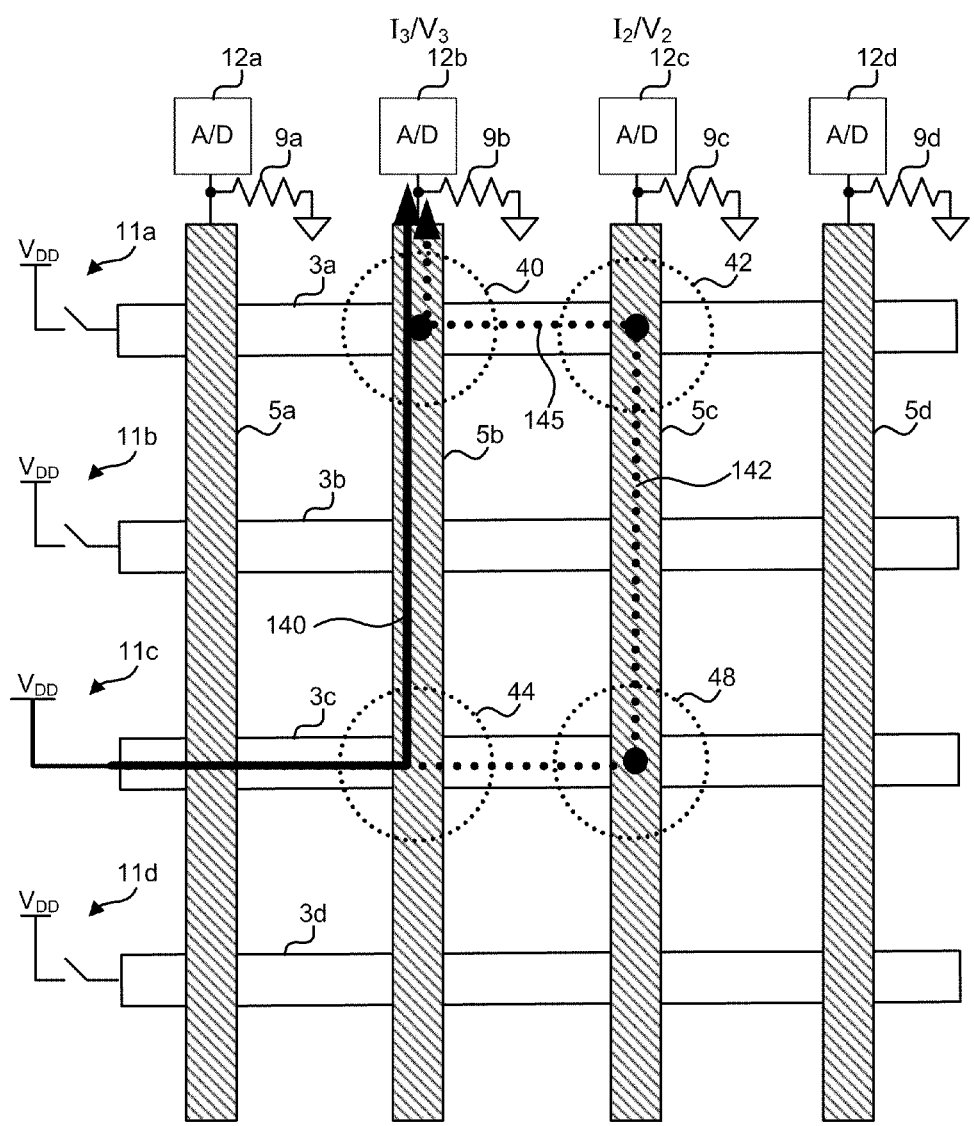
Figure 17D:
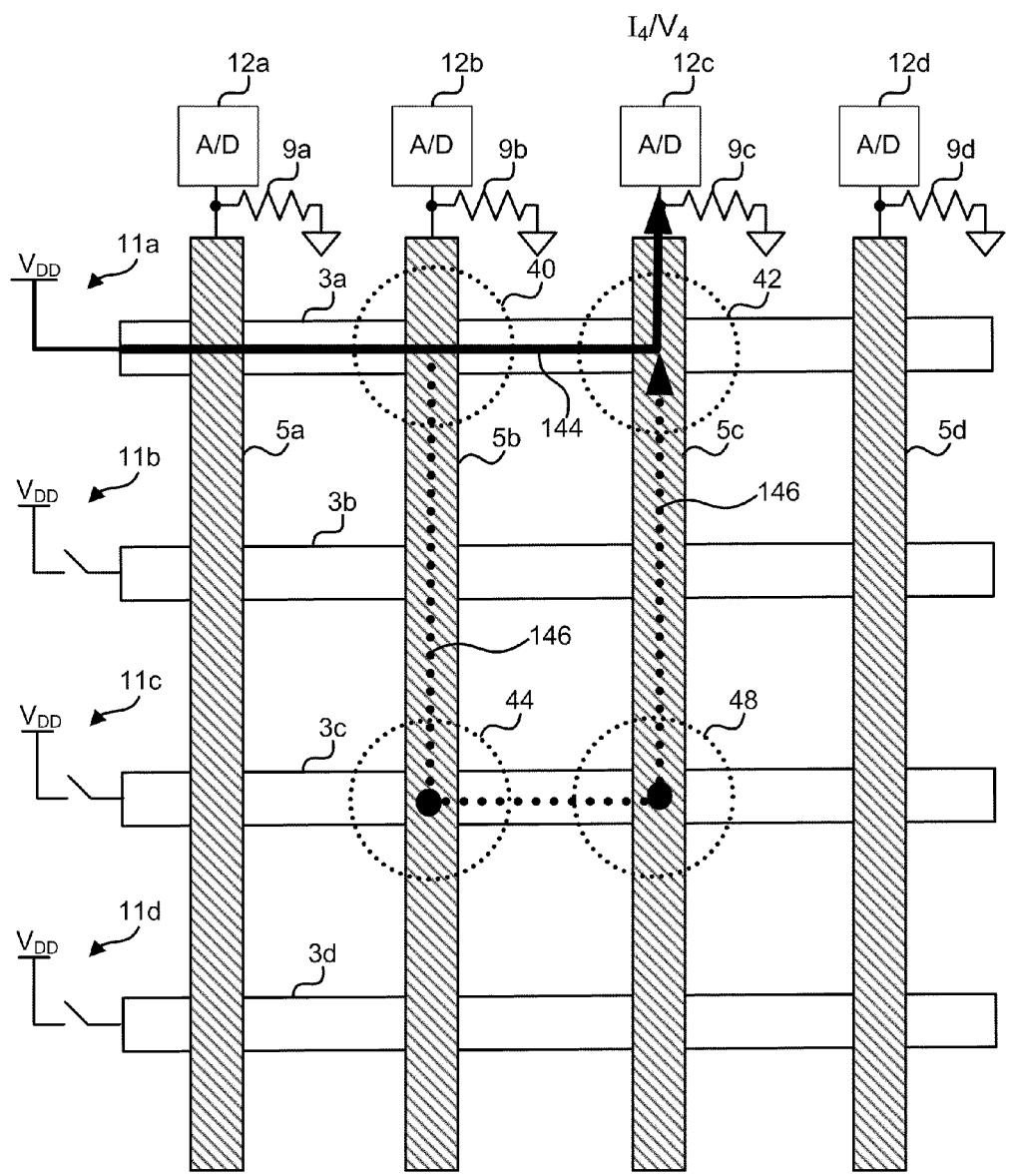

In the situation where there are four actual touches (i.e., not three actual and one ghost touch indication) within a single panel, there will also be secondary current paths involved in all touch indications. This is illustrated in FIGS. 17C and 17D. Referring to FIG. 17C, the output ($I_3/V_3$) from the A/D converter 12b connected to the second vertical linear conductor 12b will be greater than in a three-touch situation (as illustrated in FIG. 17A) due to the combination of the parallel direct conductive path 140 and the secondary conductive path 145. This is because the secondary conductive path 145 reduces the effective resistance presented to current flowing to the A/D converter 12b. Similarly, when the voltage source is coupled to the first horizontal linear conductor 3a as shown in FIG. 17D, the output ($I_4/V_4$) from the A/D converter 12c connected to the third vertical linear conductor 12c will be greater than in a three-touch situation (as illustrated in FIG. 17A) due to the combination of the parallel direct conductive path 144 and the secondary conductive path 146. Finally, a three-point contact will result in a different output ($I_5/V_5$) from the A/D converter 12c connected to the third vertical linear conductor 12c when the first horizontal linear conductor 3a is energized because there is no secondary conductive path as illustrated in FIG. 17E.

Figure 17E:
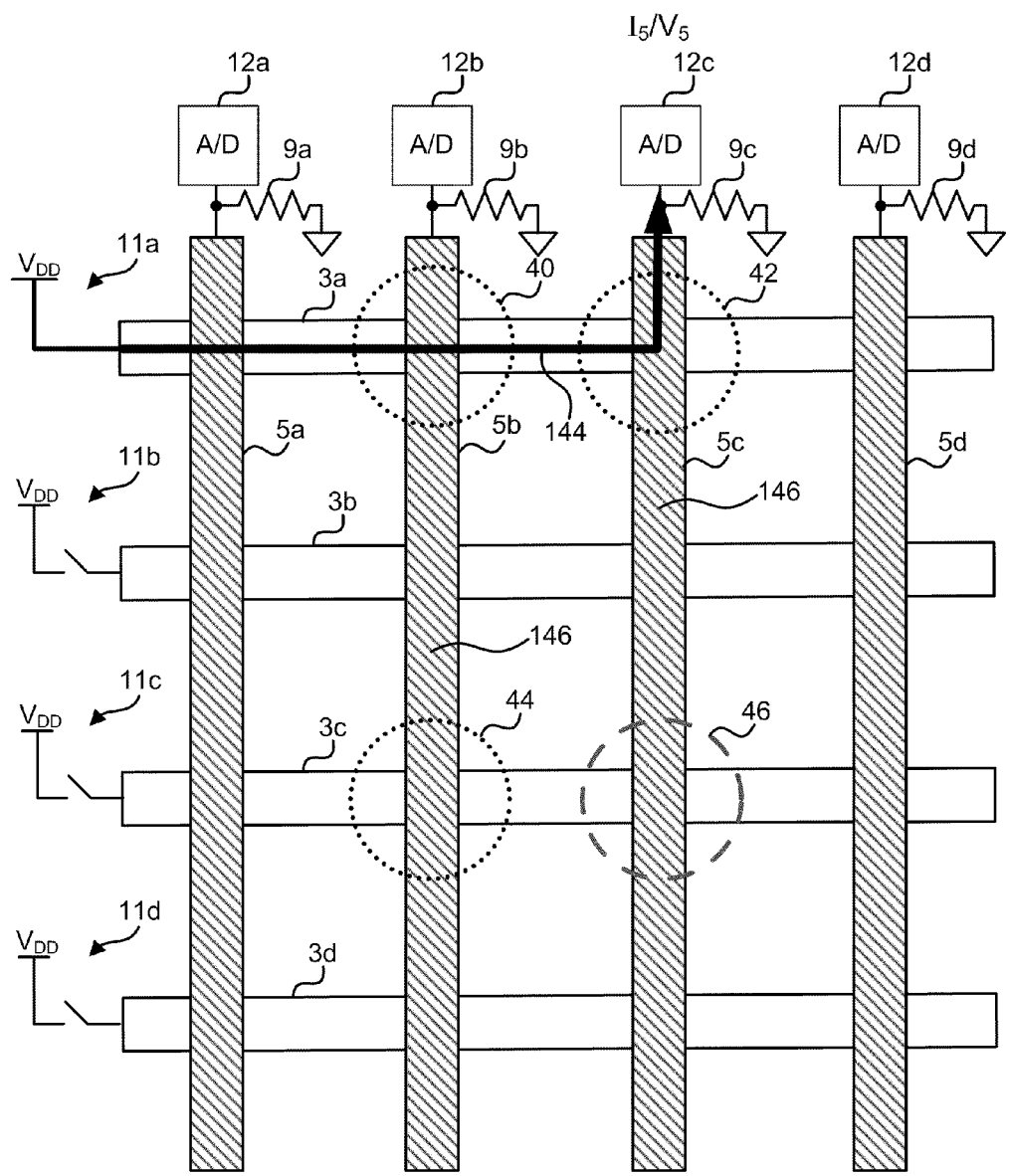

The ability of the embodiments illustrated in FIGS. 16-17E to distinguish real from ghost touch indications may be enhanced by varying the linear resistance in the various horizontal or vertical linear conductors 3, 5. If the resistance per unit length of the various horizontal or vertical linear conductors are different, direct conductive paths may be more easily distinguished from secondary conductive paths. Also, the voltage or current outputs from A/D converters 12 for each intersection of rows and columns may be recorded for single touches and stored as threshold or comparison values. For example, voltage or current outputs from A/D converters 12 that are less the single touch value may be interpreted as ghost indications while outputs equal to or greater than the single touch value may be interpreted as real indications.

Figure 18:
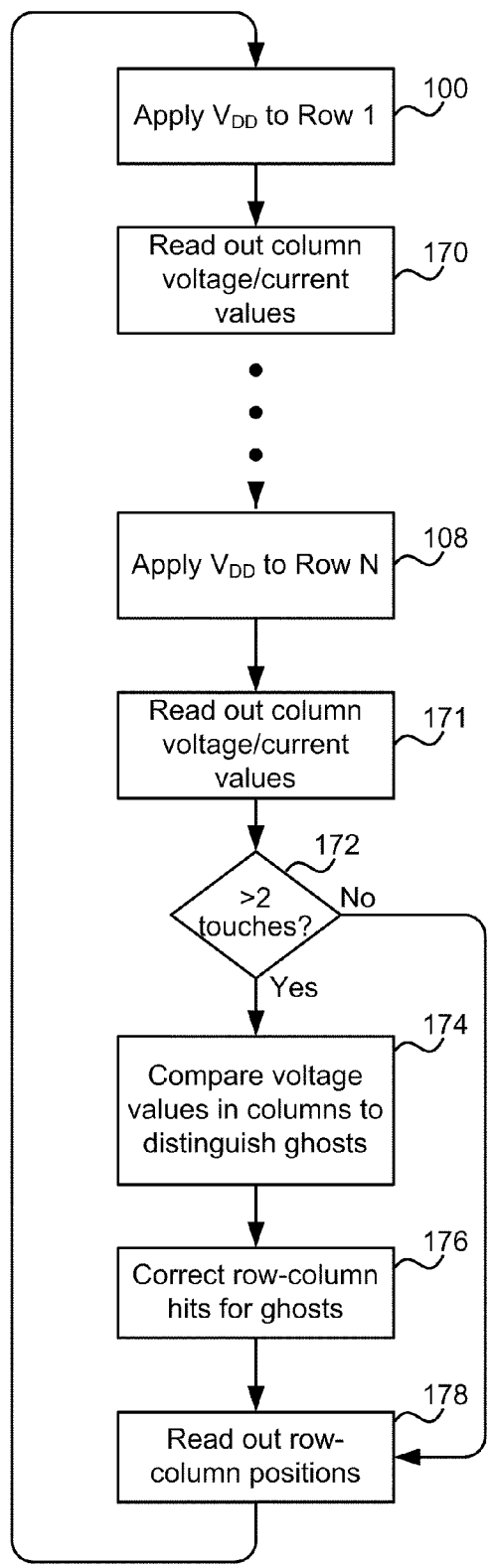
FIG. 18 is a process flow diagram of a multi-touch position read sequence according to the embodiment illustrated in FIG. 16.

An example method for distinguishing ghost indications from real touches using the difference in output from A/D converters 12 (or other types of voltage or current level-sensing circuitry) measureable by the embodiment illustrated in FIGS. 16-17E is illustrated in the process flow diagram in FIG. 18. In a panel read process the voltage source may be coupled to the first horizontal linear conductor ("row 1"), step 100, followed by reading out the voltage or current values from the A/D converters 12 connected to each of the vertical linear conductors 5, step 170. The A/D converters 12 may be read out in parallel if there is an A/D converter connected to each vertical linear conductor as shown in FIG. 16. Alternatively the A/D converters 12 may be read out serially if a single A/D converter is sequentially connected to the vertical linear conductors, such as by a multiplexer circuit 60 as shown in FIG. 6B. The voltage source is then sequentially coupled to each of the horizontal linear conductors and the voltage or current value outputs from the A/D converters 12 connected to each of the vertical linear conductors 5 are obtained, with this process continuing until voltage is applied to the last horizontal linear conductor in the panel, step 108, and the voltage or current value outputs are obtained, step 171. At this point the obtained voltage or current value outputs may be inspected to determine if the readings indicate more than two touches to the panel, test 172. If only two or fewer touches are indicated (i.e., test 172="No"), there is no problem with ghost indications so the row and column indications may be read out to determine the touch location(s), step 178, in a manner similar to that discussed above with reference to FIGS. 10 and 11. Once all horizontal linear conductors have been energized the process may be repeated by returning to step 100.

If more than two touches to the panel are indicated by the obtained voltage or current outputs (i.e., test 172="Yes"), the obtained voltage or current outputs within a single column which indicate a touch can be compared to distinguish real from ghost touch indications, step 174. This step may involve comparing the obtained voltage or current values to each other or to threshold values to identify real indications in a manner similar to that described above with reference to FIGS. 17A-17E. Using the results of the comparisons the panel outputs may be corrected to eliminate detected ghost indications, step 176. Then the corrected row and column position readings may be output from the panel, step 178, before returning to step 100 to repeat the touch detection and readout process. Corrected row and column position readings may also be converted to digital format at this point to reduce the amount of data provided to device processor.

It should be appreciated that the resistance along the current paths also includes the resistance at the point of contact between the horizontal and vertical conductive lines, which may be sensitive to touch pressure. In implementations that use conductive lines made of materials which exhibit greater variability in contact point resistance, such contact resistance may overwhelm the difference path resistance between three- and four-point touches, rendering this method unreliable or infeasible.

The processes of reading out touch locations on a conductive multi-touch touch-sensitive panel can be controlled by a state machine coupled to the switches 11 or multiplexor 50 and the comparator circuits 7 or proportional electrical sensors (e.g., A/D converter circuits) 12. The state machine can correlate vertical linear conductor readouts with horizontal linear conductor connections to the voltage source. Such a state machine may be implemented as a separate circuit, such as an integrated circuit or programmable gate array, or as part of the touch screen panel.

Figure 19:
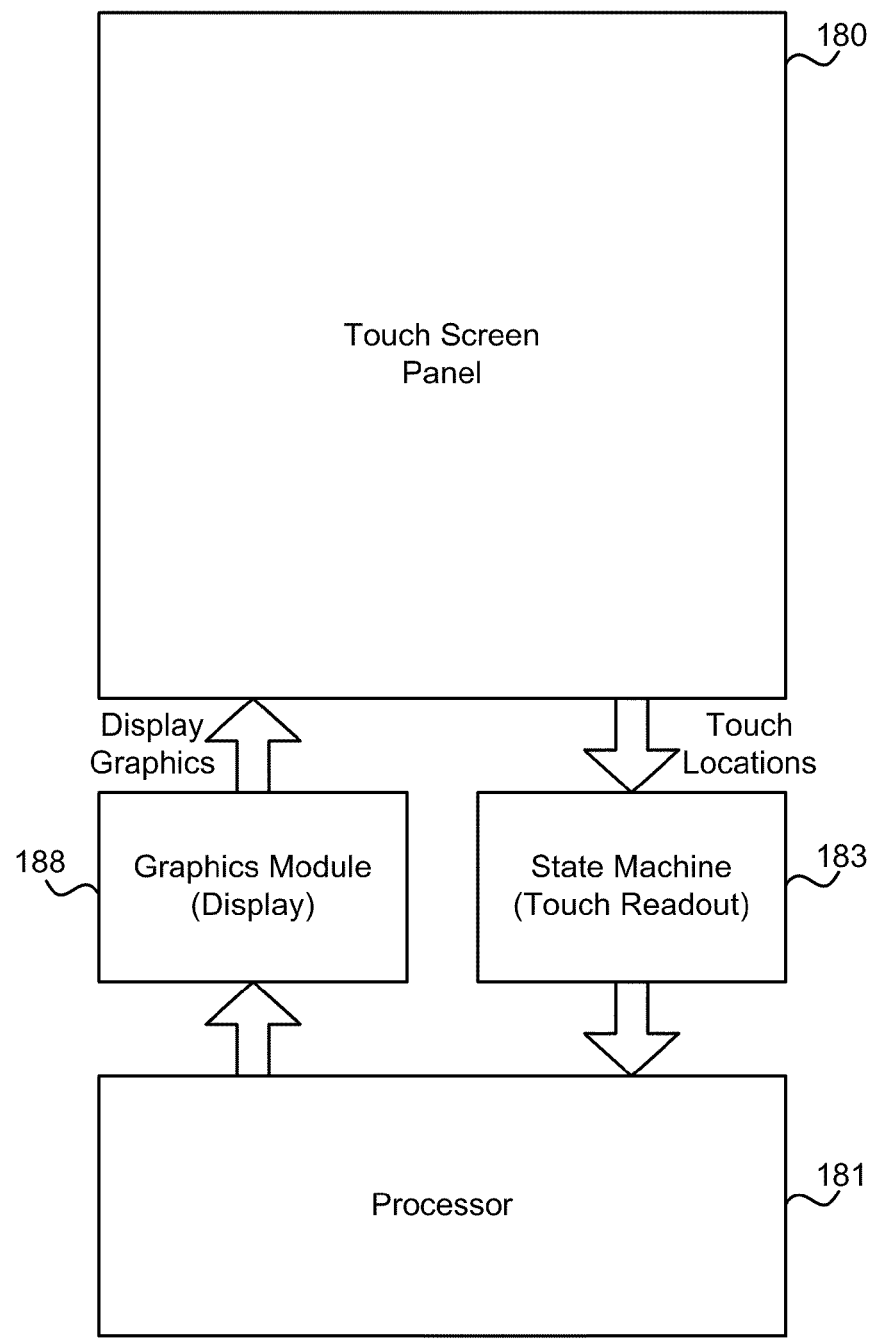
FIG. 19 is a component block diagram of a computing system employing a conductive multi-touch touch pad or touchscreen panel according to an embodiment.

FIG. 19 is a component block diagram of an embodiment computing system implementing a conductive multi-touch touch-sensitive panel. In this embodiment, a conductive multi-touch touch-sensitive panel 180 is coupled to a processor 181 via a graphics module 188 (e.g., a graphics card) and read out circuit 183. In this embodiment display graphics to be presented on the conductive multi-touch touch-sensitive panel are output from the processor 181 to the graphics module 188 which outputs electrical signals to the conductive multi-touch touch-sensitive panel 180. Touch detections and locations are output from the panel 180 to the processor 181 via the read out circuit 183. Depending upon the panel embodiment, outputs from the panel may be electrical values that are sensed by circuits within the state machine 183 (such as in the embodiments described above with reference to FIGS. 4A-4D, 6B and 7), or parallel or serial outputs from sensors coupled to the vertical linear conductors 5. The read out circuit 183 can then provide signals to the processor 181 indicating touch locations, or providing information sufficient to enable the processor 181 to determine the touch locations.

Figure 20:
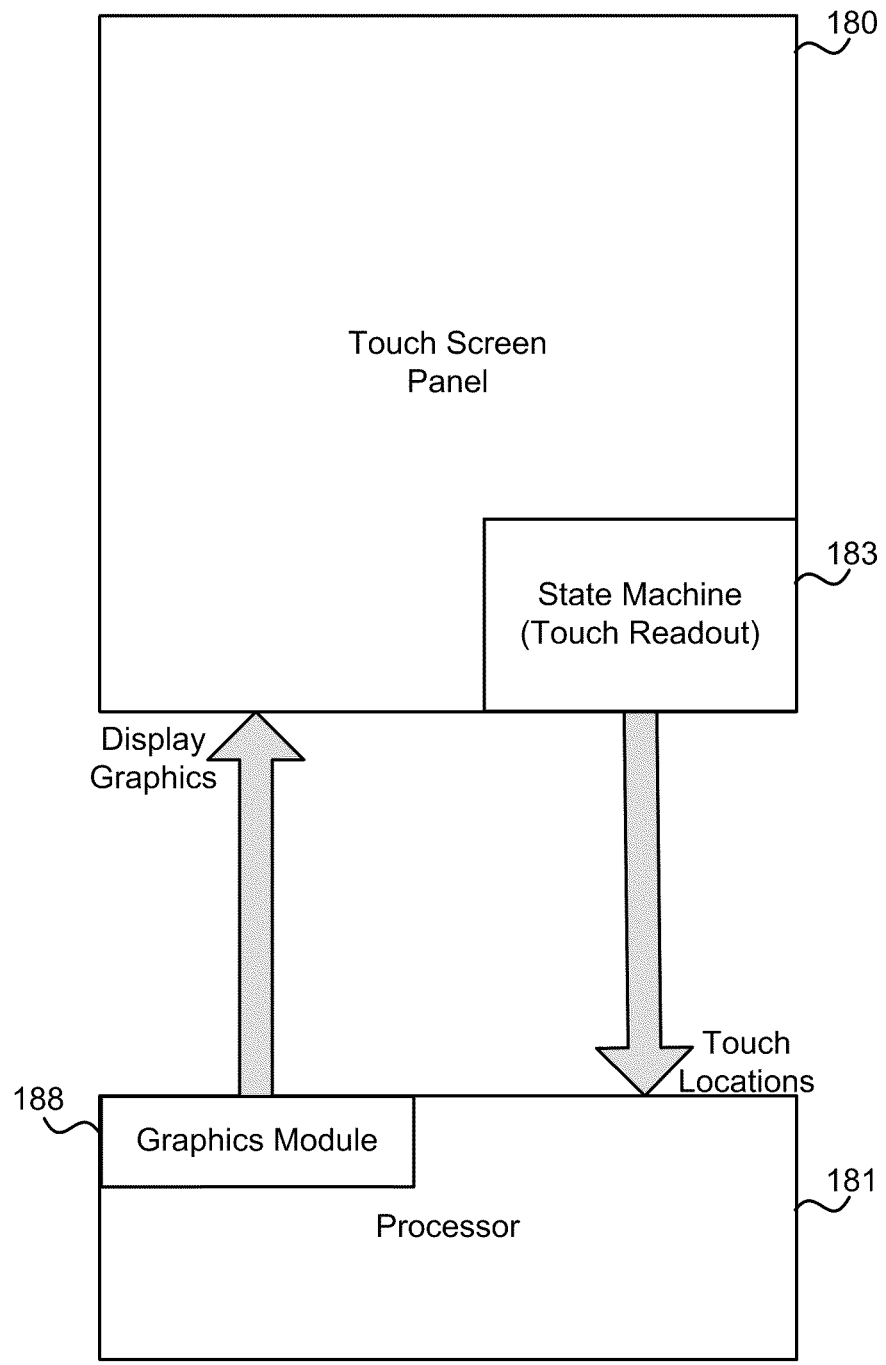
FIG. 20 is a component block diagram of a computing system employing a conductive multi-touch touch pad or touchscreen panel according to another embodiment.
Figure 21:
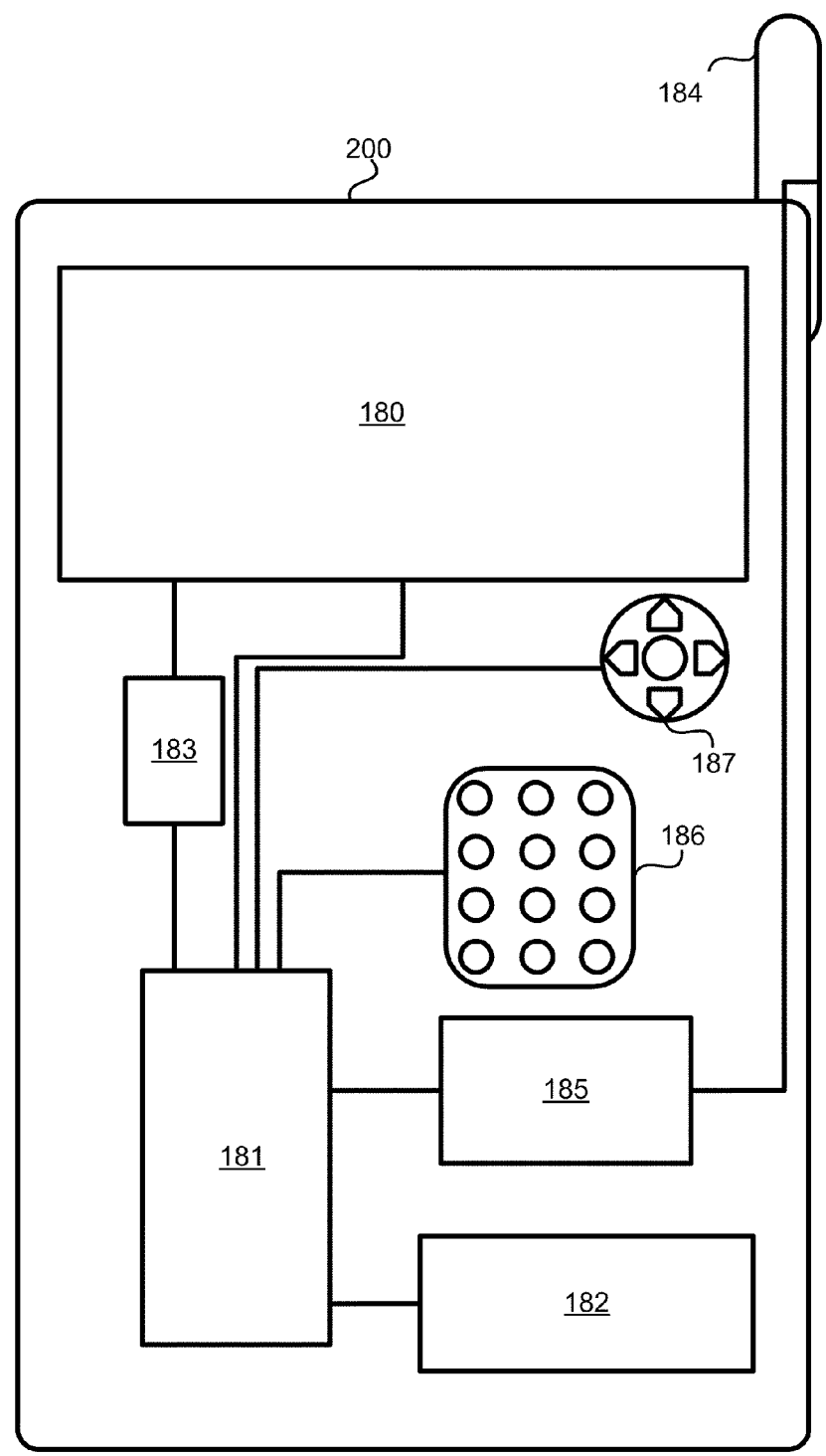
FIG. 21 is a component block diagram of a portable computing device employing a conductive multi-touch touch pad or touchscreen panel.

While FIG. 19 shows the read out circuit 183 and graphics module 188 as separate circuits or circuit modules, those circuit elements may be incorporated within either the conductive multi-touch touch-sensitive panel 180 or the processor 181. For example, FIG. 20 shows an embodiment in which the read out circuit 183 is incorporated within the conductive multi-touch touch-sensitive panel 180 and the graphics module 188 is part of the processor 181 electronics or software. In this embodiment, the conductive multi-touch touch-sensitive panel 180 receives display graphics signals directly from the processor 181 and provides touch location information directly to the processor 181 via its embedded read out circuit 183.

The embodiments described above may be implemented on any of a variety of portable computing devices, such as, for example, cellular telephones, personal data assistants (PDA) with cellular telephone and/or WIFI transceivers, mobile electronic mail receivers, mobile web access devices, and other processor-equipped devices that may be developed in the future that connect to one or more data communication links. Typically, such portable computing devices will have in common the components illustrated in FIG. 21. For example, the portable computing devices 200 may include a processor 181 coupled to internal memory 182 and to a multi-touch display 180 via a state machine 183 (which may be part of the display 180). Additionally, the portable computing device 200 may have an antenna 184 for sending and receiving electromagnetic radiation that is connected to a wireless data link and/or cellular telephone transceiver 185 coupled to the processor 181. Portable computing devices 180 also typically include a key pad 186 or miniature keyboard and menu selection buttons or rocker switches 187 for receiving user inputs.

The processor 181 may be any programmable microprocessor, microcomputer or multiple processor chip or chips that can be configured by software instructions (applications) to perform a variety of functions, including the functions of the various embodiments described above. In some portable computing device 200, multiple processors 181 may be provided, such as one processor dedicated to interfacing with and controlling the multi-touch display 180, and one processor dedicated to running other applications. Typically, software applications may be stored in the internal memory 182 before they are accessed and loaded into the processor 181. In some portable computing device 200, the processor 181 may include internal memory sufficient to store the application software instructions. For the purposes of this description, the term memory refers to all memory accessible by the processor 181, including internal memory 182 and memory within the processor 181 itself. In many portable computing device 200, the memory 182 may be a volatile or nonvolatile memory, such as flash memory, or a mixture of both.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the steps of a method described above and shown in the figures is for example purposes only as the order of some steps may be changed from that described herein without departing from the spirit and scope of the present invention and the claims. The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A mobile device comprising:
   a multi-touch touch-sensitive panel, comprising:
      a first array of linear conductors;
      a second array of linear conductors, wherein the second array is positioned in close proximity to and oriented at a non-zero angle with respect to the first array;
      a switch configured to sequentially couple each of the linear conductors within the first array to an applied electrical signal; and
      an electrical sensor coupled to each of the linear conductors within the second array; and
   a processor coupled to the multi-touch touch-sensitive panel, wherein the processor is configured with processor-executable instructions to perform operations comprising:
      sequentially applying the electrical signal to each linear conductor within the first array;

obtaining, upon application of the electrical signal to each linear conductor within the first array, a corresponding output electrical value on each linear conductor within the second array using the electrical sensor;

determining whether more than two touches to the panel are indicated based upon the obtained output electrical values, wherein the more than two touches correspond to more than two locations on the panel; and in response to determining that more than two touches to the panel are indicated:
identifying any erroneous touch location due to a secondary electrical path by:
identifying output electrical values that indicate touches on the touch-sensitive panel; and
for each linear conductor within the second array that is determined to have multiple corresponding identified output electrical values based on the electrical signals applied to each linear conductor within the first array, comparing each of the identified output electrical values corresponding to a respective linear conductor within the second array to the other identified output electrical value(s) corresponding to the respective linear conductor within the second array in order to distinguish at least one real touch indication on that linear conductor within the second array and to identify an erroneous touch location on that linear conductor; and
providing an output of corrected touch locations on the touch-sensitive panel based on any distinguished real touch indications.

2. The mobile device of claim 1, further comprising:
a first transparent member coupled to the first array of linear conductors;
a second transparent member coupled to the second array of linear conductors; and
a display element positioned beneath the first array of linear conductors and the second array of linear conductors,
wherein the first and second transparent members are configured so that a touch on the multi-touch touch-sensitive panel causes at least one linear conductor within the first array of linear conductors to come into electrical contact with at least one linear conductor within the second array of linear conductors.

3. The mobile device of claim 1, wherein the applied electrical signal is a voltage source.

4. The mobile device of claim 1, wherein the applied electrical signal is ground.

5. The mobile device of claim 1, wherein the applied electrical signal is a current source.

6. The mobile device of claim 1, wherein the applied electrical signal is a current sink.

7. The mobile device of claim 1, wherein the first array of linear conductors and the second array of linear conductors are configured so there is a gap between the first array of linear conductors and the second array of linear conductors when the multi-touch touch-sensitive panel is not touched.

8. The mobile device of claim 7, further comprising a nonconductive material positioned within the gap.

9. The mobile device of claim 1, wherein the electrical sensor comprises an analog-to-digital converter circuit configured to output a signal representing a voltage or current level of the at least one linear conductor within the second array of linear conductors.

10. The mobile device of claim 1, wherein the switch comprises a multiplexor circuit coupled between the first array of linear conductors and the applied electrical signal.

11. The mobile device of claim 1, wherein the multi-touch touch-sensitive panel further comprises a multiplexor circuit coupled between the second array of linear conductors and the electrical sensor.

12. The mobile device of claim 1, wherein the switch comprises a plurality of transistors each respectively coupled between one linear conductor within the first array of linear conductors and the applied electrical signal, wherein the transistor is configured to connect the linear conductor to the applied electrical signal in response to an applied voltage signal.

13. The multi-touch touch-sensitive panel of claim 1, wherein the first array of linear conductors and the second array of linear conductors have different pitch densities.

14. A method for detecting touches on a conductive multi-touch touch-sensitive panel including a first array of linear conductors and a second array of linear conductors, comprising:
sequentially applying an electrical signal to each linear conductor within the first array of linear conductors; and
obtaining, upon application of the electrical signal to each linear conductor within the first array, a corresponding output electrical value on each linear conductor within the second array;
determining whether more than two touches on the conductive multi-touch touch-sensitive panel are indicated based upon the obtained output electrical values, wherein the more than two touches correspond to more than two touch locations on the panel; and
in response to determining that more than two touches on the conductive multi-touch touch-sensitive panel are indicated:
identifying any erroneous touch location due to a secondary electrical path by:
identifying output electrical values that indicate touches on the touch-sensitive panel; and
for each linear conductor within the second array that is determined to have multiple corresponding identified output electrical values based on the electrical signals applied to each linear conductor within the first array, comparing each of the identified output electrical values corresponding to a respective linear conductor within the second array to the other identified output electrical value(s) corresponding to the respective linear conductor within the second array in order to distinguish at least one real touch indication on that linear conductor within the second array and to identify an erroneous touch location on that linear conductor; and
providing an output of corrected touch locations on the touch-sensitive panel based on any distinguished real touch indications.

15. The method of claim 14, wherein the applied electrical signal is one of a voltage, a ground, a current source and a current sink.

16. The method of claim 14, wherein obtaining a corresponding output electrical value on each linear conductor within the second array comprises comparing a sensed voltage or current on each linear conductor within the second array to a threshold value.

17. The method of claim 14, wherein obtaining a corresponding output electrical value on each linear conductor within the second array comprises measuring a voltage on each linear conductor within the second array.

18. The method of claim 14, wherein obtaining a corresponding output electrical value on each linear conductor within the second array comprises measuring a current on each linear conductor within the second array.

19. The method of claim 14, wherein obtaining a corresponding output electrical value on each linear conductor within the second array of linear conductors comprises:
sequentially connecting each linear conductor within the second array to an electrical sensor; and
sensing the electrical value with the electrical sensor.

20. The method of claim 14, further comprising identifying a location of a touch on the conductive multi-touch touch-sensitive panel based upon a linear conductor within the second array for which the corresponding output electrical value exceeds a threshold value and the linear conductor within the first array to which the applied electrical signal is applied when the sensed corresponding electrical value exceeds the threshold value.

21. A multi-touch touch-sensitive panel, comprising:
a first array of linear conductors;
a second array of linear conductors positioned in close proximity to and electrically isolated from the first array;
means for sequentially applying an electrical signal to each linear conductor in the first array;
means for obtaining, upon application of the electrical signal to each linear conductor in the first array, a corresponding output electrical value on each linear conductor in the second array;
means for determining whether more than two touch locations on the multi-touch touch-sensitive panel are indicated based upon the obtained output electrical values; and
in response to determining that more than two touch locations on the multi-touch touch-sensitive panel are indicated:
means for identifying any erroneous touch location due to a secondary electrical path, comprising:
means for identifying output electrical values that indicate touches on the touch-sensitive panel; and
for each linear conductor within the second array that is determined to have multiple corresponding identified output electrical values based on the electrical signals applied to each linear conductor within the first array, means for comparing each of the identified output electrical values corresponding to a respective linear conductor within the second array to the other identified output electrical value(s) corresponding to the respective linear conductor within the second array in order to distinguish at least one real touch indication on that linear conductor within the second array and to identify an erroneous touch location on that linear conductor; and
means for providing an output of corrected touch locations on the touch-sensitive panel based on any distinguished real touch indications.

22. The multi-touch touch-sensitive panel of claim 21, wherein means for applying an electrical signal to each linear conductor in the first array comprises means for applying a voltage to each linear conductor in the first array.

23. The multi-touch touch-sensitive panel of claim 21, wherein means for applying an electrical signal to each linear conductor in the first array comprises means for applying a ground voltage to each linear conductor in the first array.

24. The multi-touch touch-sensitive panel of claim 21, wherein means for applying an electrical signal to each linear conductor in the first array comprises means for applying a current source to each linear conductor in the first array.

25. The multi-touch touch-sensitive panel of claim 21, wherein means for applying an electrical signal to each linear conductor in the first array comprises means for applying a current sink to each linear conductor in the first array.

26. The multi-touch touch-sensitive panel of claim 21, further comprising:
means for supporting the first array of linear conductors while allowing light to pass through the first array of linear conductors;
means for supporting the second array of linear conductors while allowing light to pass through the second array of linear conductors; and
means for displaying an image positioned beneath the first array of linear conductors and the second array of linear conductors.

27. The multi-touch touch-sensitive panel of claim 21, wherein means for obtaining a corresponding output electrical value on each linear conductor in the second array comprises means for outputting a signal if that linear conductor within the second array exhibits a voltage that exceeds a threshold value.

28. The multi-touch touch-sensitive panel of claim 21, wherein means for obtaining a corresponding output electrical value on each linear conductor in the second array comprises means for outputting a signal representing a voltage level for each linear conductor within the second array of linear conductors.

29. The multi-touch touch-sensitive panel of claim 21, wherein means for obtaining a corresponding output electrical value on each linear conductor in the second array comprises means for sequentially connecting each of the second array of linear conductors to an electrical sensor.

30. The multi-touch touch-sensitive panel of claim 21, wherein means for applying an electrical signal to each linear conductor in the first array comprises means for individually connecting each linear conductor of the first array to a source of the applied electrical signal in response to an applied voltage signal.

31. The multi-touch touch-sensitive panel of claim 21, further comprising means for maintaining a gap between the first array of linear conductors and the second array of linear conductors when the multi-touch touch-sensitive panel is not touched.

32. The multi-touch touch-sensitive panel of claim 21, wherein the first array of linear conductors and the second array of linear conductors have different pitch densities.

33. A mobile device, comprising:
a multi-touch touch-sensitive panel including a first array of linear conductors and a second array of linear conductors, wherein:
resistance per unit of length varies across linear conductors in the first array or the second array; and
a processor coupled to the multi-touch touch-sensitive panel, wherein the processor is configured with processor-executable instructions to perform operations comprising:
sequentially applying an electrical signal to each linear conductor in the first array of linear conductors;
obtaining, upon application of the electrical signal to each linear conductor in the first array, a corresponding output electrical value on each linear conductor in the second array;
determining whether more than two touch locations on the multi-touch touch sensitive panel are indicated based on the obtained output electrical values; and in response to determining that more than two touch locations on the multi-touch touch-sensitive panel are indicated:
- identifying any erroneous touch location due to a secondary electrical path by:
  - identifying output electrical values that indicate touches on the touch-sensitive panel; and
  - for each linear conductor within the second array that is determined to have multiple corresponding identified output electrical values based on the electrical signals applied to each linear conductor within the first array, comparing each of the identified output electrical values corresponding to a respective linear conductor within the second array to the other identified output electrical value(s) corresponding to the respective linear conductor within the second array in order to distinguish at least one real touch indication on that linear conductor within the second array and to identify an erroneous touch location on that linear conductor; and
- providing an output of corrected touch locations on the touch-sensitive panel based on any distinguished real touch indications.

34. The mobile device of claim 33, wherein the multi-touch touch-sensitive panel further comprises:
- a first transparent member coupled to the first array of linear conductors;
- a second transparent member coupled to the second array of linear conductors; and
- a display element positioned beneath the first array of linear conductors and the second array of linear conductors, wherein the first transparent member and the second transparent member are configured so that a touch on the multi-touch touch-sensitive panel causes at least one linear conductor within the first array of linear conductors to come into electrical contact with at least one linear conductor within the second array of linear conductors.

35. The mobile device of claim 33, wherein the applied electrical signal is a voltage source.

36. The mobile device of claim 33, wherein the applied electrical signal is ground.

37. The mobile device of claim 33, wherein the applied electrical signal is a current source.

38. The mobile device of claim 33, wherein the applied electrical signal is a current sink.

39. The mobile device of claim 33, wherein the first array of linear conductors and the second array of linear conductors are configured so there is a gap between the first array of linear conductors and the second array of linear conductors when the multi-touch touch-sensitive panel is not touched.

40. The mobile device of claim 39, further comprising a nonconductive material positioned within the gap.

41. The mobile device of claim 33, wherein the multi-touch touch-sensitive panel further comprises an electrical sensor coupled to the first array of linear conductors, wherein the electrical sensor comprises an analog-to-digital converter circuit configured to output a signal representing a voltage or current level of each linear conductor within the second array.

42. The mobile device of claim 33, wherein the multi-touch touch-sensitive panel further comprises a switch configured to couple each of the linear conductors within the first array to the applied electrical signal, wherein the switch comprises a multiplexor circuit coupled between the first array of linear conductors and a source of the applied electrical signal.

43. The mobile device of claim 33, further comprising a multiplexor circuit coupled between the second array of linear conductors and the electrical sensor.

44. The mobile device of claim 33, wherein the multi-touch touch-sensitive panel further comprises a switch configured to couple each of the linear conductors within the first array to the applied electrical signal, wherein the switch comprises a transistor coupled between one linear conductor within the first array and a source of the applied electrical signal, wherein the transistor is configured to connect the one linear conductor to the applied electrical signal in response to an applied voltage signal.

45. The mobile device of claim 33, wherein the first array of linear conductors and the second array of linear conductors have different pitch densities.

46. A non-transitory computer-readable storage medium having stored thereon processor-executable software instructions configured to cause a processor to perform operations comprising:
- sequentially applying an electrical signal to each linear conductor within a first array of linear conductors;
- obtaining, upon application of the electrical signal to each linear conductor within the first array, a corresponding output electrical value on each linear conductor within a second array of linear conductors;
- determining whether more than two touch locations on a multi-touch touch-sensitive panel including the first array and second array are indicated based on the obtained output electrical values; and
- in response to determining that more than two touch locations on the multi-touch touch-sensitive panel are indicated:
  - identifying any erroneous touch location due to a secondary electrical path by:
  - identifying output electrical values that indicate touches to the touch-sensitive panel; and
  - for each linear conductor within the second array that is determined to have multiple corresponding identified output electrical values based on the electrical signals applied to each linear conductor within the first array, comparing each of the identified output electrical values corresponding to a respective linear conductor within the second array to the other identified output electrical value(s) corresponding to the respective linear conductor within the second array in order to distinguish at least one real touch indication on that linear conductor within the second array and to identify an erroneous touch location on that linear conductor; and
  - providing an output of corrected touch locations on the touch-sensitive panel based on any distinguished real touch indications.

47. The non-transitory computer-readable storage medium of claim 46, wherein the stored processor-executable software instructions are configured such that the operation of obtaining a corresponding output electrical value on each linear conductor in the second array comprises comparing a sensed voltage on each linear conductor within the second array to a threshold value.

48. The non-transitory computer-readable storage medium of claim 46, wherein the stored processor-executable software instructions are configured such that obtaining a corresponding output electrical value on each linear conductor in the second array comprises measuring a voltage on each linear conductor within the second array.

49. The non-transitory computer-readable storage medium of claim 46, wherein the stored processor-executable software instructions are configured such that the operation of obtaining a corresponding output electrical value on each linear conductor in the second array comprises measuring a current on each linear conductor within the second array.

50. The non-transitory computer-readable storage medium of claim 46, wherein the stored processor-executable software instructions are further configured such that obtaining a corresponding output electrical value on each linear conductor within the second array comprises:

sequentially connecting each linear conductor within the second array of linear conductors to an electrical sensor; and sensing the electrical value with the electrical sensor.

51. The non-transitory computer-readable storage medium of claim 46, wherein the stored processor-executable software instructions are configured to cause a processor to perform operations further comprising:

identifying a location of a touch on the multi-touch touch-sensitive panel based upon a linear conductor within the second array for which the obtained corresponding output electrical value exceeds a threshold value and a linear conductor within the first array to which the electrical signal is applied.

\* \* \* \* \*